US012530775B2

(12) United States Patent
Wu et al.

(10) Patent No.: US 12,530,775 B2
(45) Date of Patent: Jan. 20, 2026

(54) MODEL-BASED DEEP LEARNING FOR GLOBALLY OPTIMAL SURFACE SEGMENTATION

(71) Applicant: University of Iowa Research Foundation, Iowa City, IA (US)

(72) Inventors: Xiaodong Wu, Iowa City, IA (US); Leixin Zhou, Iowa City, IA (US); John M Buatti, Iowa City, IA (US); Hui Xie, North Liberty, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 903 days.

(21) Appl. No.: 17/365,572

(22) Filed: Jul. 1, 2021

(65) Prior Publication Data
US 2022/0012890 A1    Jan. 13, 2022

Related U.S. Application Data

(60) Provisional application No. 63/047,100, filed on Jul. 1, 2020.

(51) Int. Cl.
*G06T 7/11* (2017.01)
*G06T 7/00* (2017.01)
*G06T 7/162* (2017.01)

(52) U.S. Cl.
CPC .............. *G06T 7/11* (2017.01); *G06T 7/0012* (2013.01); *G06T 7/162* (2017.01);
(Continued)

(58) Field of Classification Search
CPC ......... G06T 7/11; G06T 7/0012; G06T 7/162; G06T 2207/10072; G06T 2207/10132; G06T 2207/20081; G06T 2207/20084; G06T 2207/10101; G06T 2207/30041; G06T 2207/30101; G06T 7/12
See application file for complete search history.

(56) References Cited

U.S. PATENT DOCUMENTS 10,482,603  B1 * 11/2019  Fu ........................... G06N 3/04
2009/0136103 A1 *  5/2009  Sonka ................ G06V 10/7635
                                                              382/128
(Continued)

OTHER PUBLICATIONS

Optimal Surface Segmentation in Volumetric Images—A Graph-theoritic Approach, IEEE Transactions on Pattern Analysis and Mchine Intelligence, vol. 28, No. 1, Jan. 2001, Kang Li, Ziadong Wu, Danny Z. Chen and Milan Sonka, pp. 119-134. (Year: 2006).*

(Continued)

*Primary Examiner* — Jennifer Mehmood
*Assistant Examiner* — Heath E. Wells
(74) *Attorney, Agent, or Firm* — Goodhue, Coleman & Owens, P.C.

(57) ABSTRACT

An automated method for segmentation includes steps of receiving at a computing device an input image representing at least one surface and performing by the computing device image segmentation on the input image based on a graph surface segmentation model with deep learning. The deep learning may be used to parameterize the graph surface segmentation model.

19 Claims, 27 Drawing Sheets
(12 of 27 Drawing Sheet(s) Filed in Color)

(52) U.S. Cl.
CPC ............... *G06T 2207/10072* (2013.01); *G06T 2207/10132* (2013.01); *G06T 2207/20081* (2013.01); *G06T 2207/20084* (2013.01)

(56) References Cited

U.S. PATENT DOCUMENTS

| | | | | |
|---|---|---|---|---|
| 2020/0167930 A1* | 5/2020 | Wang | ..................... | G06N 3/08 |
| 2021/0158510 A1* | 5/2021 | Huang | ..................... | G06T 7/62 |

OTHER PUBLICATIONS

"Simultaneous Multiple Surface Segmentation Using Deep Learning," published by arXiv:1705.07142v1 on May 19, 2017 by Abhay Shah, Micheal Abramoff and Ziaodong Wu. (Year: 2017).*
"A survey of graph Cuts/Graph Search Based Medical Image Segmentation," published by IEEE Reviews in Biomedical Engineering, vol. 11, 2018 by Xinjian Chen and LingjiaoPan (Year: 2018).*
A Survey of Graph Cuts/Graph Search Based Medical Image Segmentation by Xinjian Chen, and Lingjiao Pan, IEEE Reviews in Biomedical engineering, vol. 11, p. 112-124, Jan. 26, 2018 (Year: 2018).*
Markov Random Fields, Published lecture notes, by D.J.Fleet and A.D.Jepson, 2011 (Year: 2011).*
Optimal Surface Segmentation in Volumetric Images—A Graph-Theoretic Approach by Kang Li, Xiaodong Wu, Danny Z. Chen, and Milan Sonka, IEEE Transactions on Pattern Analysis and Machine Intelligence, vol. 28, No. 1, Jan. 2006, pp. 119-134 (Year : 2006).*
E. Essa, J.-L. Jones, and X. Xie. Coupled s-excess HMM for vessel border tracking and segmentation. International Journal for Numerical Methods in Biomedical Engineering, 35(7):e3206, 2019.
A. Arnab, O. Miksik, and P. H. Torr, "On the robustness of semantic segmentation models to adversarial attacks," in Proceedings of the IEEE Conference on Computer Vision and Pattern Recognition, 2018, pp. 888-897.
A. Arnab, S. Jayasumana, S. Zheng, and P. H. Torr. Higher order conditional random fields in deep neural networks. In European Conference on Computer Vision, pp. 524-540. Springer, 2016.
A. Arnab, S. Zheng, S. Jayasumana, B. Romera-Paredes, M. Larsson, A. Kirillov, B. Savchynskyy, C. Rother, F. Kahl, and P. H. Torr. Conditional random fields meet deep neural networks for semantic segmentation: Combining probabilistic graphical models with deep learning for structured prediction. IEEE Signal Processing Magazine, 35(1):37-52, 2018.
A. Benussi, L. Jorge, N. Canario, R. Martins, B. Santiago, I. Santana, H. Quental, F. Ambrosio, R. Bernardes, and M. Castelo-Branco. The Retinal Inner Plexiform Synaptic Layer Mirrors Grey Matter Thickness of Primary Visual Cortex with Increased Amyloid Load in Early Alzheimer's Disease. Neural Plasticity, 2020:8826087, 2020. 11 Pages.
A. Chartsias, T. Joyce, G. Papanastasiou, S. Semple, M. Williams, D. Newby, R. Dharmakumar, and S. A. Tsaftaris. Factorised spatial representation learning: application in semi-supervised myocardial segmenta-tion. In International Conference on Medical Image Computing and Computer-Assisted Intervention, pp. 490-498. Springer, 2018.
A. Khoreva, R. Benenson, J. Hosang, M. Hein, and B. Schiele. Simple does it: Weakly supervised instance and semantic segmentation. In Proceedings of the IEEE conference on computer vision and pattern recog-nition, pp. 876-885, 2017.
A. M. Arias Lorza, A. van Engelen, J. Petersen, A. van der Lugt, and M. de Bruijne. Maximization of regional probabilities using Optimal Surface Graphs: Application to carotid artery segmentation in MRI. Medical Physics, 45(3):1159-1169, 2018.
A. N. Christensen, C. T. Larsen, C. M. Mandrup, M. B. Petersen, R. Larsen, K. Conradsen, and V. A. Dahl. Automatic Segmentation of Abdominal Fat in MRI-Scans, Using Graph-Cuts and Image Derived Energies. In P. Sharma and F. M. Bianchi, editors, Image Analysis, pp. 109-120, Cham, 2017. Springer International Publishing.

A. Shah, J. Bai, Z. Hu, S. Sadda, and X. Wu. Multiple surface segmentation using truncated convex priors. In International Conference on Medical Image Computing and Computer-Assisted Intervention, pp. 97-104. Springer, 2015.
A. Shah, L. Zhou, M. D. Abr'amoff, and X. Wu, "Multiple surface segmentation using convolution neural nets: application to retinal layer segmentation in oct images," Biomed. Opt. Express, vol. 9, No. 9, pp. 4509-4526, 2018.
A. Shah, M. D. Abr'amoff, and X. Wu, "Optimal surface segmentation with convex priors in irregularly sampled space," Med. Image Anal., 2019.
A. Vaswani, N. Shazeer, N. Parmar, J. Uszkoreit, L. Jones, A. N. Gomez, L. Kaiser, and I. Polosukhin. Attention is all you need. In Advances in neural information processing systems, pp. 5998-6008, 2017.
B. Amos and J. Z. Kolter. Optnet: Differentiable optimization as a layer in neural networks. In Proceedings of the 34th International Conference on Machine Learning—vol. 70, pp. 136-145. JMLR. org, 2017.
B. B. Rad, H. J. Bhatti, and M. Ahmadi. An introduction to docker and analysis of its performance. Interna-tional Journal of Computer Science and Network Security (IJCSNS), 17(3):228, 2017.
B. J. Antony, M. D. Abramoff, M. M. Harper, W. Jeong, E. H. Sohn, Y. H. Kwon, R. Kardon, and M. K. Garvin. A combined machine-learning and graph-based framework for the segmentation of retinal surfaces in SD-OCT vols. Biomedical optics express, 4(12):2712-2728, 2013.
B. J. Kim, D. J. Irwin, D. Song, E. Daniel, J. D. Leveque, A. R. Raquib, W. Pan, G.-S. Ying, T. S. Aleman, J. L. Dunaief, and M. Grossman. Optical coherence tomography identifies outer retina thinning in frontotemporal degeneration. Neurology, 89(15):1604-1611, 2017.
B. Wang, G. Qi, S. Tang, T. Zhang, Y. Wei, L. Li, and Y. Zhang. Boundary Perception Guidance: A Scribble-Supervised Semantic Segmentation Approach. In Proceedings of the Twenty-Eighth International Joint Conference on Artificial Intelligence, IJCAI-19, pp. 3663-3669. International Joint Conferences on Artificial Intelligence Organization, 7 2019.
C. A. Beam, E. F. Conant, and E. A. Sickles. Association of volume and volume independent factors with accuracy in screening mammogram interpretation. Journal of the National Cancer Institute, 95(4):282-290, 2003.
C. Balakrishna, S. Dadashzadeh, and S. Soltaninejad, "Automatic detection of lumen and media in the ivus images using u-net with vgg16 encoder," arXiv preprint arXiv:1806.07554, 2018.
C. Bauer, M. Eberlein, and R. R. Beichel. Pulmonary lobe separation in expiration chest CT scans based on subject-specific priors derived from inspiration scans. Journal of Medical Imaging, 5(1):1-13, 2018.
C. Blasse, S. Saalfeld, R. Etournay, A. Sagner, S. Eaton, and E. W. Myers. PreMosa: extracting 2D surfaces from 3D microscopy mosaics. Bioinformatics, 33(16):2563-2569, Apr. 2017.
C. Cui, A. Shah, X. Wu, and M. Jacob. A rapid 3D fat-water decomposition method using globally optimal surface estimation (R-GOOSE). Magnetic Resonance in Medicine, 79(4):2401-2407, 2018.
C. Cui, X. Wu, J. D. Newell, and M. Jacob. Fat water decomposition using globally optimal surface estima-tion (GOOSE) algorithm. Magnetic resonance in medicine, 73(3):1289-1299, 2015.
C. M. Mandrup, C. B. Roland, J. Egelund, M. Nyberg, L. H. Enevoldsen, A. Kjaer, A. Clemmensen, A. N. Christensen, C. Suetta, R. Frikke-Schmidt, B. B. Utoft, J. M. Kristensen, J. F. P. Wojtaszewski, Y. Hellsten, and B. Stallknecht. Effects of High-Intensity Exercise Training on Adipose Tissue Mass, Glucose Uptake and Protein Content in Pre- and Post-menopausal Women. Frontiers in sports and active living, 2:60-60, Jun. 2020, 13 pages.
C. Nadeau and Y. Bengio. Inference for the Generalization Error. Machine Learning, 52(3):239-281, 2003.
C. Redondo-Cabrera, M. Baptista-Rios, and R. J. Lopez-Sastre. Learning to Exploit the Prior Network Knowledge for Weakly Supervised Semantic Segmentation. IEEE Transactions on Image Processing, 28(7):3649-3661, 2019.

(56) References Cited

OTHER PUBLICATIONS

C. Song, Y. Huang, W. Ouyang, and L. Wang. Box-Driven Class-Wise Region Masking and Filling Rate Guided Loss for Weakly Supervised Semantic Segmentation. In 2019 IEEE/CVF Conference on Computer Vision and Pattern Recognition (CVPR), pp. 3131-3140, 2019.

D. L. Rubin, D. Willrett, M. J. O'Connor, C. Hage, C. Kurtz, and D. A. Moreira. Automated tracking of quantitative assessments of tumor burden in clinical trials. Translational oncology, 7(1):23-35, 2014.

D. L. Rubin, M. U. Akdogan, C. Altindag, and E. Alkim. ePAD: an image annotation and analysis platform for quantitative imaging. Tomography, 5(1):170, 2019.

D. Lin, J. Dai, J. Jia, K. He, and J. Sun. ScribbleSup: Scribble-Supervised Convolutional Networks for Semantic Segmentation. In 2016 IEEE Conference on Computer Vision and Pattern Recognition (CVPR), pp. 3159-3167, 2016.

D. Mahapatra, B. Bozorgtabar, J.-P. Thiran, and M. Reyes. Efficient active learning for image classification and segmentation using a sample selection and conditional generative adversarial network. In International Conference on Medical Image Computing and Computer-Assisted Intervention, pp. 580-588. Springer, 2018.

D. Shen, G. Wu, and H.-I. Suk. Deep learning in medical image analysis. Annual review of biomedical engineering, 19:221-248, 2017.

EPad Usage Report. https://epad.stanford.edu/analytic. Accessed: May 15, 2021. 2 pages.

F. Liu, Z. Zhou, H. Jang, A. Samsonov, G. Zhao, and R. Kijowski. Deep convolutional neural network and 3D deformable approach for tissue segmentation in musculoskeletal magnetic resonance imaging. Magnetic resonance in medicine, 79(4):2379-2391, 2018.

F. Lu, F. Wu, P. Hu, Z. Peng, and D. Kong. Automatic 3D liver location and segmentation via convolutional neural network and graph cut. International journal of computer assisted radiology and surgery, 12(2):171-182, 2017.

F. Milletari, A. Rothberg, J. Jia, and M. Sofka. Integrating statistical prior knowledge into convolutional neural networks. In International Conference on Medical Image Computing and Computer-Assisted Intervention, pp. 161-168. Springer, 2017.

F. Shi, X. Chen, H. Zhao, W. Zhu, D. Xiang, E. Gao, M. Sonka, and H. Chen. Automated 3-D retinal layer segmentation of macular optical coherence tomography images with serous pigment epithelial de-tachments. IEEE transactions on medical imaging, 34(2):441-452, 2014.

G. Litjens, T. Kooi, B. E. Bejnordi, A. A. A. Setio, F. Ciompi, M. Ghafoorian, J. A. Van Der Laak, B. Van Gin-neken, and C. I. Sanchez. A survey on deep learning in medical image analysis. Medical image analysis, 42:60-88, 2017.

G. Papandreou, L. Chen, K. P. Murphy, and A. L. Yuille. Weakly- and Semi-Supervised Learning of a Deep Convolutional Network for Semantic Image Segmentation. In 2015 IEEE International Conference on Computer Vision (ICCV), pp. 1742-1750, 2015.

G. Veni, S. Y. Elhabian, and R. T. Whitaker. ShapeCut: Bayesian surface estimation using shape-driven graph. Medical Image Analysis, 40:11-29, 2017, 52 pages.

G. Zheng, C. Chu, D. L. Belavý, B. Ibragimov, R. Korez, T. Vrtovec, H. Hutt, R. Everson, J. Meakin, I. L. Andrade, B. Glocker, H. Chen, Q. Dou, P.-A. Heng, C. Wang, D. Forsberg, A. Neubert, J. Fripp, M. Urschler, D. Stern, M. Wimmer, A. A. Novikov, H. Cheng, G. Armbrecht, D. Felsenberg, and S. Li. Evaluation and comparison of 3D intervertebral disc localization and segmentation methods for 3D T2 Mr data: A grand challenge. Medical Image Analysis, 35:327-344, 2017.

H. Bogunovic', M. Sonka, Y. H. Kwon, P. Kemp, M. D. Abramoff, and X. Wu. Multi-surface and multi-field co- segmentation of 3-D retinal optical coherence tomography. IEEE transactions on medical imaging, 33(12):2242-2253, 2014.

H. Guo, "A simple algorithm for fitting a gaussian function [dsp tips and tricks]," IEEE Signal Process Mag, vol. 28, No. 5, pp. 134-137, 2011.

H. Jia, Y. Song, D. Zhang, H. Huang, D. Feng, M. Fulham, et al. 3D Global Convolutional Adversarial Network for Prostate MR Volume Segmentation. arXiv preprint arXiv:1807.06742, 2018.

H. Kervadec, J. Bouchtiba, C. Desrosiers, E. Granger, J. Dolz, and I. B. Ayed, "Boundary loss for highly unbalanced segmentation," in International Conference on Medical Imaging with Deep Learning, 2019, pp. 285-296.

H. Kervadec, J. Dolz, M. Tang, E. Granger, Y. Boykov, and I. Ben Ayed. Constrained-CNN losses for weakly supervised segmentation. Medical Image Analysis, 54:88-99, 2019.

H. Ravishankar, R. Venkataramani, S. Thiruvenkadam, P. Sudhakar, and V. Vaidya. Learning and incorpo-rating shape models for semantic segmentation. In International Conference on Medical Image Computing and Computer-Assisted Intervention, pp. 203-211. Springer, 2017.

I. Gulrajani, F. Ahmed, M. Arjovsky, V. Dumoulin, and A. C. Courville. Improved training of wasserstein gans. In Advances in neural information processing systems, pp. 5767-5777, 2017.

I. Oguz and M. Sonka, "Logismos-b: layered optimal graph image segmentation of multiple objects and surfaces for the brain," IEEE transactions on medical imaging, vol. 33, No. 6, pp. 1220-1235, 2014.

A. Nunes, P. Serranho, H. Quental, A. F. Ambrosio, M. Castelo-Branco, and R. Bernardes. Sexual di-morphism of the adult human retina assessed by optical coherence tomography. Health and Technology, 10(4):913-924, 2020.

A. P. Yow, R. Srivastava, J. Cheng, A. Li, J. Liu, L. Schmetterer, H. L. Tey, and D. W. K. Wong. Techniques and Applications in Skin OCT Analysis, pp. 149-163. Springer International Publishing, Cham, 2020.

A. Snyder, D. Willrett, D. A. Moreira, K. A. Serique, P. Mongkolwat, V. Semeshko, and D. L. Rubin. ePAD: a cross- platform semantic image annotation tool for quantitative imaging. In RSNA 97th Scientific Assembly & Annual Meeting, 2011, 2 pages.

C. Chu, J. Bai, L. Liu, X. Wu, and G. Zheng. Fully automatic segmentation of hip CT images via ran-dom forest regression-based Atlas selection and optimal graph search-based surface detection. In Asian Conference on Computer Vision, pp. 640-654. Springer, 2014.

C. Chu, J. Bai, X. Wu, and G. Zheng. MASCG: multi-atlas segmentation constrained graph method for accurate segmentation of hip CT images. Medical image analysis, 26(1):173-184, 2015.

D. Nie, Y. Gao, L. Wang, and D. Shen. ASDNet: Attention based semi-supervised deep networks for medical image segmentation. In International Conference on Medical Image Computing and Computer-Assisted Intervention, pp. 370-378. Springer, 2018.

D. Xiang, H. Tian, X. Yang, F. Shi, W. Zhu, H. Chen, and X. Chen. Automatic Segmentation of Retinal Layer in OCT Images With Choroidal Neovascularization. IEEE Transactions on Image Processing, 27(12):5880-5891, 2018.

D. Xiang, U. Bagci, C. Jin, F. Shi, W. Zhu, J. Yao, M. Sonka, and X. Chen. CorteXpert: A model-based method for automatic renal cortex segmentation. Medical Image Analysis, 42:257-273, 2017.

E. A. Samaniego, J. A. Roa, H. Zhang, T. R. Koscik, S. Ortega-Gutierrez, G. Bathla, M. Sonka, C. Derdeyn, V. A. Magnotta, and D. Hasan. Increased contrast enhancement of the parent vessel of unruptured intracra-nial aneurysms in 7T MR imaging. Journal of NeuroInterventional Surgery, 12(10):1018-1022, 2020.

G. Hinton, O. Vinyals, and J. Dean, "Distilling the knowledge in a neural network," in Deep Learning and Representation Learning Workshop at NIPS 2014, 2015, 9 pages.

Grand Challenges—A platform for end-to-end development of machine learning solutions in biomedical imagig. https://grand-challenge.org/. Date:N/A.

H. Zhang, E. Essa, and X. Xie. Automatic vessel lumen segmentation in optical coherence tomography (OCT) images. Applied Soft Computing, 88:106042, 2020.

J. Bai, M. S. Miri, Y. Liu, p. Saha, M. Garvin, and X. Wu. Graph-based optimal multi-surface segmentation with a star-shaped prior: Application to the segmentation of the optic disc and cup. In 2014 IEEE 11th International Symposium on Biomedical Imaging (ISBI), pp. 525-528. IEEE, 2014.

(56) References Cited

OTHER PUBLICATIONS

K. Lee, H. Zhang, A. Wahle, M. Abramoff, and M. Sonka. Multi-layer 3D Simultaneous Retinal OCT Layer Segmentation: Just-Enough Interaction for Routine Clinical Use. vol. 27, pp. 862-871, Jan. 2018.

K. Lee, Y. Yin, A. Wahle, M. E. Olszewski, and M. Sonka. 3-D segmentation and quantitative analysis of inner and puter walls of thrombotic abdominal aortic aneurysms. In Medical Imaging 2008: Physiology, Function, and Structure from Medical Images, vol. 6916, p. 691626. International Society for Optics and Photonics, 2008.

L. Borg, J. Sporring, E. B. Dam, V. A. Dahl, T. B. Dyrby, R. Feidenhans'I, A. B. Dahl, and J. Pingel. Mus-cle fibre morphology and microarchitecture in cerebral palsy patients obtained by 3D synchrotron X-ray computed tomography. Computers in Biology and Medicine, 107:265-269, 2019.

M. S. Sarabi, M. M. Khansari, J. Zhang, S. Kushner-Lenhoff, J. K. Gahm, Y. Qiao, A. H. Kashani, and Y. Shi. 3D Retinal Vessel Density Mapping With OCT-Angiography. IEEE Journal of Biomedical and Health Informatics, 24(12):3466-3479, 2020.

Petersen, M. Nielsen, P. Lo, Z. Saghir, A. Dirksen, and M. De Bruijne. Optimal graph based segmentation using flow lines with application to airway wall segmentation. In Biennial International Conference on Information Processing in Medical Imaging, 13pages. Springer, 2011.

Q. Song, J. Bai, M. K. Garvin, M. Sonka, J. M. Buatti, and X. Wu. Optimal multiple surface segmentation with shape and context priors. IEEE transactions on medical imaging 2013, 32(2):376-386, 2012.

S. Sedai, D. Mahapatra, S. Hewavitharanage, S. Maetschke, and R. Garnavi. Semi-supervised segmen-tation of optic cup in retinal fundus images using variational autoencoder. In International Conference on Medical Image Computing and Computer-Assisted Intervention, pp. 75-82. Springer, 2017.

S. Sun, M. Sonka, and R. R. Beichel. Graph-based IVUS segmentation with efficient computer-aided refinement. IEEE transactions on medical imaging, 32(8):1536-1549, 2013.

T. K. Redd, S. Read-Brown, D. Choi, T. R. Yackel, D. C. Tu, and M. F. Chiang. Electronic health record impact on productivity and efficiency in an academic pediatric ophthalmology practice. Journal of American Association for Pediatric Ophthalmology and Strabismus, 18(6):584-589, 2014.

T. R. Mackie, E. F. Jackson, and M. Giger. Opportunities and challenges to utilization of quantitative imag-ing: Report of the AAPM practical big data workshop. Medical Physics, 45(10):e820-e828, 2018.

V. A. Robles, B. J. Antony, D. R. Koehn, M. G. Anderson, and M. K. Garvin. 3D graph-based automated segmentation of corneal layers in anterior-segment optical coherence tomography images of mice. In Medical Imaging 2014: Biomedical Applications in Molecular, Structural, and Functional Imaging, vol. 9038, p. 90380F-1 to F-7. International.

X. Chen, Y. Hu, Z. Zhang, B. Wang, L. Zhang, F. Shi, X. Chen, and X. Jiang. A graph-based approach to automated EUS image layer segmentation and abnormal region detection. Neurocomputing, 336:79-91, 2019.

X. Sui, Y. Zheng, B. Wei, H. Bi, J. Wu, X. Pan, Y. Yin, and S. Zhang. Choroid segmentation from Optical Coherence Tomography with graph-edge weights learned from deep convolutional neural networks. Neurocomputing, 237:332-341, 2017.

Y. He, A. Carass, Y. Liu, B. M. Jedynak, S. D. Solomon, S. Saidha, P. A. Calabresi, and J. L. Prince. Structured layer surface segmentation for retina OCT using fully convolutional regression networks. Medical Image Analysis, 68:101856, 2021.

Y. LeCun, Y. Bengio et al., "Convolutional networks for images, speech, and time series," The handbook of brain theory and neural networks, vol. 3361, No. 10, p. 1995, 1995.

Z. Wu, H. Bogunovic', R. Asgari, U. Schmidt-Erfurth, and R. H. Guymer. Predicting Progression of Age-Related Macular Degeneration Using OCT and Fundus Photography. Ophthalmology Retina, 5(2):118-125, 2021.

Z.-H. Zhou. A brief introduction to weakly supervised learning. National Science Review, 5(1):44-53, 2017.

X. Wu and D. Z. Chen, "Optimal net surface problems with applications," in International Colloquium on Automata, Languages, and Programming. Springer, 2002, pp. 1029-1042.

P. A. Dufour, L. Ceklic, H. Abdillahi, S. Schroder, S. De Dzanet, U. Wolf-Schnurrbusch, and J. Kowal. Graph-based multi-surface segmentation of OCT data using trained hard and soft constraints. IEEE transactions on medical Imaging, 32(3):531-543, 2012.

P. Hua, Q. Song, M. Sonka, E. A. Hoffman, and J. M. Reinhardt. Segmentation of pathological and diseased lung issue in CT images using a graph-search algorithm. In 2011 IEEE International Symposium on Biomedical Imaging: From Nano to Macro, pp. 2072-2075. IEEE, 2011.

P. Marquez Neila, M. Salzmann, and P. Fua. Imposing Hard Constraints on Deep Networks: Promises and Limitations. In CVPR Workshop on Negative Results in Computer Vision, 2017.

P. T. Choi, K. C. Lam, and L. M. Lui. FLASH: Fast landmark aligned spherical harmonic parameterization for genus-0 closed brain surfaces. SIAM Journal on Imaging Sciences, 8(1):67-94, 2015.

P. Wang, L. Liu, C. Shen, Z. Huang, A. van den Hengel, and H. Tao Shen, "Multi-attention network for one shot earning," in Proceedings of the IEEE Conference on Computer Vision and Pattern Recognition, 2017, pp. 2721-2729.

Q. Chen, S. Niu, W. Fang, Y. Shuai, W. Fan, S. Yuan, and Q. Liu. Automated choroid segmentation of three-dimensional SD-OCT images by incorporating EDI-OCT images. Computer Methods and Programs in Biomedicine, 158:161-171, 2018.

Q. Hou, D. Massiceti, p. K. Dokania, Y. Wei, M.-M. Cheng, and P. H. S. Torr. Bottom-Up Top-Down Cues for Weakly-Supervised Semantic Segmentation. In M. Pelillo and E. Hancock, editors, Energy Minimization Methods in Computer Vision and Pattern Recognition, pp. 263-277, Cham, 2018. Springer International Publishing.

Q. Song, J. Bai, M. K. Garvin, M. Sonka, J. M. Buatti, and X. Wu, "Optimal multiple surface segmentation with shape and context priors," IEEE transactions on medical imaging, vol. 32, No. 2, pp. 376-386, 2013.

Q. Song, M. Chen, J. Bai, M. Sonka, and X. Wu. Surface-Region Context in Optimal Multi-object Graph-Based Segmentation: Robust Delineation of Pulmonary Tumors. In G. Szekely and H. Hahn, editors, Information Processing In Medical Imaging, vol. 6801 of Lecture Notes in Computer Science, pp. 61-72. Springer Berlin / Heidelberg, 2011. PMC3158678.

Q. Song, X. Wu, Y. Liu, M. Smith, J. Buatti, and M. Sonka. Optimal graph search segmentation using arc-weighted graph for simultaneous surface detection of bladder and prostate. In International Conference on Medical Image Computing and Computer-Assisted Intervention, pp. 827-835. Springer, 2009.

R. Geirhos, P. Rubisch, C. Michaelis, M. Bethge, F. A. Wichmann, and W. Brendel. ImageNet-trained CNNs are biased towards texture; increasing shape bias improves accuracy and robustness. In Seventh International Conference on Learning Representations, ICLR 2019, 2019.

R. Hu, P. Dollar, K. He, T. Darrell, and R. Girshick. Learning to Segment Every Thing. In 2018 IEEE/CVF Conference on Computer Vision and Pattern Recognition, pp. 4233-4241, 2018.

R. Mottaghi, X. Chen, X. Liu, N.-G. Cho, S.-W. Lee, S. Fidler, R. Urtasun, and A. Yuille. The role of context for object detection and semantic segmentation in the wild. In Proceedings of the IEEE Conference on Computer Vision and Pattern Recognition, pp. 891-898, 2014.

R. R. Beichel and Y. Wang. Computer-aided lymph node segmentation in volumetric CT data. Medical physics, 39(9):5419-5428, 2012.

R. Vemulapalli, O. Tuzel, M.-Y. Liu, and R. Chellapa. Gaussian conditional random field network for se-mantic segmentation. In

(56) References Cited

OTHER PUBLICATIONS

Proceedings of the IEEE conference on computer vision and pattern recognition, pp. 3224-3233, 2016.
S. Balocco, C. Gatta, F. Ciompi, A. Wahle, P. Radeva, S. Carlier, G. Unal, E. Sanidas, J. Mauri, X. Carillo et al., "Standardized evaluation methodology and reference database for evaluating ivus image segmentation," Comput Med Imaging Graph, vol. 38, No. 2, pp. 70-90, 2014.
S. Farsiu, S. J. Chiu, R. V. O'Connell, F. A. Folgar, E. Yuan, J. A. Izatt, C. A. Toth, A.-R. E. D. S. . A. S. D. O. C. T. S. Group et al., "Quantitative classification of eyes with and without intermediate age-related macular degeneration using optical coherence tomography," Ophthalmology, vol. 121, No. 1, pp. 162-172, 2014.
S. Kwak, S. Hong, and B. Han. Weakly Supervised Semantic Segmentation Using Superpixel Pooling Network. In S. P. Singh and S. Markovitch, editors, Proceedings of the Thirty-First AAAI Conference on Artificial Intelligence, Feb. 4-9, 2017, San Francisco, California, USA, pp. 4111-4117. AAAI Press, 2017.
S. Laine and T. Aila. Temporal ensembling for semi-supervised learning. arXiv preprint arXiv: 1610.02242, 2017.
S. Li, C. Zhang, and X. He. Shape-Aware Semi-supervised 3D Semantic Segmentation for Medical Images. In A. L. Martel, P. Abolmaesumi, D. Stoyanov, D. Mateus, M. A. Zuluaga, S. K. Zhou, D. Racoceanu, and L. Joskowicz, editors, Medical Image Computing and Computer Assisted Intervention—MICCAI 2020, pp. 552-561, Cham, 2020. Springer International Publishing.
S. Park, W. Hwang, and K.-H. Jung. Semi-Supervised Reinforced Active Learning for Pulmonary Nodule Detection in Chest X-rays. In 1st Conference on Medical Imaging with Deep Learning (MIDL 2018), 2018.
S. Sun, M. Sonka, and R. R. Beichel. Lung segmentation refinement based on optimal surface find-ing utilizing a hybrid desktop/virtual reality user interface. Computerized Medical Imaging and Graphics, 37(1):15-27, 2013.
S. Z. Li. Markov random field models in computer vision. In European conference on computer vision, pp. 361-370. Springer, 1994.
S. Zheng, S. Jayasumana, B. Romera-Paredes, V. Vineet, Z. Su, D. Du, C. Huang, and P. H. Torr. Condi-tional random fields as recurrent neural networks. In Proceedings of the IEEE international conference on computer vision, pp. 1529-1537, 2015.
V. Gulshan, L. Peng, M. Coram, M. C. Stumpe, D. Wu, A. Narayanaswamy, S. Venugopalan, K. Widner, T. Madams, J. Cuadros, et al. Development and validation of a deep learning algorithm for detection of diabetic retinopathy in retinal fundus photographs. Jama, 316(22):2402-2410, 2016.
V. Kulharia, S. Chandra, A. Agrawal, P. Torr, and A. Tyagi. Box2Seg: Attention Weighted Loss and Dis-criminative Feature Learning for Weakly Supervised Segmentation. In A. Vedaldi, H. Bischof, T. Brox, and J.-M. Frahm, editors, Computer Vision—ECCV 2020, pp. 290-308, Cham, 2020. Springer International Publishing.
W. Bai, O. Oktay, M. Sinclair, H. Suzuki, M. Rajchl, G. Tarroni, B. Glocker, A. King, P. M. Matthews, and D. Rueckert. Semi-supervised learning for network-based cardiac MR image segmentation. In International Conference on Medical Image Computing and Computer-Assisted Intervention, pp. 253-260. Springer, 2017.
W. Chen, X. Zheng, J. Ke, N. Lei, Z. Luo, and X. Gu. Quadrilateral mesh generation I: Metric based method. Computer Methods in Applied Mechanics and Engineering, 356:652-668, 2019.
X. Chen, L. Zhang, E. H. Sohn, K. Lee, M. Niemeijer, J. Chen, M. Sonka, and M. D. Abramoff. Quantification of external limiting membrane disruption caused by diabetic macular edema from SD-OCT. Investigative ophthalmology & visual science, 53(13):8042-8048, 2012.
X. Chen, M. Niemeijer, L. Zhang, K. Lee, M. D. Abramoff, and M. Sonka. Three-dimensional segmenta-tion of fluid- associated abnormalities in retinal OCT: probability constrained graph-search-graph-cut. IEEE transactions on medical maging, 31(8):1521-1531, 2012.
X. Li, L. Yu, H. Chen, C.-W. Fu, L. Xing, and P.-A. Heng. Transformation-Consistent Self-Ensembling Model for Semisupervised Medical Image Segmentation. IEEE Transactions on Neural Networks and Learning Systems, 32(2):523-534, 2021.
X. Liu, D. Z. Chen, M. H. Tawhai, X. Wu, E. A. Hoffman, and M. Sonka. Optimal graph search based segmentation of airway tree double surfaces across bifurcations. IEEE transactions on medical imaging, 32(3):493-510, 2012.
X. Wang, S. You, X. Li, and H. Ma. Weakly-Supervised Semantic Segmentation by Iteratively Mining Common Object Features. In 2018 IEEE/CVF Conference on Computer Vision and Pattern Recognition, pp. 1354-1362, 2018.
X. Xu, J. M. Reinhardt, Q. Hu, B. Bakall, P. S. Tlucek, G. Bertelsen, and M. D. Abramoff. Retinal vessel width measurement at branchings using an improved electric field theory-based graph approach. PloS one, 7(11):e49668, 2012.
X. Zhang, J. Tian, K. Deng, Y. Wu, and X. Li. Automatic liver segmentation using a statistical shape model with optimal surface detection. IEEE Transactions on Biomedical Engineering, 57(10):2622-2626, 2010.
X. Zhao, S. Liang, and Y. Wei. Pseudo Mask Augmented Object Detection. In 2018 IEEE/CVF Conference on Computer Vision and Pattern Recognition, pp. 4061-4070, 2018.
Y. M. Haidar, O. Moshtaghi, H. Mahboubi, Y. Ghavami, K. Ziai, H. Hojat, W. B. Armstrong, and H. R. Djalilian. Association between electronic medical record implementation and otolaryngologist productivity in the ambulatory setting. JAMA Otolaryngology-Head & Neck Surgery, 143(1):20-24, 2017.
Y. Yin, S. V. Fotin, S. Periaswamy, J. Kunz, H. Haldankar, N. Muradyan, B. Turkbey, and P. Choyke. Fully automated BD prostate central gland segmentation in MR images: a LOGISMOS based approach. In Medical Imaging 2012: Image Processing, vol. 8314, p. 83143B. International Society for Optics and Photonics, 2012.
Y. Yin, X. Zhang, R. Williams, X. Wu, D. D. Anderson, and M. Sonka, "Logismoslayered optimal graph image segmentation of multiple objects and surfaces: cartilage segmentation in the knee joint," IEEE transactions on medical maging, vol. 29, No. 12, pp. 2023-2037, 2010.
Y. Zheng, B. Georgescu, F. Vega-Higuera, and D. Comaniciu. Left ventricle endocardium segmentation for cardiac CT vols. using an optimal smooth surface. In Medical Imaging 2009: Image Processing, vol. 7259, p. 72593V. International Society for Optics and Photonics, 2009.
Z. Chen, M. Pazdernik, H. Zhang, A. Wahle, Z. Guo, H. Bedanova, J. Kautzner, V. Melenovsky, T. Kovarnik, and M. Sonka. Quantitative 3D Analysis of Coronary Wall Morphology in Heart Transplant Patients: OCT-Assessed Cardiac Allograft Vasculopathy Progression. Medical Image Analysis, 50:95-105, 2018.
Z. Hu, M. D. Abramoff, Y. H. Kwon, K. Lee, and M. K. Garvin. Automated segmentation of neural canal opening and optic cup in 3D spectral optical coherence tomography volumes of the optic nerve head. Investigative ophthalmology & visual science, 51(11):5708-5717, 2010.
Z. Hu, X. Wu, Y. Ouyang, Y. Ouyang, and S. R. Sadda. Semiautomated segmentation of the choroid in spectral-domain optical coherence tomography volume scans. Investigative ophthalmology & visual science, 54(3):1722-1729, 2013.
Z. Hu, X. Wu, A. Hariri, and S. R. Sadda. Multiple layer segmentation and analysis in three-dimensional spectral-domain optical coherence tomography volume scans. Journal of biomedical optics, 18(7):076006 1-8, 2013.
Z. Huang, X. Wang, J. Wang, W. Liu, and J. Wang. Weakly-Supervised Semantic Segmentation Network with Deep Seeded Region Growing. In 2018 IEEE/CVF Conference on Computer Vision and Pattern Recognition, pp. 7014-7023, 2018.
Z. Tian, L. Liu, Z. Zhang, and B. Fei. PSNet: prostate segmentation on MRI based on a convolutional neural network. Journal of Medical Imaging, 5(2):021208, 2018.
Z. Tian, L. Liu, Z. Zhang, J. Xue, and B. Fei. A supervoxel-based segmentation method for prostate MR images. Medical physics, 44(2):558-569, 2017.
Z. Wang, H.-C. Lee, O. O. Ahsen, K. Liang, M. Figueiredo, Q. Huang, J. G. Fujimoto, and H. Mashimo. Computer-Aided Analysis

(56) References Cited

OTHER PUBLICATIONS of Gland-Like Subsurface Hyposcattering Structures in Barrett's Esophagus Us-ing Optical Coherence Tomography. Applied Sciences, 8(12), 2018.

Z. Wu, X. Jiang, N. Zheng, Y. Liu, and D. Cheng. Exact solution to median surface problem using 3D graph search and application to parameter space exploration. Pattern Recognition, 48(2):380-390, 2015.

Z. Yu, Y. Zhuge, H. Lu, and L. Zhang. Joint Learning of Saliency Detection and Weakly Supervised Se-mantic Segmentation. In 2019 IEEE/CVF International Conference on Computer Vision (ICCV), pp. 7222-7232, 2019.

I. Oguz, H. Zhang, A. Rumple, and M. Sonka. RATS: rapid automatic tissue segmentation in rodent brain MRI. Journal of neuroscience methods, 221:175-182, 2014.

Internet Brain Segmentation Repository. URLhttp://www.nitrc.org/projects/ibsr. Accessed: May 30, 2021.

J. Bae and W. E. Encinosa. National estimates of the impact of electronic health records on the workload of primary care physicians. BMC health services research, 16(1):172, 2016.

J. Bai, A. Shah, and X. Wu. Optimal multi-object segmentation with novel gradient vector flow based shape priors. Computerized Medical Imaging and Graphics, 69:96-111, 2018.

J. Cai, L. Lu, Y. Xie, F. Xing, and L. Yang. Pancreas segmentation in MRI using graph-based decision fusion on convolutional neural networks. In International Conference on Medical Image Computing and Computer-Assisted Intervention, pp. 674-682. Springer, 2017.

J. Chua, B. Tan, M. Ke, F. Schwarzhans, C. Vass, D. Wong, M. E. Nongpiur, M. C. Wei Chua, X. Yao, C.-Y. Cheng, T. Aung, and L. Schmetterer. Diagnostic Ability of Individual Macular Layers by Spectral-Domain OCT in Different Stages of Glaucoma. Ophthalmology Glaucoma, 3(5):314-326, 2020.

J. Chua, F. Schwarzhans, D. Q. Nguyen, Y. C. Tham, J. T. Sia, C. Lim, S. Mathijia, C. Cheung, A. Tin, G. Fischer, C.-Y. Cheng, C. Vass, and L. Schmetterer. Compensation of retinal nerve fibre layer thickness as assessed using optical coherence tomography based on anatomical confounders. British Journal of Ophthalmology, 104(2):282-290, 2020.

J. Dai, K. He, and J. Sun. BoxSup: Exploiting Bounding Boxes to Supervise Convolutional Networks for Semantic Segmentation. In 2015 IEEE International Conference on Computer Vision (ICCV), pp. 1635-1643, 2015.

J. E. Iglesias, C.-Y. Liu, P. M. Thompson, and Z. Tu. Robust brain extraction across datasets and comparison with publicly available methods. IEEE transactions on medical imaging, 30(9):1617-1634, 2011.

J. G. Lam, B. S. Lee, and P. P. Chen. The effect of electronic health records adoption on patient visit volume at an academic ophthalmology department. BMC health services research, 16(1):7, 2015.

J. H. Acton, K. Ogino, Y. Akagi, J. M. Wild, and N. Yoshimura. Microperimetry and multimodal imaging in polypoidal choroidal vasculopathy. Scientific Reports, 8(1):15769, 2018.

J. Lee, E. Kim, S. Lee, J. Lee, and S. Yoon. Frame-to-Frame Aggregation of Active Regions in Web Videos for Weakly Supervised Semantic Segmentation. In 2019 IEEE/CVF International Conference on Computer Vision (ICCV), pp. 6807-6817, 2019.

J. Long, E. Shelhamer, and T. Darrell, "Fully convolutional networks for semantic segmentation," in CVPR 2015, 2015, pp. 3431-3440.

J. Oliveira, S. Pereira, L. Gonçalves, M. Ferreira, and C. A. Silva. Multi-surface segmentation of OCT images with AMD using sparse high order potentials. Biomed. Opt. Express, 8(1):281-297, Jan. 2017.

J. Petersen, A. M. Arias-Lorza, R. Selvan, D. Bos, A. van der Lugt, J. H. Pedersen, M. Nielsen, and M. de Bruijne. Increasing Accuracy of Optimal Surfaces Using Min-Marginal Energies. IEEE Transactions on Medical Imaging, 38(7):1559-1568, 2019.

J. Snell, K. Swersky, and R. Zemel, "Prototypical networks for few-shot learning," in Advances in Neural Information Processing Systems, 2017, pp. 4077-4087.

J. Tian, B. Varga, G. M. Somfai, W.-H. Lee, W. E. Smiddy, and D. Cabrera DeBuc. Real-Time Automatic Segmentation of Optical Coherence Tomography Volume Data of the Macular Region. PLOS ONE, 10(8):1-20, Aug. 2015.

J.-K. Wang, R. H. Kardon, M. J. Kupersmith, and M. K. Garvin. Automated quantification of volumetric optic disc swelling in papilledema using spectral-domain optical coherence tomography. Investigative ophthal-mology & visual science, 53(7):4069-4075, 2012.

K. Lee, M. Niemeijer, M. K. Garvin, Y. H. Kwon, M. Sonka, and M. D. Abramoff. Segmentation of the optic disc in 3-D Oct scans of the optic nerve head. IEEE transactions on medical imaging, 29(1):159-168, 2009.

K. Lee, R. K. Johnson, Y. Yin, A. Wahle, M. E. Olszewski, T. D. Scholz, and M. Sonka. Three-dimensional thrombus segmentation in abdominal aortic aneurysms using graph search based on a triangular mesh. Computers in biology and medicine, 40(3):271-278, 2010.

K. Li, X. Wu, D. Z. Chen, and M. Sonka, "Optimal surface segmentation in volumetric images—a graph-theoretic approach," IEEE Trans Pattern Anal Mach Intell, vol. 28, No. 1, pp. 119-134, 2006.

K. Yu, F. Shi, E. Gao, W. Zhu, H. Chen, and X. Chen. Shared-hole graph search with adaptive constraints for 3D optic herve head optical coherence tomography image segmentation. Biomed. Opt. Express, 9(3):962-983, Mar. 2018.

L. Bekalo, S. Niu, X. He, P. Li, I. P. Okuwobi, C. Yu, W. Fan, S. Yuan, and Q. Chen. Automated 3-D Retinal Layer Segmentation From SD-OCT Images With Neurosensory Retinal Detachment. IEEE Access, 7:14894-14907, 2019.

L. Gu, Y. Zheng, R. Bise, I. Sato, N. Imanishi, and S. Aiso. Semi-supervised learning for biomedical image segmentation via forest oriented super pixels (voxels). In International Conference on Medical Image Computing and Computer-Assisted Intervention, pp. 702-710. Springer, 2017.

Qi, K. Zheng, X. Li, Q. Feng, Z. Chen, and W. Chen. Automatic three-dimensional segmentation of endoscopic airway OCT images. Biomed. Opt. Express, 10(2):642-656, Feb. 2019.

L. Yang, Y. Zhang, J. Chen, S. Zhang, and D. Z. Chen. Suggestive annotation: A deep active learning framework for biomedical image segmentation. In International conference on medical image computing and computer-assisted Intervention, pp. 399-407. Springer, 2017.

Yu, S. Wang, X. Li, C. Fu, and P. Heng. Uncertainty-Aware Self-ensembling Model for Semi-supervised 3D Left Atrium Segmentation. In D. Shen, T. Liu, T. M. Peters, L. H. Staib, C. Essert, S. Zhou, P. Yap, and A. R. Khan, editors, Medical Image Computing and Computer Assisted Intervention—MICCAI 2019—22nd International Conference, Shenzhen, China, Oct. 13-17, 2019, Proceedings, Part II, vol. 11765 of Lecture Notes in Computer Science, pp. 605-613. Springer, 2019.

Zhang, G. H. Buitendijk, K. Lee, M. Sonka, H. Springelkamp, A. Hofman, J. R. Vingerling, R. F. Mullins, C. C. Klaver, and M. D. Abramoff. Validity of automated choroidal segmentation in SS-OCT and SD-OCT. Investigative ophthalmology & visual science, 56(5):3202-3211, 2015.

L. Zhang, H. Kong, S. Liu, T. Wang, S. Chen, and M. Sonka. Graph-based segmentation of abnormal nuclei in cervical cytology. Computerized Medical Imaging and Graphics, 56:38-48, 2017.

Zhou and X. Wu. Globally Optimal Surface Segmentation using Deep Learning with Learnable Smooth-ness Priors, 2020.

Zhou, Z. Zhong, A. Shah, and X. Wu, "3-d surface segmentation meets conditional random fields," arXiv preprint arXiv:1906.04714, 2019. 10 pages.

L.-C. Chen, G. Papandreou, I. Kokkinos, K. Murphy, and A. L. Yuille. Deeplab: Semantic image segmenta-tion with deep convolutional nets, atrous convolution, and fully connected crfs. IEEE transactions on pattern analysis and machine intelligence, 40(4):834-848, 2017.

(56) References Cited

OTHER PUBLICATIONS

L.-C. Chen, Y. Yang, J. Wang, W. Xu, and A. L. Yuille, "Attention to scale: Scale-aware semantic image segmentation," In Proceedings of the IEEE conference on computer vision and pattern recognition, 2016, pp. 3640-3649.

M. D. Abramoff, M. K. Garvin, and M. Sonka. Retinal imaging and image analysis. IEEE reviews in biomedical engineering, 3:169-208, 2010.

M. D. Abramoff, X. Wu, K. Lee, and L. Tang. Subvoxel accurate graph search using non-Euclidean graph space. PloS one, 9(10):e107763, 2014.

M. D. Kohli, R. M. Summers, and J. R. Geis. Medical image data and datasets in the era of machine lear-ing-whitepaper from the 2016 C-MIMI meeting dataset session. Journal of digital imaging, 30(4):392-399, 2017.

M. K. Garvin, M. D. Abr'amoff, R. Kardon, S. R. Russell, X. Wu, and M. Sonka, "Intraretinal layer segmentation of macular optical coherence tomography images using optimal 3-d graph search," IEEE transactions on medical maging, vol. 27, No. 10, pp. 1495-1505, 2008.

M. K. Garvin, M. D. Abramoff, X. Wu, S. R. Russell, T. L. Burns, and M. Sonka, "Automated 3-d intraretinal layer segmentation of macular spectral-domain optical coherence tomography images," IEEE Trans. Med. Imag, vol. 28, No. 9, pp. 1436-1447, 2009.

M. Rajchl, M. C. H. Lee, O. Oktay, K. Kamnitsas, J. Passerat-Palmbach, W. Bai, M. Damodaram, M. A. Rutherford, J. V. Hajnal, B. Kainz, and D. Rueckert. DeepCut: Object Segmentation From Bounding Box Annotations Using Convolutional Neural Networks. IEEE Transactions on Medical Imaging, 36(2):674-683, 2017.

M. Tang, A. Djelouah, F. Perazzi, Y. Boykov, and C. Schroers. Normalized Cut Loss for Weakly-Supervised CNN Segmentation. In 2018 IEEE/CVF Conference on Computer Vision and Pattern Recognition (CVPR), pp. 1818-1827, Los Alamitos, CA, USA, Jun. 2018. IEEE Computer Society.

M.-H. Cardinal, J. Meunier, G. Soulez, R. L. Maurice, ' E. Therasse, and G. Cloutier, "Intravascular ultrasound image segmentation: a three dimensional fast-marching method based on gray level distributions," IEEE Trans. Med. Imag, vol. 25, No. 5, pp. 590-601, 2006.

M.-H. R. Cardinal, G. Soulez, J.-C. Tardif, J. Meunier, and G. Cloutier, "Fast-marching segmentation of three- dimensional intravascular ultrasound images: A pre-and post-intervention study," Med. Phys., vol. 37, No. 7 Part1, pp. 3633-3647, 2010.

N. Jeppesen, A. N. Christensen, V. A. Dahl, and A. B. Dahl. Sparse Layered Graphs for Multi-Object Segmentation. In Proceedings of the IEEE/CVF Conference on Computer Vision and Pattern Recognition (CVPR), Jun. 2020. 12777-12785.

N. Lei, X. Zheng, Z. Luo, F. Luo, and X. Gu. Quadrilateral Mesh Generation II: Meromorphic Quartic Differentials and Abel-Jacobi Condition. arXiv preprint arXiv:1907.00216, 2019.

N. Papernot, P. McDaniel, X. Wu, S. Jha, and A. Swami, "Distillation as a defense to adversarial perturbations against deep neural networks," in 2016 IEEE Symposium on Security and Privacy (SP), 2016, pp. 582-597.

NCI-ISBI 2013 challenge: automated segmentation of prostate structures. https://wiki.cancerimagingarchive.net/ display/DOI/NCI-ISBI+2013+Challenge%3A+Automated+ Segmentation+of+Prostate+ Structures. Accessed: May 20, 2021.

O. Chapelle, B. Scholkopf, and A. Zien. Semi-supervised learning (Chapelle, O et al., eds .; 2006)[book reviews]. IEEE Transactions on Neural Networks, 20(3):542-542, 2009.

Ö. Çiçek, A. Abdulkadir, S. S. Lienkamp, T. Brox, and O. Ronneberger. 3D U-Net: Learning Dense Volu-metric Segmentation from Sparse Annotation. In S. Ourselin, L. Joskowicz, M. R. Sabuncu, G. Unal, and W. Wells, editors, Medical Image Computing and Computer-Assisted Intervention—MICCAI 2016, pp. 424-432, Cham, 2016. Springer International Publishing.

O. Ronneberger, P. Fischer, and T. Brox, "U-net: Convolutional networks for biomedical image segmentation," in MICCAI 2015, 2015, pp. 234-241.

O. Vinyals, C. Blundell, T. Lillicrap, D. Wierstra et al., "Matching networks for one shot learning," in Advances in neural Information processing systems, 2016, pp. 3630-3638.

\* cited by examiner

MODEL-BASED DEEP LEARNING FOR GLOBALLY OPTIMAL SURFACE SEGMENTATION

RELATED APPLICATION

This application claims priority to U.S. Provisional Patent Application No. 63/047,100, filed Jul. 1, 2020, hereby incorporated by reference in its entirety.

GRANT REFERENCE

This invention was made with government support under CCF-1733742 awarded by the National Science Foundation. The government has certain rights in the invention.

FIELD OF THE INVENTION

The present invention relates to image analysis. More particularly, but not exclusively, the present invention relates to quantitative medical image analysis by providing globally optimal segmentation using deep learning.

BACKGROUND

Automated surface segmentation is important and challenging in many medical image analysis applications. Recent deep learning based methods have been developed for various object segmentation tasks. Most of them can be a classification or region based approach, which may predict the probability of being target object or background for each voxel. One problem of such methods can be the lack of a topology guarantee for segmented objects, and usually post processing is needed to infer the boundary surface of the object. Here, a novel model with a surface based U-net backbone followed by a learnable surface smoothing block provides for tackling the surface segmentation problem with end-to-end training. The proposed methods may require less training data than the state-of-the-art deep learning methods. The proposed methods are applicable to both 2-D and 3-D.

Therefore, what is needed are improved methods and systems for image analysis, including quantitative medical image analysis and especially globally optimal segmentation of images.

SUMMARY

Therefore, it is a primary object, feature, or advantage of the present invention to improve over the state of the art.

It is a further object, feature, or advantage to provide for quantitative medical image analysis.

It is a still further object, feature, or advantage of the present invention to automate segmentation of objects or equivalently boundary in quantitative image analysis.

It is a further object, feature, or advantage to provide surface segmentation which can achieve guaranteed globally optimal solutions using deep learning.

It is a still further object, feature, or advantage to provide a methodology for surface segmentation which does not require post processing.

Another object, feature, or advantage is to provide segmentation using a surface-based model It is a still further object, feature, or advantage of the present invention to provide a method that can be used for simultaneously detecting multiple interacting surfaces of global optimality with respect to the energy function designed for the target surfaces with geometric constraints, which can define the surface smoothness and interrelations.

Yet another object, feature, or advantage is to provide a methodology which encodes the surface monotonicity prior within the construction, which can enable more consistent image patches and easier learning for deep networks and post processing is not necessary.

Another object, feature, or advantage is to provide a framework for segmentation which provides guaranteed optimal quality segmentation of complex objects with respect to the underlying graph segmentation model.

Yet another object, feature, or advantage is to provide for the enforcement of desired/required critical priors (e.g. shape, surface smoothness, and mutual surface interaction) in segmentation, both globally and locally.

Yet another object, feature, or advantage is to provide sub-pixel segmentation accuracy.

A further object, feature, or advantage is the unifications of strengths of deep learning such as through the use of CNNs and a graph segmentation model into a single framework in order to transform medical image segmentation. Thus, the graph segmentation model may be armed with the power of deep learning such as CNNs to learn model features and deep learning methods such as CNNs gain the capability to capture global properties such as object shape and contextual information.

A still further object, feature, or advantage if to provide for globally optimal segmentation.

Another object, feature, or advantage is to provide for integration of a graph segmentation model into deep learning to enable training the segmentation network with substantially reduced annotations which may be further leveraged with semi-supervised learning and weakly supervised learning.

A further object, feature, or advantage is to overcome the problems of annotation scarcity in deep learning.

Yet another object, feature, or advantage is to provide a single coherent and theoretically well-founded framework that is applicable to diverse application areas, facilitates highly automated clinically appropriate analysis of all clinically acquired images of analyzable-quality and thus facilitates broad adoption in precision medicine tasks in the clinic.

Another object, feature, or advantage is to provide an optimal surface segmentation framework which unifies deep learning and graph-based optimal surface segmentation models to greatly enhance the strengths of both while minimizing drawbacks of reach resulting in a fundamental methodology for globally optimal surface segmentation in medical imaging.

A further object, feature, or advantage is to develop and validate the MoDL segmentation framework, unifying two well-established algorithmic strategies—deep learning and graph-based optimal surface segmentation.

A still further object, feature, or advantage is to develop and validate weakly supervised and semi-supervised methods for the MoDL segmentation frame-work to reduce the demand of manual annotations by using both weakly-annotated and unlabeled image data.

Yet another object, feature, or advantage is to provide in healthcare-relevant applications, a MoDL segmentation method which improves segmentation performance in comparison with the state-of-the-art segmentation techniques.

Further objects, features, or advantages are to provide for addressing the burning question of scarce training data in medical imaging, improving automated quantitative image analysis, and transforming the translational research utility.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, an automated method for segmentation of multiple interacting surfaces is provided. The method includes receiving at a computing device an input image representing multiple interacting surfaces. The method further includes performing by the computing device image segmentation on the input image based on a graph surface segmentation model with deep learning. The model may provide for parameterizing surface cost functions in a graph model and using deep learning to learn parameters of the surface cost functions. The method may further provide for detecting multiple optimal surfaces by minimizing the total surface cost while explicitly enforcing the mutual surface interaction constraints. A layer of neural networks may be used in detecting the multiple optimal surfaces. The neural networks may include convolutional neural networks. The input image may be a two dimensional image, a three dimensional image, or a three dimensional volumetric image. The image may a biomedical image acquired from any number of different techniques including, but not limited to computed tomography and ultrasound.

According to another aspect, a first deep learning network configured for surface cost parameterization and a second deep learning network configured for learning surface smoothness and surface interaction parameters is provided. A third deep learning network configured for total surface cost minimization while explicitly enforcing the surface mutual interaction constraints is provided. The system receives an input image and processes the input image using at least one processor by applying the first deep learning network, the second deep learning network, and the second deep learning network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrated embodiments of the disclosure are described in detail below with reference to the attached drawing figures, which are incorporated by reference herein.

FIG. 17A, segmentation of 9 intraretinal surfaces in an SD-OCT image of BES dataset. FIG. 17B, segmentation results of lumen (blue) and media (orange) in an IVUS image.

BRIEF DESCRIPTION OF THE TABLES

Figure 1:
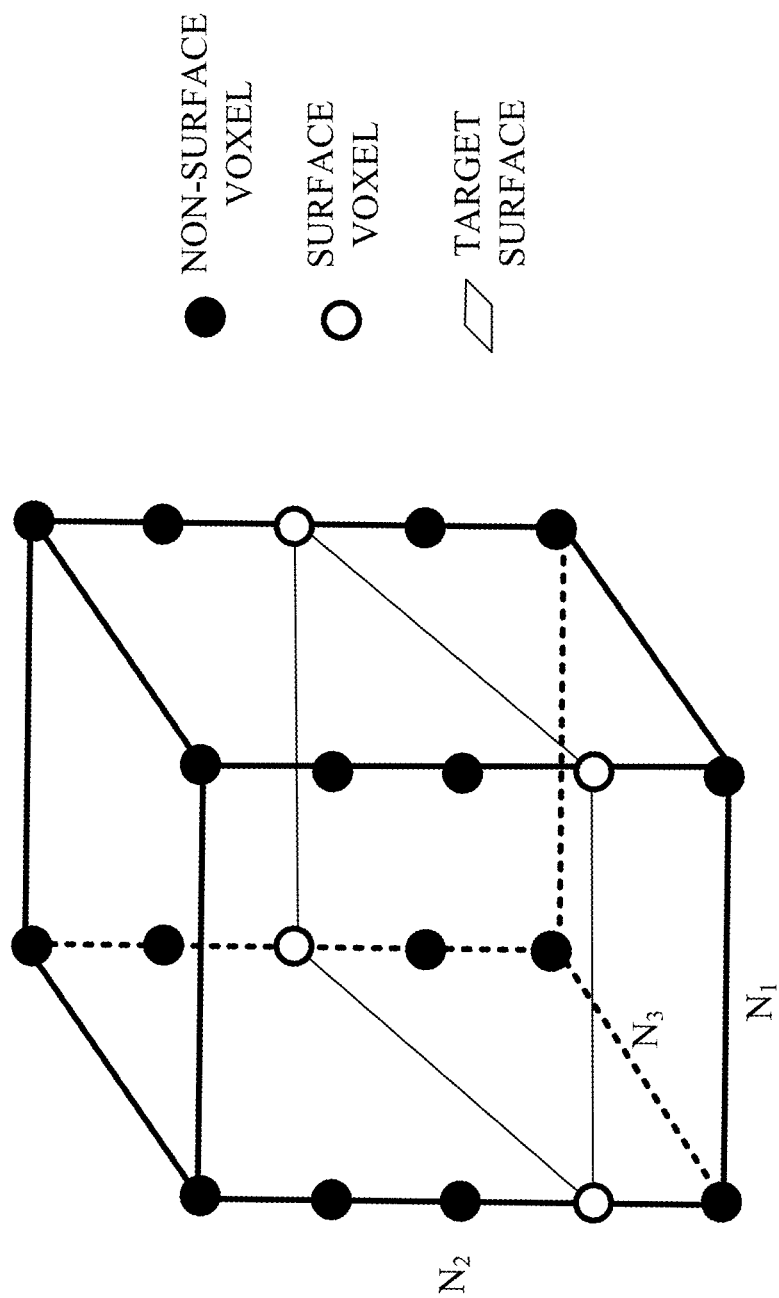
FIG. 1 provides a surface segmentation definition.

Illustrated embodiments of the disclosure are described in detail below with reference to the attached Tables, which are incorporated by reference herein, and where:

Table 1: Unsigned mean surface positioning errors (UMSP) for the results on the SD-OCT test dataset. The unit is in μm.

Table 2: Segmentation results comparison on the IVUS dataset. W/O: without SB; W/zero: using zero shape prior; W/learned: using learned shape prior. The best fully automation methods with respect to each metric are bold faced.

Table 3: Segmentation results on the IVUS dataset with different amount of training data. The proposed methods utilize surface-based U-net as backbones, which require less training data than the traditional region-based U-net. W/O: without SB; W/zero: using zero shape prior; W/learned: using learned shape prior.

Table 4: Inference computation time comparison on the IVUS dataset.

Table 5: Mean Absolute Surface Distance (MASD) and standard deviation in μm evaluated on Beijing Eye Study Dataset for segmenting 9 retinal surfaces. Depth resolution is 3.87 μm.

Table 6: Mean Absolute Surface Distance (MASD) and standard deviation in μm evaluated on JHU OCT Dataset for segmenting 9 retinal surfaces. Depth resolution is 3.9 μm. Bold font indicates the best result.

Table 7: Evaluation measurement and standard deviation on the IVUS data, comparing to VGG U-net [3] and the graph search method [17]. Bold indicates the best result in that column. Blank cells mean un-reported result in original paper.

Table 8: Comparison of MoDL-OSSeg with the DL Surface segmentation with respect to the unsigned mean surface positioning errors (UMSP) (mean±standard deviation) to the reference standard in voxels. Results are shown with both models trained on 100% and 10% of the training set, respectively.

DETAILED DESCRIPTION

A first section of this description is directed towards model-based deep learning for globally optimal surface segmentation. A second section of this description is directed towards globally optimal segmentation of mutually interacting surfaces using deep learning. A third section of this description is directed towards a further example of an optimal surface segmentation framework which unifies deep learning (DL) and graph-based optimal surface segmentation model to enhance the strengths of both while minimizing drawbacks of each, resulting in a fundamental methodology for globally optimal surface segmentation in medical imaging. A fourth section of this description provides an additional review of methods, apparatus, and systems and options and alternatives.

Section 1: Model-Based Deep Learning for Globally Optimal Surface Segmentation

Automated surface segmentation is important and challenging in many medical image analysis applications. Recent deep learning-based methods have been developed for various object segmentation tasks. Most of them are a classification or region-based approach, e.g. U-net, which predicts the probability of being target object or background for each voxel. One problem of those methods is lacking topology guarantee for segmented objects, and usually post processing is needed to infer the boundary surface of the object. Here, a novel model with a surface-based U-net backbone followed by a learnable surface smoothing block is proposed to tackle the surface segmentation problem with end-to-end training. To the best of our knowledge, this is the first study to learn smoothness priors end-to-end with CNN for direct surface segmentation with global optimality. Experiments carried out on Spectral Domain Optical Coherence Tomography (SD-OCT) retinal layer segmentation and Intravascular Ultrasound (IVUS) vessel wall segmentation demonstrated very promising results. Moreover, the proposed methods require less training data than the state-of-the art deep learning methods on these two datasets.

I. Introduction

Automated segmentation of objects or equivalently boundary surfaces plays a very important role in quantitative image analysis. In several years, deep learning-based method for semantic segmentation has become very popular in computer vision and medical imaging. The fully convolutional networks (FCN), and then U-net for medical image segmentation have been proposed. All these methods model the segmentation problem as a pixel-wise or region-based classification problem, in which each pixel is labeled as either target object or background.

On the other hand, one can also formulate semantic segmentation with a surface-based model, in which the boundary surface of the target object is computed directly. Apparently these two types of approaches are equivalent as the boundary surface can be computed from the labeled target volume, and vice versa. As one of the prominent surface based methods, Graph-Search (GS), has achieved great success, especially in medical imaging field, e.g. This method is capable of simultaneously detecting multiple interacting surfaces of global optimality with respect to the energy function designed for the target surfaces with geometric constraints, which define the surface smoothness and interrelations. It also enables sub-pixel accurate surface segmentation [10]. The method solves the surface segmentation problem by transforming it to compute a minimum s-t cut in a derived arc-weighted directed graph, which can be solved optimally with a low-order polynomial time complexity.

Although the region-based and surface-based approaches are equivalent in formulation, the surface-based approach still has two advantages in deep learning scenario. The first is that it encodes the surface monotonicity prior within the construction, which enables more consistent image patches and easier learning for deep networks and post processing is not necessary. The second is that surface-based deep networks may only require to learn features directly related to surfaces, on contrast to region-based networks, which need to consider all features related to each region of target objects. This is highly related to the attention model. Both merits may contribute to that surface-based networks require less training data, which is significantly helpful for medical imaging where scarcity of labeled data is common.

However, the advantages are accompanied with challenges, the main of which is the non-triviality to model the surface based segmentation using deep networks. Shah et al. first modeled the terrain-like surfaces segmentation as direct surface identification using regression. The network consists of an FCN followed by fully connected (FC) layers. The network is very light weighted, and no post processing is required. Surprisingly, the results are very promising. However, it is well known that U-net outperforms FCN because U-net has an additional expansive path such that features of high resolution can be learned and then better prediction accuracy can be achieved. To improve segmentation accuracy, however, it is not reasonable to concatenate a U-net with FC layers, as the invariance of feature maps in the original resolution is supposed to be much less than that in the low resolution, such that there would be much more chance that the fully-connected layers heavily overfit to the training data and to avoid this generally more training data are required. Zhou et al. proposed to combine a U-net with conditional random fields (CRFs) to segment surfaces directly in 3-D, however, three main drawbacks of which are: 1) the pre-training of U-net is treat as binary classification (surface or non-surface pixel) and therefore it is highly imbalanced, generally resulting noisy and unstable gradients even weighted cross entropy (WCE) utilized; 2) the WCE and the multinomial cross entropy (MCE) loss utilized for pre-training and fine tuning cannot consider the ordering information and may not be the best choice; 3) the method operates in discrete pixel space and cannot generate sub-pixel surface segmentation.

To resolve problems mentioned above, we propose to explicitly model the surface segmentation problem as a quadratic programming with a U-net as the backbone. This modeling enables end-to-end training of the whole network. Our contributions are in four folds: 1) The first time to parameterize the output of the U-net as Gaussians (the mean represents surface position prediction from the U-net and the standard deviation encodes the prediction confidence), which converts the description from the discrete to the continuous space that enables direct optimization on surface position and the usage of L1 or L2 surface position error loss, which takes the within ordering information of different surface positions into consideration; 2) The solving of the quadratic graph model has guaranteed global optimality as in GS; 3) The method works in the continuous space and enables sub-pixel segmentation; 4) The proposed method requires less training data, compared to common region-based U-net and FCN+FC networks.

II. Method

We first define the surface segmentation problem. A 3-D image can be viewed as a 3-D tensor $\mathcal{I}$. A terrain-like surface in is oriented and shown in FIG. 1. Let $N_1$, $N_2$ and $N_3$ denote the image sizes in three dimensions, respectively. Let all column index be a set $\Omega=\{(1, 1), (1, 2), \ldots, (N_1, N_3)\}$. The surface x is defined by $x_i \in [1, N_2]$, $\forall_i \in \Omega$. Thus, any feasible surface in intersects with each column exactly once. Generally, in surface segmentation, the problem is formulated as minimizing the energy function $E(x): \mathbb{R}^{N_1 \times N_3} \to \mathbb{R}$ $$E(x)=E_u(x)+E_p(x), \quad (1)$$

where the unary term $E_u$ is the energy when considering each column independently, and the pairwise energy term $E_p$ penalizes discontinuity of surface position among adjacent columns. The design of $E_u$ and $E_p$ will be detailed in Section II-A3.

A. Proposed Inference Pipeline

Figure 2:
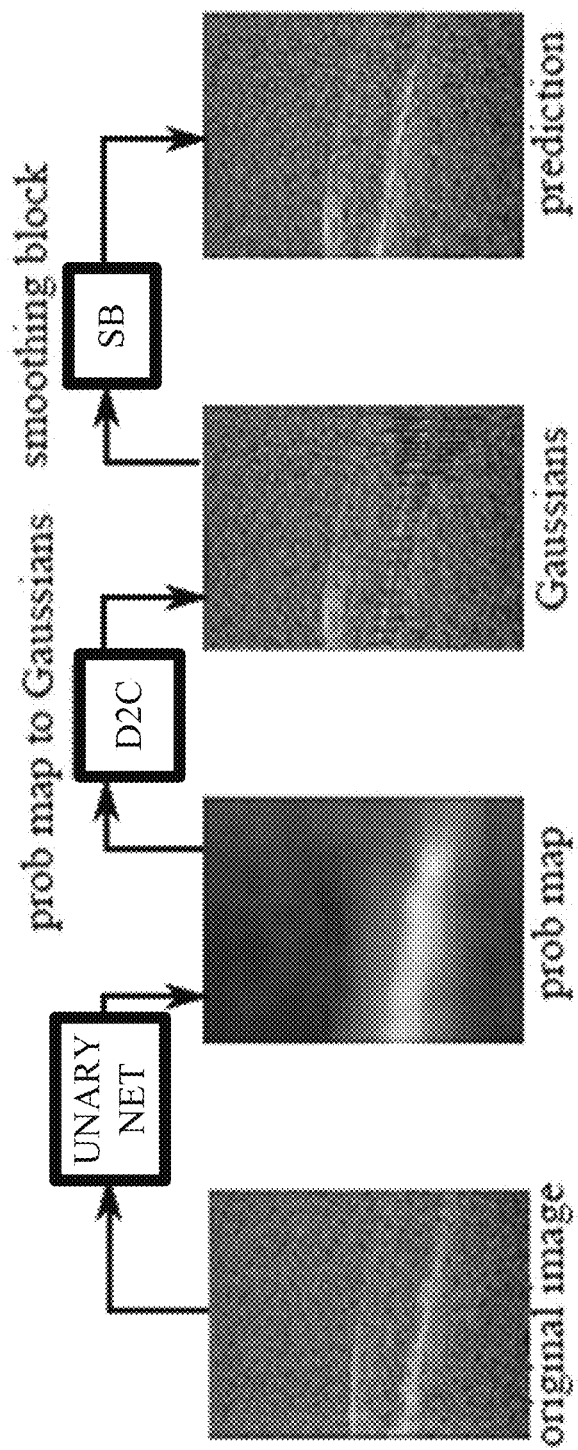
FIG. 2 illustrates an inference pipeline of the proposed methods.

One should note that the proposed method can be applied in both 2-D and 3-D. For the purpose of proof-of-concept and clear explanation, the detailed description of the proposed method and all experiments are done in 2-D, i.e. $N_3=1$ beforehand. The inference pipeline of the proposed method is demonstrated in FIG. 2. The trained unary net takes in the original image $\mathcal{I} \in \mathbb{R}^{N_2 \times N_1}$, and outputs the discrete probability map $P \in \mathbb{R}^{N_2 \times N_1}$. Ideally, for each image column, the probability for the target surface position is high, and it is gradually reduced on the positions away from the one on the surface, as demonstrated in FIG. 4. We thus propose a block to convert the discrete probability map P to a Gaussian parameterization $G \equiv (\gamma, \sigma) \in \mathbb{R}^{N_1 \times 2}$, where $\gamma_i$ specifies the mean surface position on each column i and $\sigma_i$ is the corresponding standard deviation. The Gaussian parameterization G is then fed into the trained smoothing block (SB), which incorporate the learned surface smoothness priors to infer the optimal target surface. Next, we detail the novel blocks in our deep optimal surface segmentation neural network.

Figure 3:
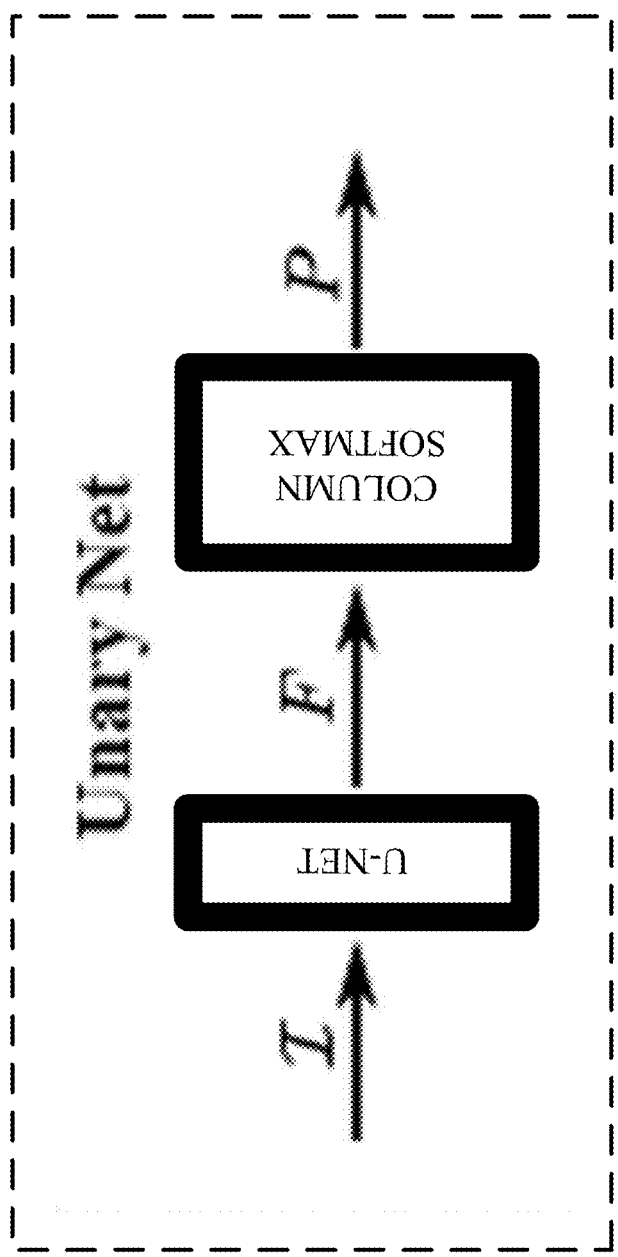
FIG. 3 illustrates the proposed unary net architecture.
Figure 4:
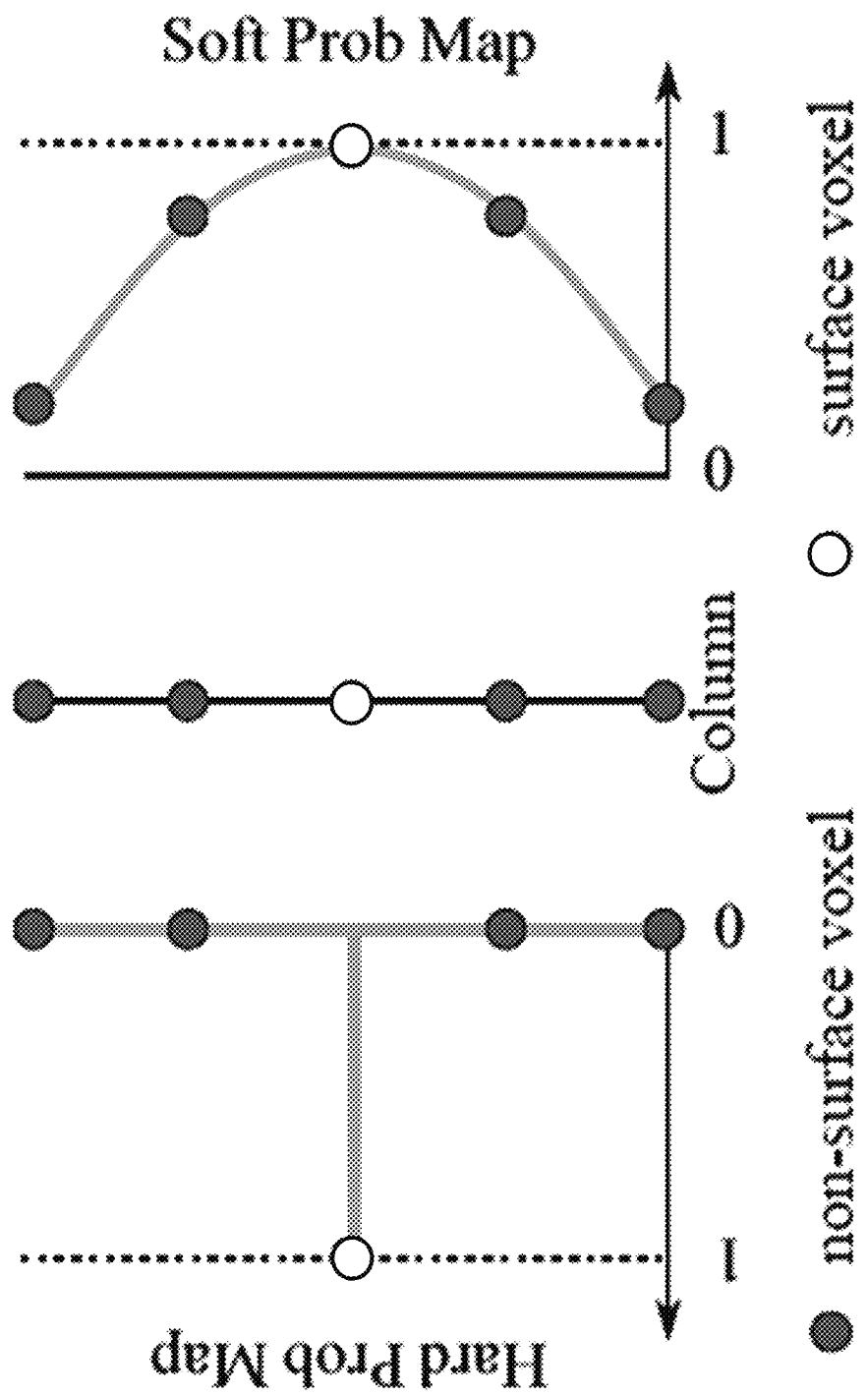
FIG. 4 illustrates a target hard surface probability map (left) and its relaxed soft surface possibility map (right) for one column.
Figure 5:
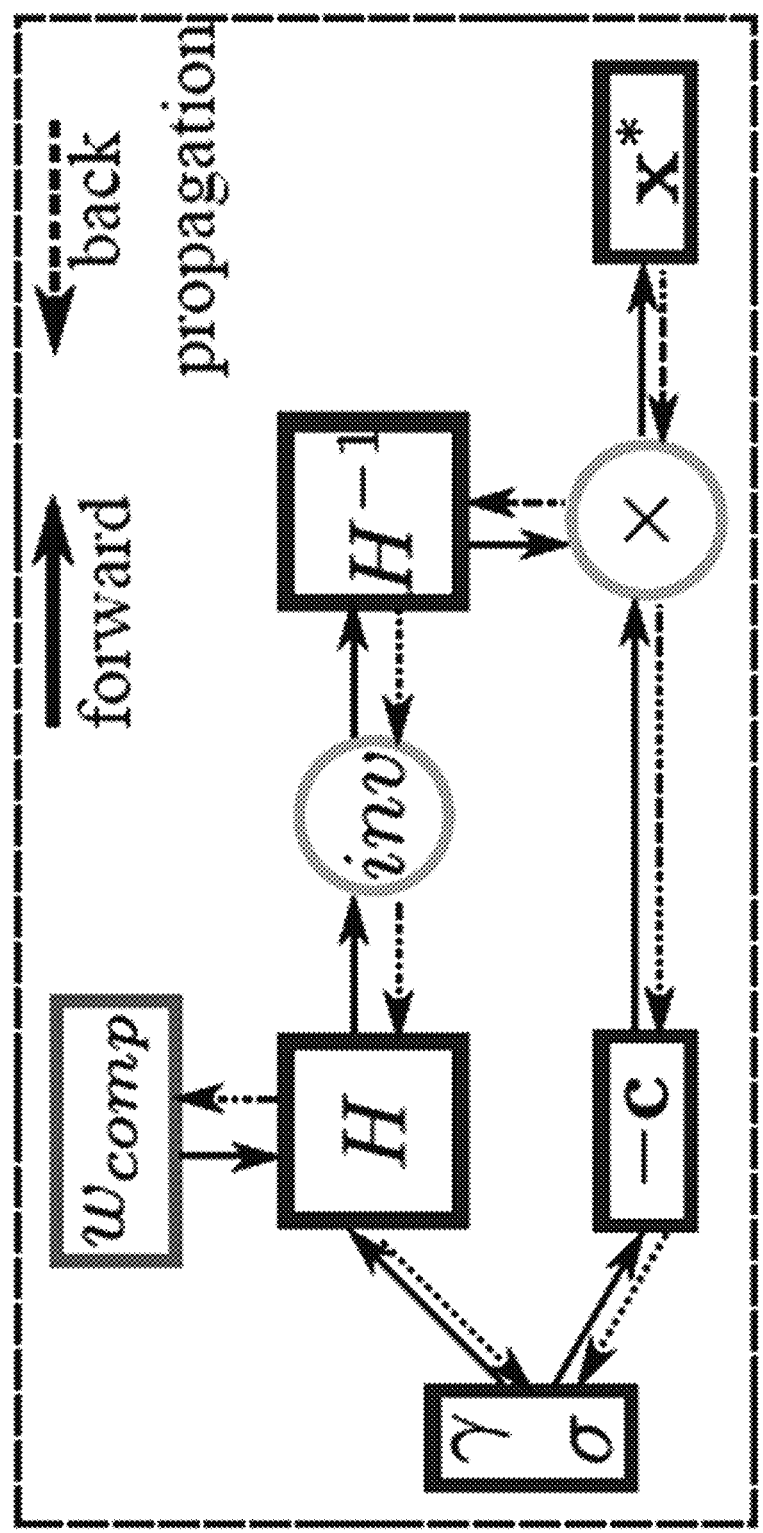
FIG. 5 illustrates the proposed SB architecture. Only one parameter $w_{comp}$ needs to be trained. For W/zero method, $d_{i,i+1}=0$, $\forall_i \in \{1, 2, \ldots, N_1-1\}$ and for W/learned method, there are additional inputs $d_{i,i+1}$, generated by the pair net taking the original image I as input, to construct the linear coefficient c. One should note that the pair net is pre-trained and kept frozen during the fine tuning of the whole network.

1) Unary Net: The proposed unary net is illustrated in FIG. 3. A common U-net architecture is utilized to generate the discrete probability map for the input $\mathcal{I} \in \mathbb{R}^{N_2 \times N_1}$. In the proposed method, the softmax layer works on each column, not on each pixel. The rational is that we assume the target surface intersects with each column by exactly once, and so the probabilities are normalized within each column. Also, we assume the unary net should output a Gaussian shaped probability map for each column, which mimics the Bayesian learning for each column and shares merits with boundary loss, knowledge distillation and distillation defense. To encourage the unary net outputs reasonable probability maps, the KullbackLeibler divergence (KLD) loss is utilized for the unary net pre-training. KLD is a measure of how one probability distribution is different from a reference probability distribution. It is equivalent to the Cross Entropy when the reference is a Kronecker delta function. We propose to relax the delta function to a Gaussian distribution such that the proposed D2C block can work properly, which is illustrated in FIG. 4.

2) D2C Block: The D2C block is basically designed to convert the discrete probability map of each column $P_i \in \mathbb{R}^{N_2}$ $\forall_i \in \{1, 2, \ldots, N_2\}$ which is output from unary net, to a continuous representation $G_i \equiv (\gamma_i, \sigma_i) \in \mathbb{R}^2$ (Gaussian is utilized in our design). This enables optimizing directly on the surface position and sub-pixel accuracy prediction. The proposed conversion is realized by fitting a continuous Gaussian function to the discrete probability map $P_i$, which can be thought as discrete samples of a continuous Gaussian probability density function.

Recall that one dimensional Gaussian function has the formula $$f(j) = A\exp\left(\frac{-(j-\mu)^2}{2\sigma^2}\right),$$

Where $j \in \mathbb{R}$ and then, $$\ln(f(j)) = \ln(A) + \frac{-(j-\mu)^2}{2\sigma^2}$$
$$= \ln(A) - \frac{\mu^2}{2\sigma^2} + \frac{2\mu j}{2\sigma^2} - \frac{j^2}{2\sigma^2}$$
$$= a + bj + cj^2$$

Where $$a = \ln(A) - \frac{\mu^2}{2\sigma^2}, \quad b = \ln(A) - \frac{\mu}{\sigma^2}, \quad c = -\frac{1}{2\sigma^2}.$$

In our setting, for each column, we have $N_2$ samples of $(j, f(j))$, where $j \in \mathbb{Z}^+$. We can define an error function namely $$\varepsilon = \Sigma_{j=1}^{N_2} f(j)^2 (\ln(f(j)) - (a + bj + cj^2))^3.$$

Then minimizing this weighted mean square error (MSE) $\varepsilon$, one can get the estimates of a, b, c by solving a set of three linear equations and then A, $\mu$, $\sigma$. The problem is very similar to least square problem. And the solution to a, b, c can be calculated by solving the following equations $$\begin{bmatrix} \sum f(j)^2 & \sum jf(j)^2 & \sum j^2 f(j)^2 \\ \sum jf(j)^2 & \sum j^2 f(j)^2 & \sum j^3 f(j)^2 \\ \sum j^2 f(j)^2 & \sum j^3 f(j)^2 & \sum j^4 f(j)^2 \end{bmatrix} \begin{bmatrix} a \\ b \\ c \end{bmatrix} = \begin{bmatrix} \sum f(j)^2 \ln(f(j)) \\ \sum jf(j)^2 \ln(f(j)) \\ \sum j^2 f(j)^2 \ln(f(j)) \end{bmatrix}.$$

Apparently, they have simple analytic solutions. In our implementation, a linear transform is utilized to normalize the probability map for each column to the range [0; 1], then we can ignore the magnitude A. As the computation of each column is independent, it is straightforward to be extended to 3-D.

3) Smoothing Block (SB): To integrate the surface segmentation model (Eqn. 1) with smoothness priors, we define the energy function $E(x): \mathbb{R}^{N_1} \to \mathbb{R}$ as $$E(x) = \Sigma_{i \in \Omega} \psi_i(x_i) + \Sigma_{i,j \in \Omega, (i,j) \in N} \psi_p(x_i, x_j) \quad (2),$$

where $\psi_u(x_i)$ is defined as $$\psi_u = \frac{(x_i - \gamma_i)^2}{2\sigma_i^2}$$

pairwise term $\psi_p(x_i, x_j)$ is defined as $$\psi_i(x_i, x_j) = w_{comp} \cdot (x_i - x_j - d_{i,j})^2 \quad (3),$$

where d is the "expected" surface position difference of two adjacent columns i and j, and N is the set of neighbor columns. For simplicity, the nearest neighbor pairs, i.e. $\mathcal{N} = \{(1,2), (2,3), \ldots, (N_1-1, N_1)\}$, are considered as the set of neighbor columns. The whole energy in Eqn. 2 can be reformulated as the standard quadratic form $$E(x) = \tfrac{1}{2} x^T H x + c^T x + \text{CONST.},$$

where the Hessian matrix has the form ($w_{comp}$ is abbreviated as w)

$$H = \begin{bmatrix} 2\omega + \frac{1}{\sigma_1^2} & -2\omega & 0 & 0 & 0 & 0 \\ -2\omega & 4\omega + \frac{1}{\sigma_2^2} & -2\omega & 0 & 0 & 0 \\ 0 & -2\omega & 4\omega + \frac{1}{\sigma_3^2} & -2\omega & 0 & 0 \\ & & & \cdots & & \\ 0 & & \cdots & 0 & -2\omega & 2\omega + \frac{1}{\sigma_{N_1}^2} \end{bmatrix}.$$

and the linear coefficient is formulated as $$c^T = \left[ -\frac{\gamma_1}{\sigma_1^2} - 2d_{1,2}, -\frac{\gamma_2}{\sigma_2^2} - 2(d_{2,3} - d_{1,2}), \right.$$
$$\left. \ldots, \frac{\gamma_i}{\sigma_i^2} - 2(d_{i,i+1} - d_{i-1,i}), \ldots, -\frac{\gamma_{N_1}}{\sigma_{N_1}^2} + 2d_{N_1-1, N_1} \right].$$

It can be proved that the Hessian matrix H is positive definite by using Gershgorin circle theorem and then the energy function is convex. The gradient is $\nabla = Hx + c$: Let the gradient to be zero, we have the global optimal solution $x^* = H^{-1} c$. Another advantage of the proposed energy formulation is that the optimal solution can be calculated in one step, i.e. we do not need to make use of a recurrent neural network (RNN) to implement SB. It is also straightforward to implement the smoothing block in 3-D.

To clarify the description, we list out notations for all our proposed methods as follows:

W/O: The proposed method without using smoothing block. The means of Gaussians or $\gamma \in \mathbb{R}^{N_1}$, outputted from D2C block, are treat as the final surface position predictions.

W/zero: The proposed method using smoothing block with all zeroes prior: $\forall (i,j) \in \mathbb{R}$. And the pairwise term weight $w_{comp}$ is learned from data. The drawback of the zero prior is that it is too "constrained", i.e. it can not handle surfaces with steep jumps and the generated surface may be over smoothed and not accurate enough.

W/learned: To remedy the problem of over "constrained" of W/zero, we also propose to learn the surface position difference $d_{i,j}$ with a dedicated pair net described in the following section.

Figure 6:
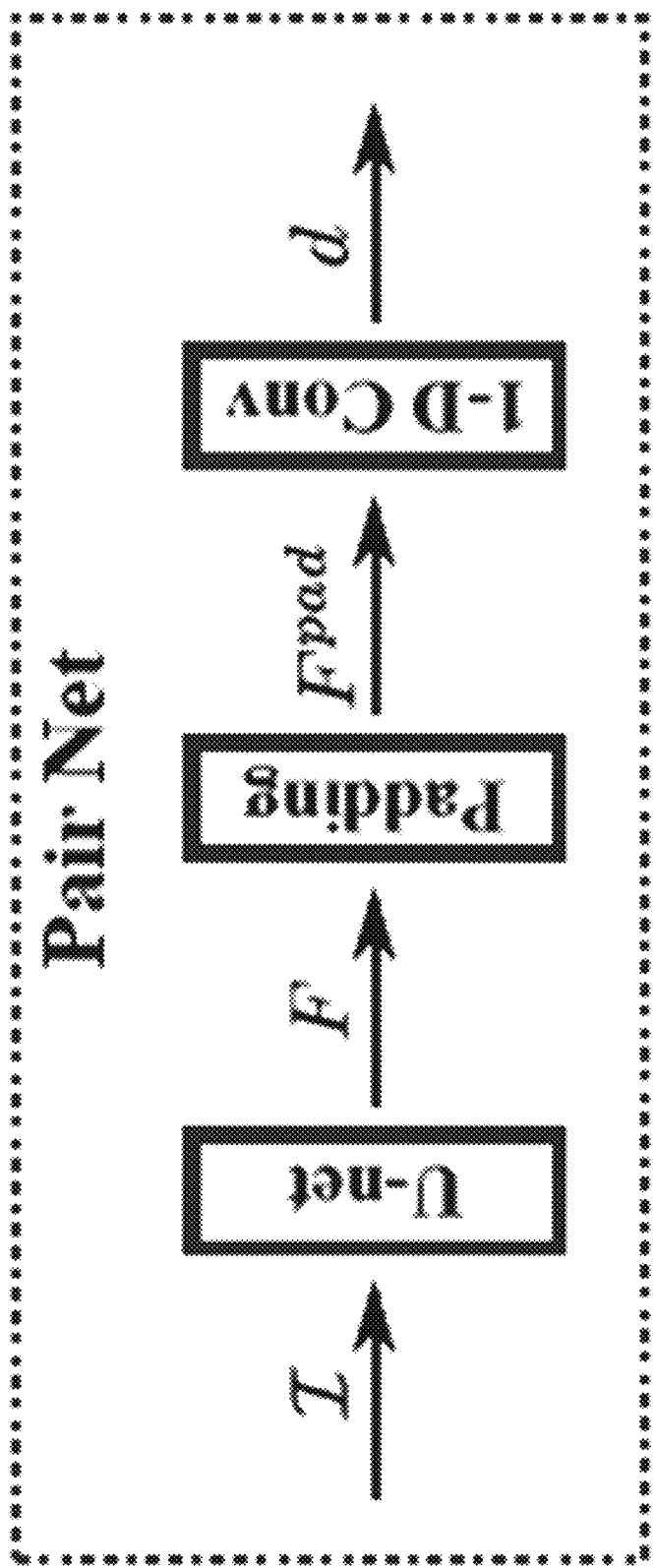
FIG. 6 illustrates the proposed pair net architecture.

4) Pair Net: The proposed pair net consists of a common U-net as backbone, a padding layer to enable enough context information and one 1-D convolution layer to regress the surface difference expectation for each column. The architecture is demonstrated in FIG. 6. For each original image $\mathcal{I} \in \mathbb{R}^{N_2 \times N_1}$, the U-net outputs feature map $F \in \mathbb{R}^{N_2 \times N_1}$. We denote the number of adjacent columns for surface difference prediction of each column as $N_c$, and denote the features corresponding column j as $F_j$. The padded feature map is denoted as $$F^{pad} \in \mathbb{R}^{(N_2 \times N_c) \times (N_1 - 1)}, \forall_i \in \{1, 3, \ldots, N_1 - 1\},$$

$$F^{pad} = \text{concat}\left(\mathcal{F}_{i-\frac{N_c-2}{2}}, \ldots, \mathcal{F}_{i-1}, \mathcal{F}_i, \mathcal{F}_{i+1}, \mathcal{F}_{i+2}, \ldots, \mathcal{F}_{i+\frac{N_c}{2}}\right),$$

where $\mathcal{F}_i$ defined as $$\mathcal{F}_j = \begin{cases} F_1 & \text{if } j < 1 \\ F_j & \text{if } j \geq 1 \, \& \, j \leq N_1 \\ F_{N_1} & \text{if } > N_1, \end{cases}$$

in the mirror padding and $$\mathcal{F}_j = F_{j \, \% \, N_1},$$

in the circular padding. The choice of padding method depends on the dedicated application. If the surface is closed, the circular padding would be proper, otherwise the mirror padding method should be picked. Then a 1-D convolution layer with a kernel size 1, stride 1 and input channel size $N_2 \times N_c$, is applied to the padded feature map $F^{pad} \in \mathbb{R}^{(N_2 \times N_c) \times (N_1 - 1)}$ to generate the surface difference prediction $d_{i,i+1}, \forall_i \in \{1, 2, \ldots, N_1 - 1\}$.

B. Training Strategy

1) Unary Net Pre-training: We propose to relax the ground truth surface position for each column, which is a delta function, to a Gaussian distribution and use it for the unary net pre-training. We set the Gaussian standard deviation $\sigma$ to be around 0.1 times of the column length and our method is insensitive to $\sigma$. Then we will have one Gaussian distribution ground truth for each column i, denoted as $T_i \in \mathbb{R}^{N_2}$. One illustration is demonstrated in FIG. 4. We denote the output from the unary net as $P \in \mathbb{R}^{N_2 \times N_1}$ and the loss for the pretraining is formulated as $$\text{loss}_{pre}(P, T) = -\Sigma_{i \in \Omega} D_{KL}(T_i \| P_i) \quad (4),$$

Figure 7:
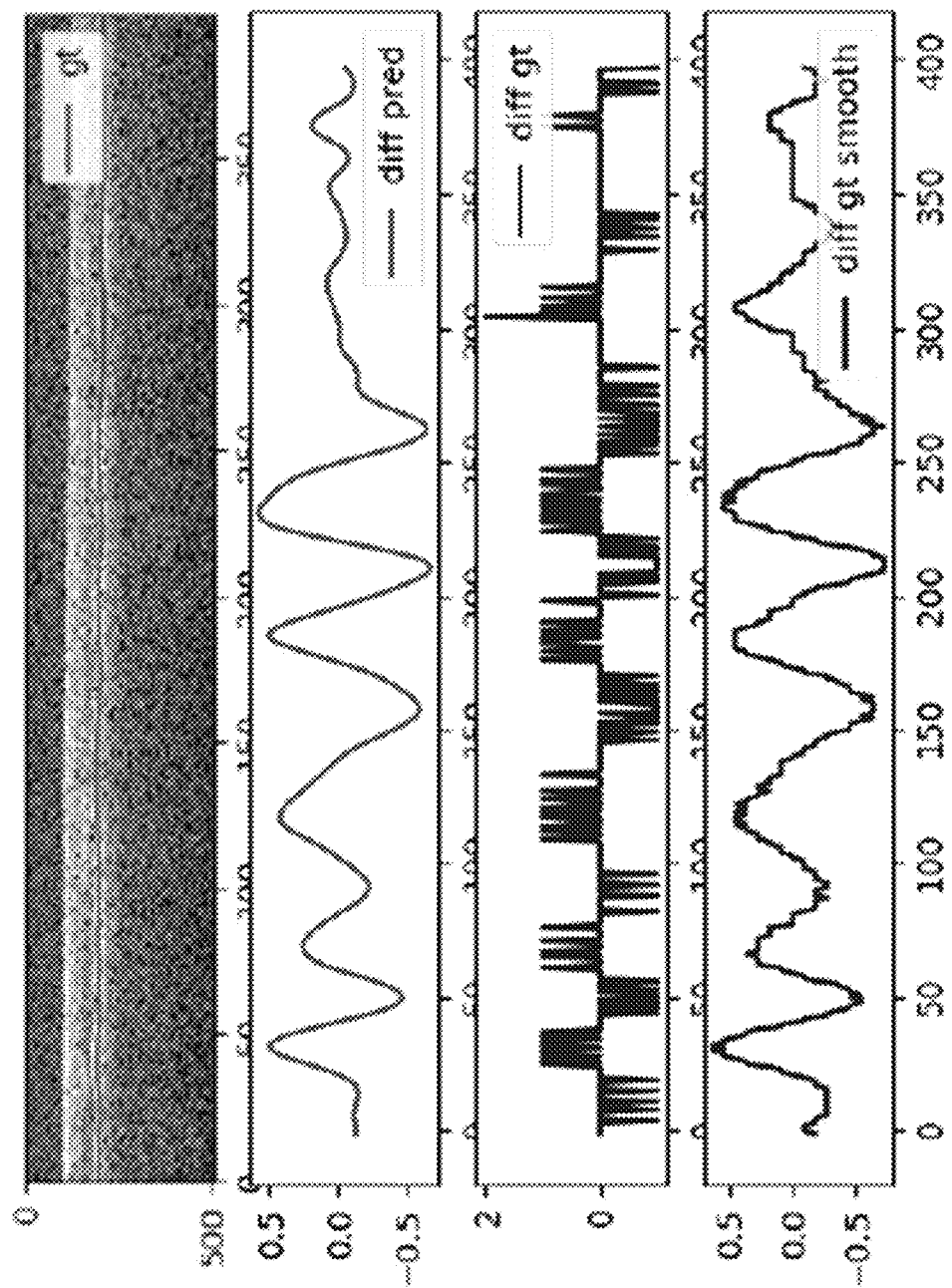
FIG. 7 illustrates that smoothing ground truth surface position differences enables the pair net to learn. Gt: surface position ground truth; diff pred: surface position difference prediction generated by the pair net trained with smoothed surface differences ground truth; diff gt: surface position differences ground truth; diff gt smooth: smoothed diff gt.

2) Pair Net Training: The mean square error of surface position difference is utilized as the loss function, which is formulated as $$\text{loss}_{pair}(d, t) = \sum_{(i,j) \in N} (d_{i,j} - t_{i,j})^2, \quad (5)$$

where $t \in \mathbb{R}^{N_1 - 1}$ denotes the smoothed ground truth surface position differences. One should note that the surface position differences may be highly wiggly, especially when the ground truth surface position is defined in discrete pixel space, which is illustrated in the third row of FIG. 7. This hinders the pair net to learn useful representation and usually the trained pair net just generates a constant prediction that is not much useful. We propose to smooth the ground truth surface position differences by using moving window average method, sample results of which are illustrated in the fourth row of FIG. 7, and use them as the ground truth for the pair net training. The prediction generated by the network trained with the smoothed ground truth is much more reasonable, which is demonstrated in the second row of FIG. 7. One should also note that the pair net is pre-trained and kept fixed during the fine tuning of the whole network.

3) Fine Tuning:

W/O: The $L_1$ surface position error loss is chosen and formulated as where $$\text{loss}_{fine}(\gamma, t) = \sum_{i \in \Omega} |\gamma_i - t_i|, \quad (6)$$

$t \in \mathbb{R}^{N_1}$ denotes the ground truth surface positions.

W/zero & W/learned: The loss is formulated as $$\text{loss}_{fine}(x, t) = \sum_{i \in \Omega} |x_i - t_i|. \quad (7)$$

Figure 8:
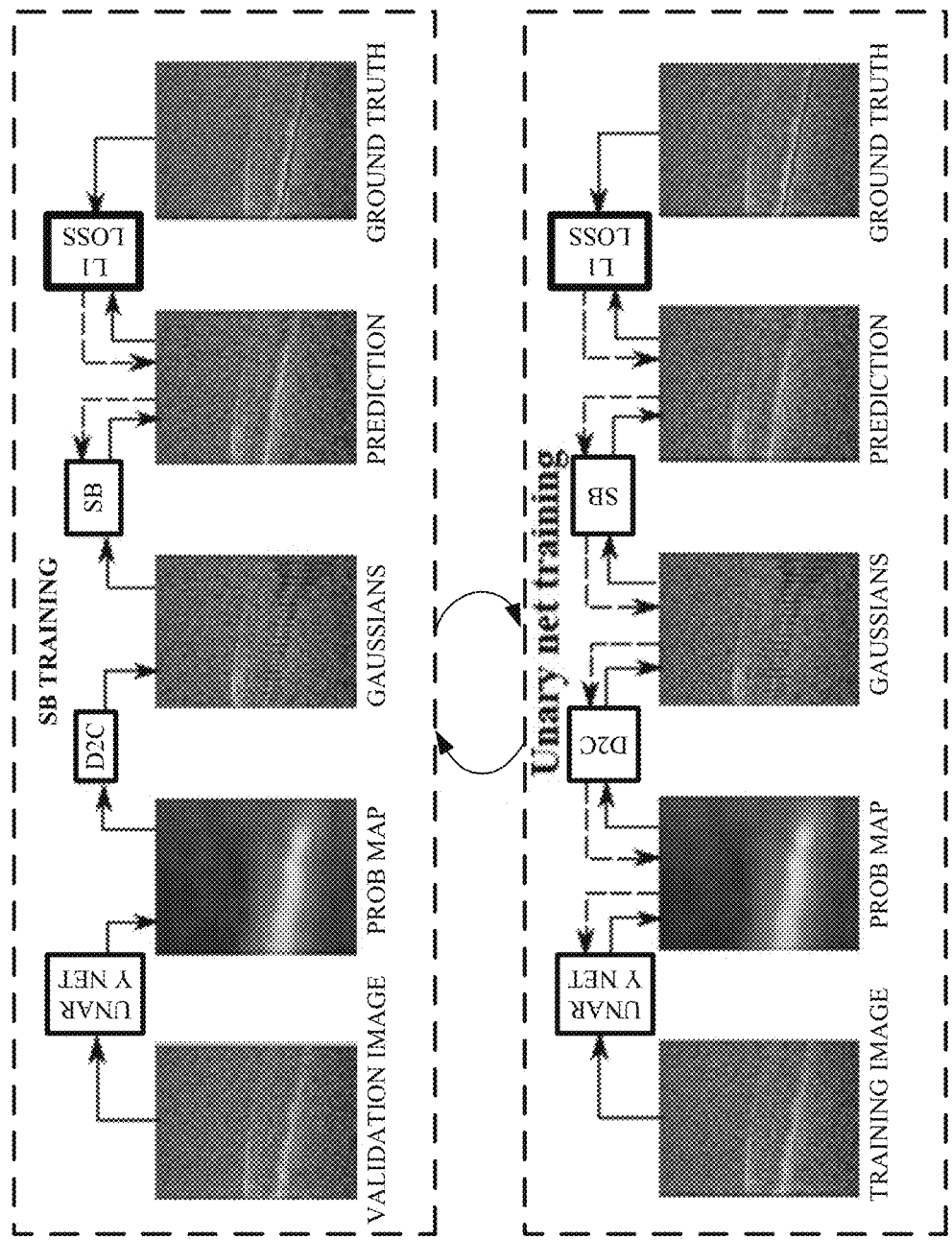
FIG. 8 illustrates two phases of fine tuning of the proposed W/zero and W/learned methods. The fine-tuning alternates between training the unary net and the SB. The phase changes when the current training phase converges. The dotted blocks are kept fixed during the respective training phase. The dotted arrow lines represent back propagation.

The fine tuning of the whole network proceeds in an alternation fashion (FIG. 8). The validation data is utilized to train the SB, and the training data is utilized for the unary net training. As SB only has one parameter ($w_{comp}$) to train, the overfitting chance of it is very low. Also, the unary net is not trained on validation data, the learned $w_{comp}$ should be more representative in the wild. Otherwise if fine tuning the unary net and the SB simultaneously on the training data, the learned $w_{comp}$ is generally smaller than necessary, as the pre-trained unary net generally has fit the training data well and then the SB would not play an important role.

III. Application to SD-OCT Retinal Layer Segmentation

Figure 9:
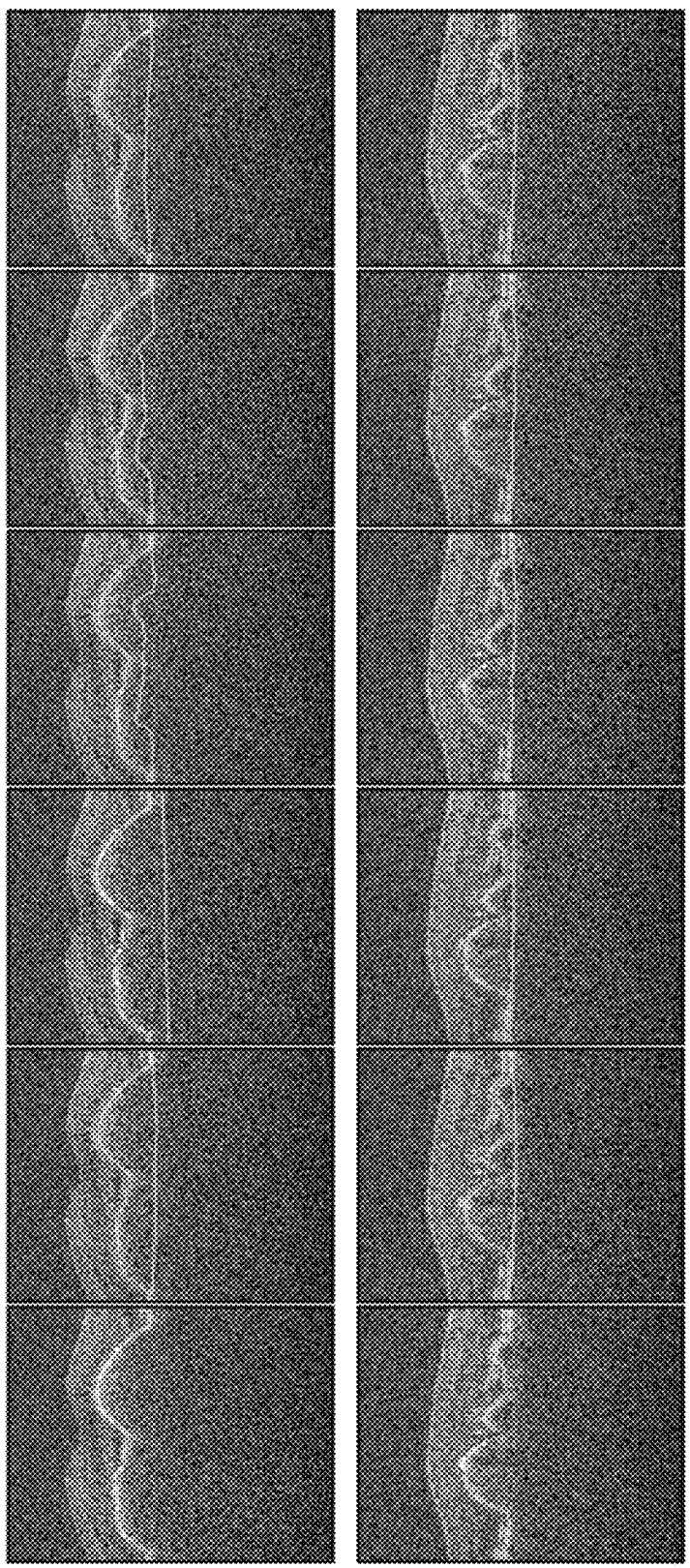
FIG. 9 illustrates SD-OCT segmentation results. Red: IRPE; Green: OBM. The six columns are original images, ground truth segmentations, results of Shah et al.'s method, W/O, W/zero and W/learned, respectively.

The proposed methods were applied to retinal layer segmentation in SD-OCT images, which were obtained from the public dataset [19]. Since the manual tracings were only available for a region centered at the fovea, subvolumes of size 400×60×512 were extracted around the fovea. The dataset was randomly divided into 3 sets: 1) Training set—266 volumes (79 normal, 187 with age-related macular degeneration (AMD)); 2) Validation set—57 volumes (17 normal, 40 AMD); 3) Testing set—59 volumes (18 normal, 41 AMD). The surfaces considered are S2—Inner Aspect of Retinal Pigment Epithelium Drusen Complex (IRPE) and S3—Outer Aspect of Bruch Membrane (OBM) as shown in FIG. 9, which are very challenging to segment.

A. Pre-Processing and Augmentation

The intensity of each slice was normalized to have a zero mean and unit standard deviation. No additional pre-processing methods were utilized. For the purpose of pretraining the unary net, the standard deviation of the Gaussian model of the surface position on each column was set σ=50. We augmented the training data on the fly by applying random combinations of various operations including mirroring along the horizontal dimension, random translation along the vertical dimension, adding Gaussian noises (mean=0, std=0.1), adding Salt and Pepper noises (5%), and cropping (90% of the original size) and then resizing to have the original size 512×400.

B. Hyperparameters

All training utilized Adam optimizer. For unary net pre-training, the learning rate was $10^{-4}$. For fine-tuning, the learning rate of the unary net and the SB was specified to $10^{-5}$ and $10^{-3}$, respectively. The initial smoothness parameter $w_{comp}$ was set to 0.02, which is the reciprocal of σ=50. For the pair net training, an Adam optimizer with learning rate $10^{-4}$ was chosen, the experimentally decided adjacent column number for mirror feature padding was set to be 100, and the smoothing running window sizes were specified to be 11 and 101 for IRPE and OBM surfaces, respectively.

C. Results

Unsigned mean surface positioning error (UMSP), which is formulated as $$UMSP(x, t) = \frac{1}{|\Omega|} \sum_{i \in \Omega} |x_i - t_i|, \quad (8)$$

is utilized for evaluation of segmentation accuracy. The quantitative results are summarized in Table 1. We compare to another deep learning-based method proposed by Shah et al., which is the state-of-the-art on this dataset. We reimplemented Shah et al.'s method, as their training, validation and test data splitting in their paper may be different from ours. For ablation studies, the results of our three proposed methods are all listed. It can be found that all our three methods outperform. And with SB (zero prior) plugged in, the performance can be improved further. If plugging in SB with learned prior, the best performance, especially for the AMD cases, was realized. As for the IRPE surface, for the normal cases, the UMSP can be improved by 49%; for the AMD cases, we can achieve a 54% improvement. The segmentation of the OBM surface is more challenging than that of the IRPE surface. As for the OBM surface, compared to [13], the proposed W/learned method achieves 29% improvement on the normal cases and 33% improvement on the AMD cases.

Sample segmentation results are illustrated in FIG. 9. It can be noticed that Shah et al.'s method (FCN+FC) may 1) oversmooth the segmentation prediction, which is demonstrated by the IRPE surface in the second slice in FIG. 9; 2) be incapable to detect the target surface with little image context information, which is demonstrated by the OBM surface in the first slice in FIG. 9. Intuitively, both drawbacks stem from that Shah et al.'s method makes prediction based on low resolution feature maps, which contrasts with the proposed methods that predict surface position utilizing full resolution features. The effects of two proposed priors can also be noticed. For example, the OBM segmentation results of the first slice verify that the SB (zero prior) does smooth the segmentation successfully, but it may be not enough, as the $w_{comp}$ is learned from all training cases and may not be optimal for current slice. Fortunately, the proposed learned surface position difference priors sort of help to recover the desired target OBM surface. Moreover, if comparing the results of W/zero and that of W/learned on the second slice carefully, one can notice that sometimes W/zero may over-smooth the prediction and W/learned can still preserve accurate boundaries.

D. The Proposed Methods Require Less Training Data.

Figure 10:
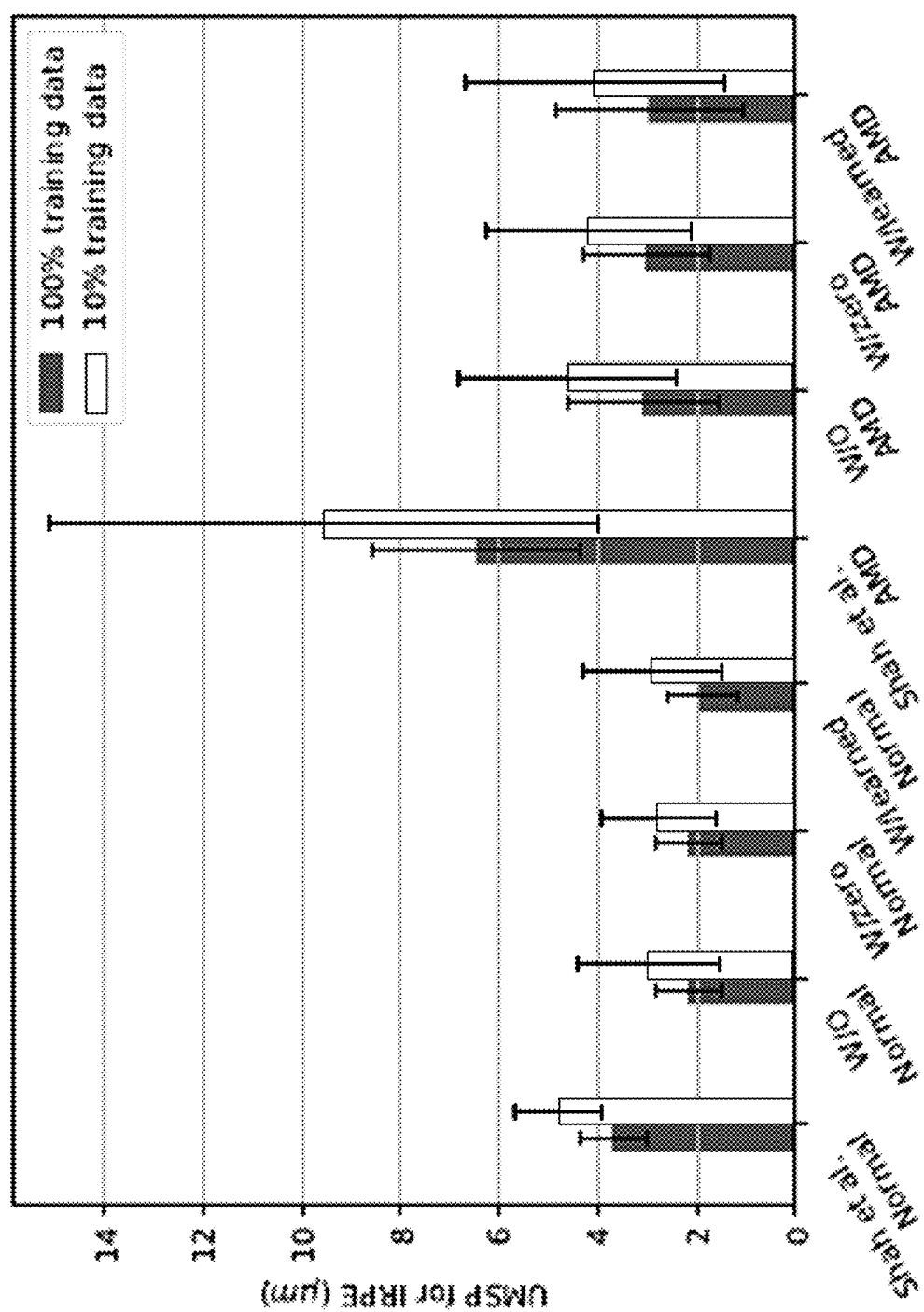
FIG. 10 illustrates TRPE segmentation performance using different amount of training data.
Figure 11:
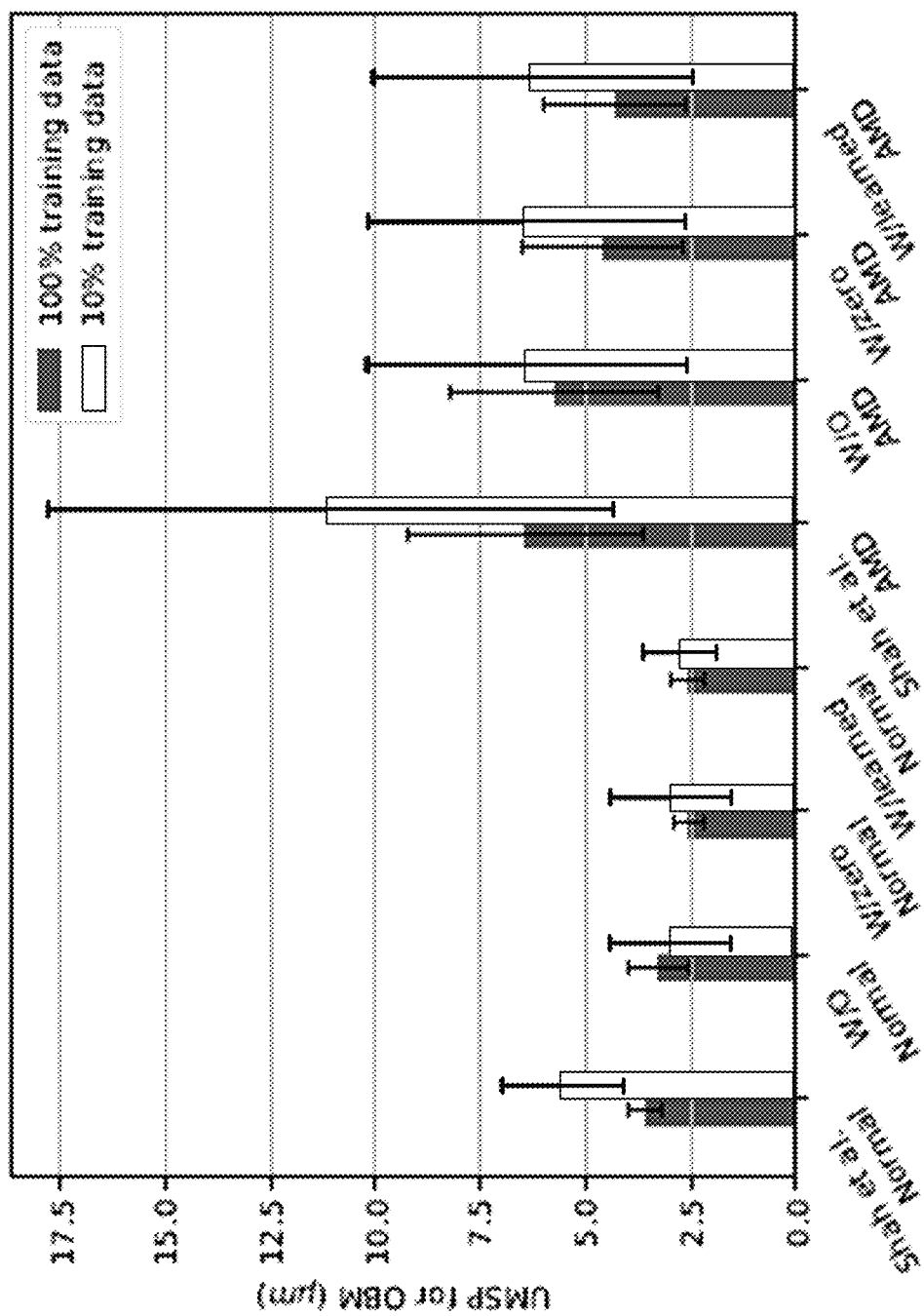
FIG. 11 illustrates OBM segmentation performance using different amount of training data.

In this section, we investigate the relation between segmentation performance of different methods and training data amount. We keep the validation and test data fixed and randomly sample 10% of all training data. The results are shown in Table 1, FIG. 10 and FIG. 11. It can be noticed that the proposed methods are more robust to reducing training data. Moreover, all our three proposed methods trained with 10% training data outperform Shah et al.'s method utilizing all the training data.

IV. Application to IVUS Vessel Wall Segmentation

The proposed methods were also applied to intravascular ultrasound vessel wall segmentation. The data used for this experiment was obtained from the standardized evaluation of IVUS image segmentation database [23]. In this experiment, the dataset B was used. This dataset consists of 435 images with a size of 384 384, as well as the respective expert manual tracings of lumen and media surfaces. It comprises two groups—a training set (109 slices) and a testing set (326 slices). The experiment with the proposed methods was conducted in conformance with the directives provided for the IVUS challenge. In our experiment, we randomly split the 109 training slices into 100 slices for training and 9 slices for validation.

A. Pre-Processing and Augmentation

Figure 12:
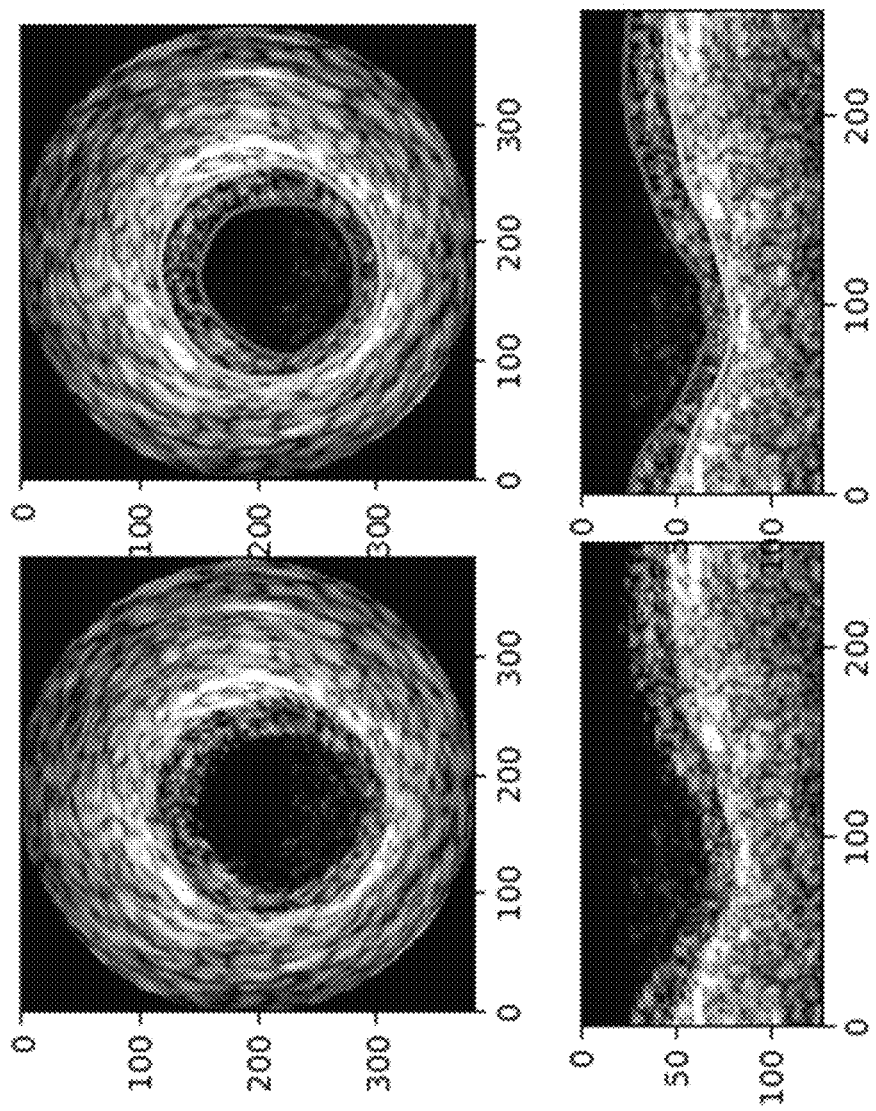
FIG. 12 is sample IVUS data. Image (left) and manual contours (right) in Cartesian (top) and Polar system (bottom). Red: lumen; Green: media.

Each slice was transformed to be represented in the polar coordinate system with a size of 256×128, as illustrated in FIG. 12. The intensity of each slice was normalized to have a zero mean and a unit standard deviation. The Gaussian truth was generated for each column using σ=15, as it has a shorter column (128 vs 512 in the SD-OCT data). As the number of training data was

TABLE 1

Unsigned mean surface positioning errors (UMSP) for the results on the SD-OCT test dataset. The unit is in μm. W/O: without SB; W/zero: using zero shape prior; W/learned: using learned shape prior.

| Surface | Training data (%) | [13], normal | [13], AMD | W/O, normal | W/O, AMD | W/zero, normal | W/zero, AMD | W/learned, normal | W/learned, AMD |
|---|---|---|---|---|---|---|---|---|---|
| IRPE | 100 | 3.70 ± 0.69 | 6.45 ± 2.11 | 2.16 ± 0.67 | 3.09 ± 1.52 | 2.15 ± 0.67 | 3.02 ± 1.27 | 1.89 ± 0.68 | 2.96 ± 1.91 |
|  | 10 | 4.81 ± 0.90 | 9.55 ± 5.56 | 2.98 ± 1.45 | 4.60 ± 2.22 | 2.79 ± 1.17 | 4.17 ± 2.10 | 2.87 ± 1.41 | 4.06 ± 2.63 |
| OBM | 100 | 3.58 ± 0.38 | 6.43 ± 2.82 | 3.28 ± 0.71 | 5.74 ± 2.51 | 2.54 ± 0.38 | 4.57 ± 1.90 | 2.55 ± 0.40 | 4.29 ± 1.71 |
|  | 10 | 5.58 ± 1.45 | 11.07 ± 6.73 | 2.99 ± 1.44 | 6.43 ± 3.83 | 2.98 ± 1.42 | 6.40 ± 3.81 | 2.77 ± 0.87 | 6.28 ± 3.81 | limited, we augmented the data on the fly by random combinations of various operations including mirroring, circulation shifting along the polar dimension, adding Gaussian noises (mean=0, std=0.1), adding Salt and Pepper noises (5%), and cropping (90% of the original size) and then resizing (128×256).

B. Hyperparameters

All training utilized Adam optimizer. For unary net pre-training, the learning rate was $10^{-4}$. For fine-tuning, the learning rate for the unary net and the SB was set to be $10^{-5}$ and $10^{-2}$, respectively. The smoothness parameter $w_{comp}$ was initialized to 0.067, which is the reciprocal of σ=15. For the pair net training, an Adam optimizer with learning rate $10^{-4}$ was chosen, the adjacent column number for circular feature padding was set to be 64, and the smoothing running window sizes were specified to be 101 for both Lumen and Media surfaces.

C. Results

The quantitative analysis was carried out by comparing the segmentations generated by the proposed and compared methods with expert manual tracings. Three evaluation metrics were utilized to quantify the accuracy of the segmentations. The metrics used are as follows. Jaccard Measure (JM), which quantifies how much the segmented area overlaps with the manual delineated area, is formulated as $$JM(R_{pred}, R_{gt}) = \frac{|R_{pred} \cap R_{gt}|}{|R_{pred} \cup R_{gt}|}, \quad (9)$$

where $R_{pred}$ and $R_{gt}$ are two vessels regions defined by the predicted segmentation outline $C_{pred}$ and by the manual annotated contour $C_{gt}$ respectively. Percentage of Area Difference (PAD), which computes the segmentation area difference as $$PAD(A_{pred}, A_{gt}) = \frac{|A_{pred} - A_{gt}|}{A_{gt}}, \quad (10)$$

where $A_{pred}$ and $A_{gt}$ are the vessel areas for the predicted and manual contours, respectively. Hausdorff Distance (HD), which computes locally the distance between the predicted and manual contours as $$HD(C_{pred}, C_{gt}) = \max_{p \in C_{pred}} \left\{ \max_{q \in C_{gt}} [d(p, q)] \right\}, \quad (11)$$

where p and q are points of the curves $C_{pred}$ and $C_{gt}$, respectively, and d(p; q) is the Euclidean distance. The quantitative results are summarized in Table 2 and FIG. 14. We compared to three methods. P3, is the state-of-the-art method for this IVUS dataset. It is an expectation maximization (EM) based method and is semi-automated. VGG-U-net denotes a region-based deep learning method [22] and only JM results were presented in their work. The state-of-the-art fully automation method is a graph search based method working in irregularly sampled space and in 3-D [10], the unary energy of which is learned by random forest classifiers with human designed features.

TABLE 2

Segmentation results comparison on the IVUS dataset. W/O: without SB; W/zero: using zero shape prior; W/learned: using learned shape prior. The best fully automation methods with respect to each metric are bold faced.

| Methods | Lumen | | | Media | | |
|---|---|---|---|---|---|---|
| | JM | PAD | HD | JM | PAD | HD |
| P3[20], [21] (semi) | 0.88 ± 0.05 | 0.06 ± 0.05 | 0.34 ± 0.14 | 0.91 ± 0.04 | 0.05 ± 0.04 | 0.31 ± 0.12 |
| VGG-U-net[22] | 0.80(—) | — | — | 0.81(—) | — | — |
| Graph search [10] | 0.86 ± 0.04 | 0.09 ± 0.03 | 0.37 ± 0.14 | 0.90 ± 0.03 | 0.07 ± 0.03 | 0.43 ± 0.12 |
| W/O | 0.89 ± 0.06 | 0.07 ± 0.07 | 0.27 ± 0.16 | 0.88 ± 0.08 | 0.08 ± 0.08 | 0.43 ± 0.32 |
| W/zero | 0.89 ± 0.06 | 0.07 ± 0.07 | 0.27 ± 0.16 | 0.88 ± 0.08 | 0.08 ± 0.08 | 0.41 ± 0.31 |
| W/learned | 0.88 ± 0.06 | 0.07 ± 0.07 | 0.27 ± 0.16 | 0.89 ± 0.08 | 0.08 ± 0.08 | 0.40 ± 0.29 |

TABLE 3

Segmentation results on the IVUS dataset with different amount of training data. The proposed methods utilize surface-based U-net as backbones, which require less training data than the traditional region-based U-net.

| Methods | Training data (%) | Lumen | | | Media | | |
|---|---|---|---|---|---|---|---|
| | | JM | PAD | HD | JM | PAD | HD |
| VGG-U-net[22] | 100 | 0.80(—) | — | — | 0.81(—) | — | — |
| W/O | 100 | 0.89 ± 0.06 | 0.07 ± 0.07 | 0.27 ± 0.16 | 0.88 ± 0.08 | 0.08 ± 0.08 | 0.43 ± 0.32 |
| W/O | 10 | 0.87 ± 0.07 | 0.08 ± 0.07 | 0.31 ± 0.20 | 0.86 ± 0.11 | 0.10 ± 0.11 | 0.58 ± 0.45 |
| W/zero | 100 | 0.89 ± 0.06 | 0.07 ± 0.07 | 0.27 ± 0.16 | 0.88 ± 0.08 | 0.08 ± 0.08 | 0.41 ± 0.31 |
| W/zero | 10 | 0.87 ± 0.07 | 0.08 ± 0.07 | 0.31 ± 0.20 | 0.86 ± 0.11 | 0.10 ± 0.10 | 0.57 ± 0.45 |
| W/learned | 100 | 0.88 ± 0.06 | 0.07 ± 0.09 | 0.28 ± 0.19 | 0.89 ± 0.08 | 0.08 ± 0.08 | 0.40 ± 0.29 |
| W/learned | 10 | 0.87 ± 0.07 | 0.08 ± 0.07 | 0.31 ± 0.18 | 0.87 ± 0.10 | 0.10 ± 0.10 | 0.48 ± 0.37 |

Figure 14:
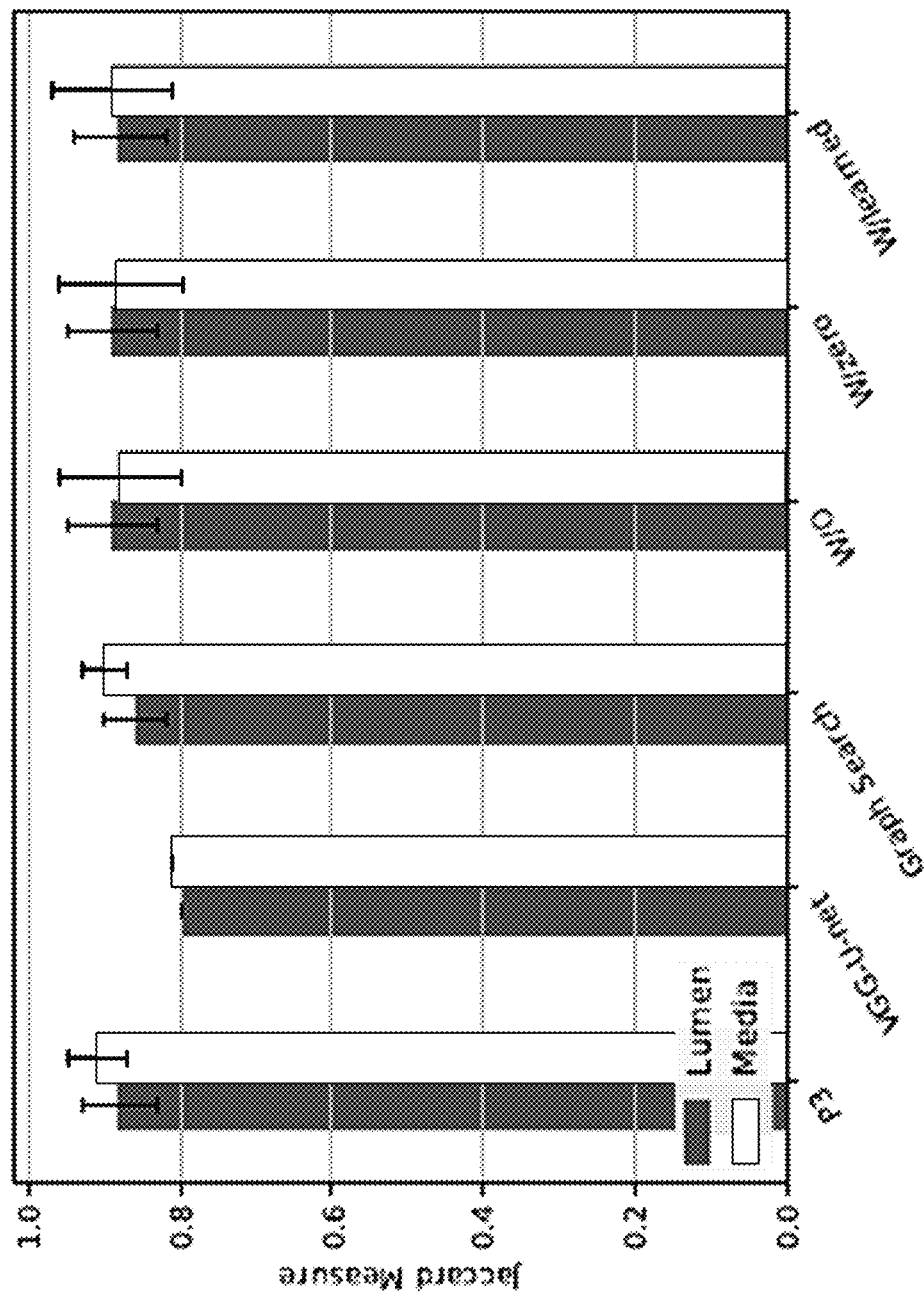
FIG. 14 illustrates Jaccard measures of segmentation results on IVUS dataset using full training data.

From Table 2 and FIG. 14, one can find that, for the Lumen surface, the proposed methods outperform the graph search based method and work marginally better than the semi automation P3 method. For the Media surface, the proposed methods' performance is comparable to that of the graph search based method, and marginally inferior to the P3 method. One should note that the graph search based method operates in 3-D and take advantage of more context information than our proposed methods and VGG-U-net method both working in 2-D. Actually, it is straightforward to push our methods to 3-D and it is probable better performance can be realized with the aid of 3-D context information. The proposed methods outperform the VGG-U-net by a significant margin. One can also notice that in this application, compared to our base method W/O, the adding of SB that models pairwise energy does not improve the performance significantly.

TABLE 4

Inference computation time comparison on the IVUS dataset.

| Methods | P3 | VGG-U-net[22] | Graph search [10] | proposed |
|---|---|---|---|---|
| Auto/Semi Auto | Semi | Auto | Auto | Auto |
| 2-D/3-D | 2-D | 2-D | 3-D | 2-D |
| Time/slice (sec) | 8.64 | 0.09 | 4.5 | 0.21 |

Figure 13:
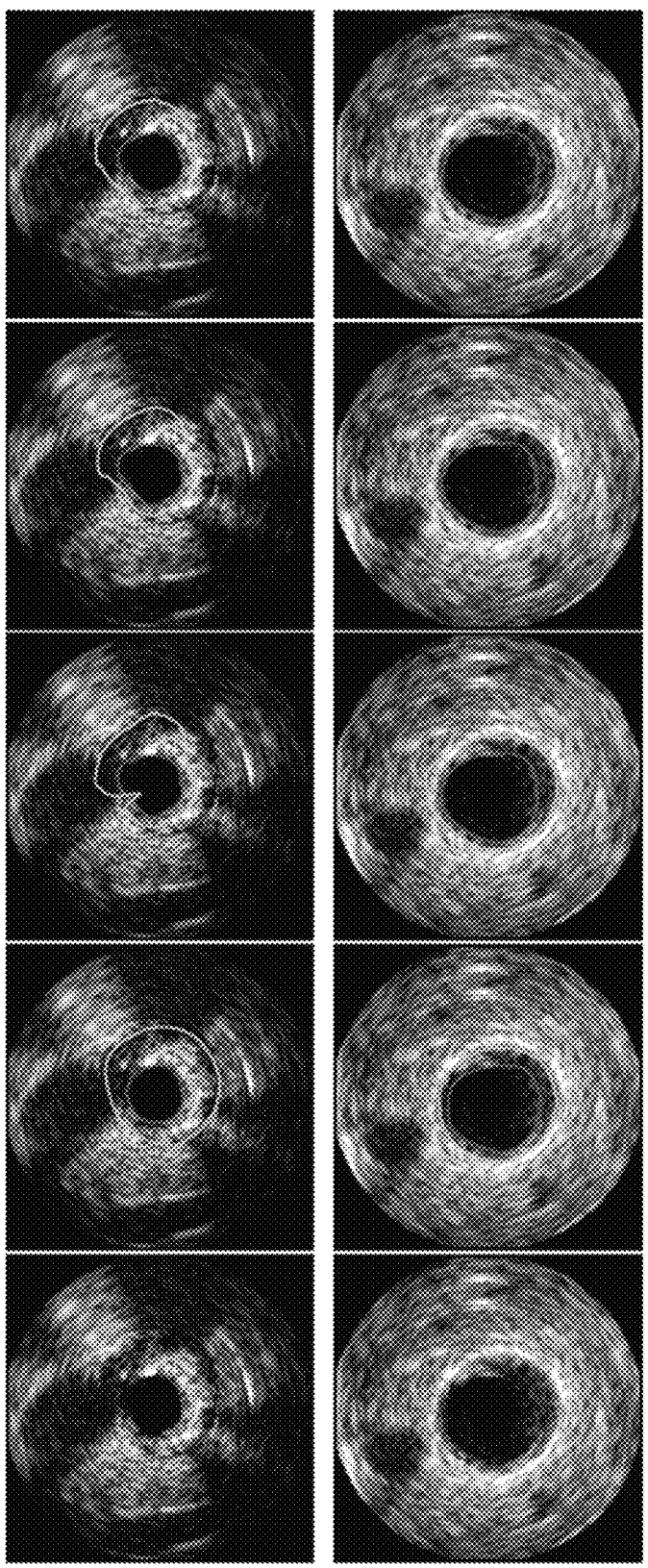
FIG. 13 is sample segmentation results on the IVUS dataset. Red: lumen; Green: media. The six columns are original images, ground truth segmentations, results of W/O, W/zero and W/learned, respectively.

Possible explanation is that the shape of vessel contour is highly uniform, and it may have been learned decently by the unary net. Sample segmentation results are illustrated in FIG. 13. However, when the backbone unary net struggles and W/O method may generate unreasonable results, which is demonstrated in the first slice in FIG. 13, the proposed pairwise energy does boost the performance.

As to the inference computation time, the results of which are listed in Table 4, the proposed method needs more overhead than the VGG-U-net method (0.21 vs 0.09 sec/slice). The overhead is mainly from the Hessian matrix computation, as well as two separate runs of the program for two surfaces. While compared to P3 (8.6 sec/slice) and the graph-based method (4.5 sec/slice), the proposed methods are highly efficient.

D. The Proposed Methods Require Less Training Data.

Figure 15:
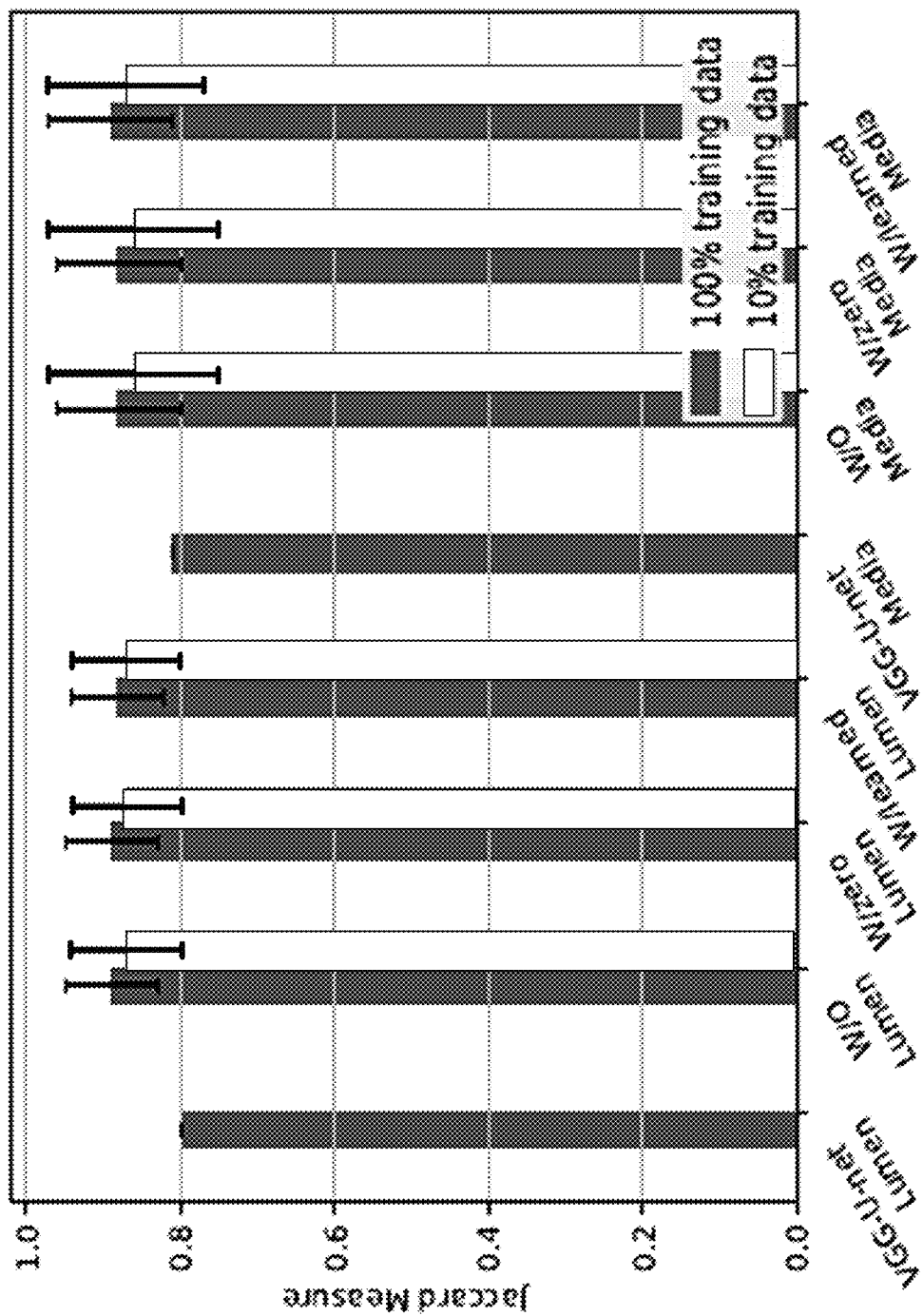
FIG. 15 illustrates Jaccard measures of segmentation results on IVUS dataset using different amount of training data.

In this section, we investigate how the segmentation performance of the proposed methods change with respect to training data amount. We aim to verify that it is the surface-based modeling and the training utilizing soft probability ground truth make the proposed methods require less training data. To make the comparison fair, we compare to the deep learning region-based VGG-U-net method. We keep the validation and test data fixed and randomly sample 10% (10 slices) of all training data (100 slices). The results are shown in Table 3 and FIG. 15. It can be found that all our three proposed methods trained with 10% data (10 slices) perform marginally inferior to that trained with full training dataset, and still significantly better than the region-based VGG-U-net method.

V. Discussion

A. Interpretable Deep Learning

One drawback of Shah et al's method (FCN+FC) [13] is that the surface smoothness is implicitly learned within the whole network (mainly within fully-connected layers) as a black box. It is hard to decode after training. In our proposed methods, the parameter that controls smoothness can be learned effectively and has a clear meaning. This makes the deep network easier to interpret, and gives human users a straightforward and reasonable handle to control segmentation smoothness slice by slice if the segmentation result is not satisfying.

B. Robustness to Adversarial Attacks

The unary net in our proposed methods shares similar merits with distillation defense. Moreover, pioneer work by Arnab et al. indicates that adding graph model (conditional random fields (CRFs) were utilized) confers robustness to untargeted attacks, compared to CNN only models. Their hypothesis is that the smoothing effect of the pairwise terms increases the robustness to adversarial attacks. Our proposed SB shares similar merits with CRFs. In all, the proposed methods are expected to be more robust than CNN only methods or even region-based CNN+CRFs methods.

C. One-Shot Learning

Based on the results on the IVUS dataset, our proposed methods may have the potential to be applied to one-shot or few-shot learning. Actually, some works utilized attention mechanism to lift up one-shot learning, e.g. Our surface-based modeling is inherently alike an attention model. For future work, we plan to push the proposed methods to one shot or few-shot semantic segmentation for medical imaging.

D. Extension to 3-D

The proposed methods are straightforward to be pushed to 3-D for terrain-like surfaces. And combining shape-aware patch generation method proposed in, the methods proposed can be applied to non-terrain 3-D surfaces segmentation.

VI. Conclusion

A novel segmentation model based on a convolutional neural network (CNN) and a learnable surface smoothing block is shown and described to tackle the surface segmentation problem with end-to-end training. According to one aspect, guaranteed globally optimal solutions for surface segmentations are achieved using deep learning. Experiments on SD-OCT retinal layer segmentation and IVUS vessel wall segmentation demonstrated very promising results. The proposed method is applicable to 2-D and 3-D. Section 2: Globally Optimal Segmentation of Mutually Interacting Surfaces Using Deep Learning Segmentation of multiple surfaces in medical images is a challenging problem, further complicated by the frequent presence of weak boundary and mutual influence between adjacent objects. The traditional graph-based optimal surface segmentation method has proven its effectiveness with its ability of capturing various surface priors in a uniform graph model. However, its efficacy heavily relies on hand-crafted features that are used to define the surface cost for the "goodness" of a surface. Recently, deep learning (DL) is emerging as powerful tools for medical image segmentation thanks to its superior feature learning capability. Unfortunately, due to the scarcity of training data in medical imaging, it is nontrivial for DL networks to implicitly learn the global structure of the target surfaces, including surface interactions. In this work, we propose to parameterize the surface cost functions in the graph model and leverage DL to learn those parameters. The multiple optimal surfaces are then simultaneously detected by minimizing the total surface cost while explicitly enforcing the mutual surface interaction constraints. The optimization problem is solved by the primal-dual Internal Point Method, which can be implemented by a layer of neural networks, enabling efficient end-to-end training of the whole network. Experiments on Spectral Domain Optical Coherence Tomography (SD-OCT) retinal layer segmentation and Intravascular Ultrasound (IVUS) vessel wall segmentation demonstrated very promising results.

1. Introduction

The task of optimally delineating 3D surfaces representing object boundaries is important in segmentation and quantitative analysis of volumetric medical images. In medical imaging, many surfaces that need to be identified appear in mutual interactions. These surfaces are "coupled" in a way that their topology and relative positions are usually known already (at least in a general sense), and the distances between them are within some specific range. Clearly, incorporating these surface-interrelations into the segmentation can further improve its accuracy and robustness, especially when insufficient image-derived information is available for defining some object boundaries or surfaces. Such insufficiency can be remedied by using clues from other related boundaries or surfaces. Simultaneous optimal detection of multiple coupled surfaces thus yields superior results compared to the traditional single-surface detection approaches. Simultaneous segmentation of coupled surfaces in volumetric medical images is an under-explored topic, especially when more than two surfaces are involved.

Several approaches for detecting coupled surfaces have been proposed in past years. The graph-based methods have been proven one of the state-of-the-art traditional approaches for surface segmentation in medical images. The great success of the methods is mainly due to their capability of modeling the boundary surfaces of multiple interacting objects, as well as a priori knowledge reflecting anatomic information in a complex multi-layered graph model, enabling the segmentation of all desired surfaces to be performed simultaneously in a single optimization process with guaranteed global optimality. The essence of the graph model is to encode the surface cost, which measures the "goodness" of a feasible surface based on a set of derived image features, as well as the surface interacting constraints, into a graph structure. The major drawback is associated with the need for handcrafted features to define the surface cost of the underlying graphical model.

Armed with superior data representation learning capability, deep learning (DL) methods are emerging as powerful alternatives to traditional segmentation algorithms for many medical image segmentation tasks. The state-of-the-art DL segmentation methods in medical imaging include fully convolutional networks (FCNs) and U-net, which model the segmentation problem as a pixel-wise or voxel-wise classification problem. However, due to the scarcity of training data in medical imaging, it is at least nontrivial for the convolutional neural networks (CNNs) to implicitly learn the global structures of the target objects, such as shape, boundary smoothness and interaction. The single surface segmentation problem has been formulated as a regression problem using an FCN followed by fully connected layers to enforce the monotonicity of the target surface. More recently, a U-net as a backbone network has been used to model the multiple surface segmentation with regression by a fully differentiable soft argmax, in which the ordering of those surfaces is adjusted to be guaranteed by a sequence of ReLU operations.

Here, we unify the powerful feature learning capability of DL with the successful graph-based surface segmentation model in a single deep neural network for end-to-end training to achieve globally optimal segmentation of multiple interacting surfaces. In the proposed segmentation framework, the surface costs are parameterized, and the DL network is leveraged to learn the model from the training data to determine the parameters for the input image. The multi-surface inference by minimizing the total surface cost while satisfying the surface interacting constraints is realized by the primal-dual Internal Point Method (IPM) for constrained convex optimization, which can be implemented by a layer of neural networks enabling efficient backpropagation of gradients with virtually no additional cost. Thus, the DL network for surface cost parameterization can be seamlessly integrated with the multi-surface inference to achieve the end-to-end training.

2. Methods

To clearly present the essence of the proposed surface segmentation framework, we consider the simultaneous segmentation of multiple terrain-like surfaces. For the objects with complex shapes, the unfolding techniques developed for the graph-based surface segmentation methods as well as the convolution-friendly resampling approach, can be applied.

2.1 Problem Formulation

Let $\mathcal{I}(X, Y, Z)$ of size $X \times Y \times Z$ be a given 3-D volumetric image. For each $(x, y)$ pair, the voxel subset $\{\mathcal{I}(x, y, z) | 0 \leq z \leq Z\}$ forms a column parallel to the z-axis, denoted by $q(x, y)$, which is relaxed as a line segment from $\mathcal{I}(x, y, 0)$ to $\mathcal{I}(x, y, Z-1)$ Our target is to find $\lambda > 1$ terrain-like surfaces $S = \{S_1, S_2, \ldots, S_\lambda\}$ each of which intersects every column $q(x, y)$ at exactly one point.

In the graph-based surface segmentation model, each voxel $\mathcal{I}(x, y, z)$ is associated with an on-surface cost $C_i(x, y, z)$ for each sought surface $S_i$, which is inversely related to the likelihood that the desired surface $S_i$ contains the voxel, and is computed based on handcrafted image features. The surface cost of $S_i$ is the total on-surface cost of all voxels on $S_i$. The on-surface cost function $C_i(x, y, z)$ for the column $q(x, y)$ can be an arbitrary function in the graph model. However, an ideal cost function $C_i(x, y, z)$ should express a type of convexity: as we aim to minimize the surface cost, $C_i(x, y, z)$ should be low at the surface lo-cation; while the distance increases from the surface location along the column $q(x, y)$, the cost should increase proportionally. We propose to leverage DL networks to learn a Gaussian distribution $\mathcal{G}(\mu_i(q), \sigma_i(p))$ to model the on-surface cost function $C_i(x, y, z)$ for each column $q(x, y)$ that is, $$C_i(x, y, z) = \frac{(z - \mu_i)^2}{2\sigma_i^2}$$

Thus, the surface cost of $S_i$ is parameterized with $(\mu_i, \sigma_i)$.

For multiple surfaces segmentation, a surface interacting constraint is added to every column $q(x, y)$ for each pair of the sought surfaces $S_i$ and $S_j$. For each $q(x, y)$, we have $\delta_{ij}(q) \leq S_i(q) - S_j(q) \leq \Delta_{ij}(q)$, where $\delta_{ij}(q)$ and $\Delta_{ij}(q)$ are two specified minimum and maximum distance between $S_i$ and $S_j$, respectively, with $S_i$ on top of $S_j$. The multi-surface segmentation is formulated as an optimization problem, where the parameterized surface costs are derived using deep CNNs:

$$S^* = \underset{s}{\operatorname{argmin}} \sum_{i=1}^{\lambda} \sum_{I(x,y,z) \in S_i} C_i(x, y, z) \bigg| (\mu_i, \sigma_i) \quad (1)$$

$$\text{s.t. } \delta_{ij}(q) \leq S_j(q) - S_i(q) \leq \Delta_{ij}(q) \quad \forall i, j, q$$

2.2 The Surface Segmentation Network Architecture

Figure 16:
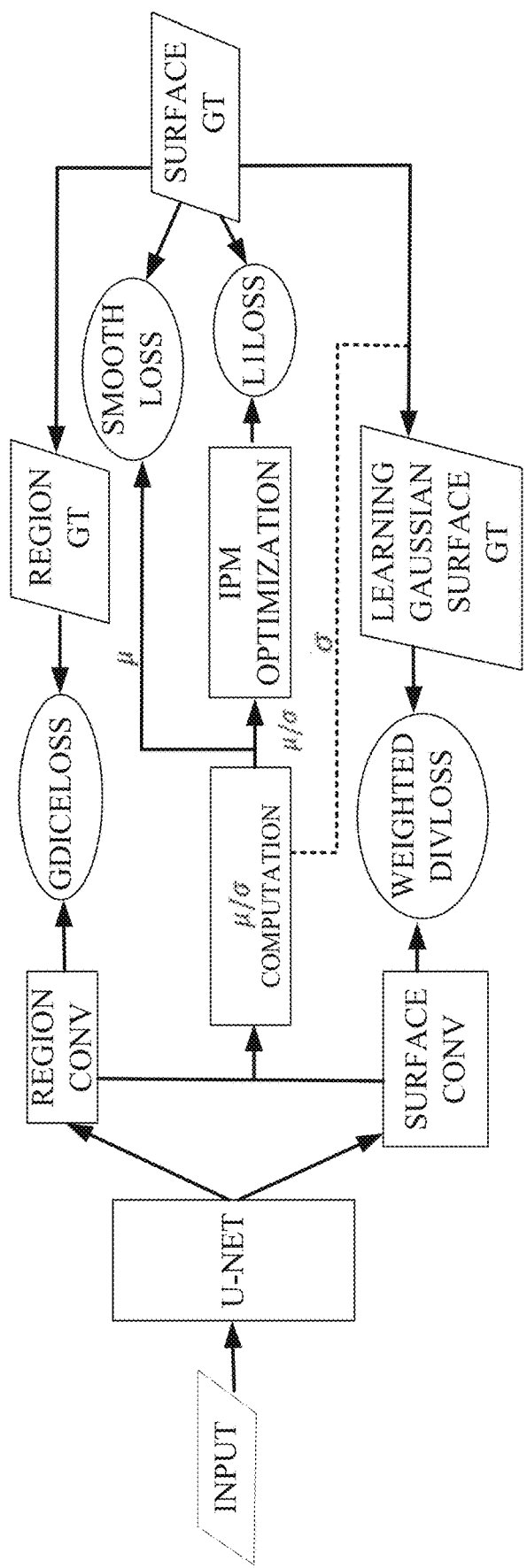
FIG. 16 illustrates the network architecture of the proposed multiple surface segmentation. The surface cost is parameterized with ($\mu$, $\sigma$), which models the Gaussian distribution of the surface locations along each image column. RegionConv is a convolution module to output (N+1)-region segmentation, while SurfaceConv is a convolution module to output N-surface segmentation probability distribution. IPM Optimization indicates primal-dual Internal Point Method for constrained convex optimization. Input includes raw image, gradient of a raw image along H, W dimension, and magnitude and direction of the gradient, total 5 channels. GDiceLoss is an (N+1)-class Generalized Dice Loss. Weighed DivLoss is an image-gradient weighted divergence loss. GT denotes ground truth. Dashed line indicates optional for different experiments.

As shown in FIG. 16, our segmentation network consists of two integrative components: One aim to learn the surface cost parameterization (μ, σ) in Eqn. (1); the other strikes to solve the optimal surface interference by optimizing Eqn. (1) with the IPM optimization module. Thus, the whole network can then be trained in an end-to-end fashion and outputs globally optimal solutions for the multiple surface segmentation.

Surface Cost Parameterization. We utilize U-net as the backbone of our deep network for the feature extraction. The implemented U-net has seven layers with long skip connections between the corresponding blocks of its encoder and decoder. Each block has three convolution layers with a residual connection. The output feature maps of the U-net module is then fed into the following RegionConv and SurfaceConv modules (FIG. 16). The RegionConv module is implemented with three-layer convolutions followed by a 1×1 convolution and softmax to obtain the probability maps for the (λ+1) regions divided by the sought λ surfaces. The SurfaceConv module is implemented with the same module structure of RegionConv to compute the location probability distribution along every image column for each surface. Note that each sought surface intersects every image column exactly once.

The RegionConv module directly makes use of the region information, which may help direct the U-net learning robust features for surface segmentation. In addition, the output region segmentation is used to estimate the surface locations. For each sought surface Si and every image column q, the estimated surface location $\gamma_i$ is the average envelop of the (i+1)-th region on column q, as there is no guarantee that each of the predicted (λ+1) regions is consecutive along the column based on voxel-wise classification by RegionConv, especially in the early stage of the training process. We also calculate a confidence index c0≤c≤1 for the surface location estimation γi based on the number of regions disordering with c=1 for no disordering.

For each surface Si, based on the surface location probability $p_i(z)$ on every image column q(x, y) from the SurfaceConv module, the expected surface location $\xi_i = \sum_{z=0}^{Z-1} z \cdot p_i(z)$. Combined with the RegionConv module, the surface location distribution of Si on column q is modeled with a Gaussian $\mathcal{G}_i(\mu_i, \sigma_i)$, as follows.

$$\mu_i = \frac{c\gamma_i + (\kappa - c)\xi_i}{\kappa}; \sigma_i^2 = \sum_{z=0}^{Z-1} p_i(z) * (z - \mu_i)^2$$

k≥2 is used to balance the fidelity of information from RegionConv and SurfaceConv. Thus, the surface cost $\sum_{I(x,y,x) \in S_i} c_i(x, y, z) | (\mu_i, \sigma_i)$ of surface $S_i$ is parameterized with $(\mu_i, \sigma_i)$.

Globally Optimal Multiple Surface Inference. Given the surface cost parameterization (μ, σ), the inference of optimal multiple surfaces can be solved by optimizing Eqn. (1), which is a constrained convex optimization problem. In order to achieve an end-to-end training, the optimization inference needs to be able to provide gradient backpropagation, which impedes the use of traditional convex optimization techniques. We exploit the OptNet technique to integrate a primal-dual interior point method (IPM) for solving Eqn. (1) as an individual layer in our surface segmentation network (FIG. 1). Based on Amos and Kolter's theorem, the residual equation r(z, θ) to Eqn. (1) derived from the Karush-Kuhn-Tucker conditions at the optimal solution z* can be converted into a full differential equation $$J \begin{bmatrix} dz \\ d\theta \end{bmatrix} = 0,$$

where J is a Jacobian of r(z, θ) with respect to (z, θ), θ is the input to the IPM optimization module including (μ, σ), and z defines the surface locations of all λ surfaces. We thus can deduce partial differentials which can be used to compute the backpropagation gradients $$\frac{dL}{d\theta} = \frac{dL}{dz}\frac{dz}{d\theta},$$

where L is the training loss.

2.3 Network Training Strategy

Multiple loss functions are introduced to focus on the training of different modules in the proposed multiple surface segmentation network (FIG. 16). In the proposed SurfaceConv module, the softmax layer works on each image column, not on each voxel. The rational is that we assume each target surface intersects with each column by exactly once, and so the probabilities are normalized within each column. We assume SurfaceConv should output a Gaussian shaped probability map for each column, which mimics the Bayesian learning for each column and shares merits with knowledge distillation and distillation defense.

To encourage SurfaceConv outputs reasonable probability maps, an innovative weighted divergence loss $L_{Div}$ is utilized for SurfaceConv training. It inherits from KLDLoss (Kullback-Leibler divergence). It also measures distribution distance between 2 distribution, but it more emphasizes probability consistence of some weighed critical points between 2 distributions.

$$L_{Div} = \sum_i \omega_i g_i \left\| \log\left(\frac{g_i}{p_i}\right) \right\|,$$

where i indicates all pixels in N classes, and gi is ground truth probability at pixel i, $p_i$ is predicted probability at pixel i, $w_i \in W$ is a pixel-wise weight from raw image gradient magnitude: $W = 1 + \alpha \|\nabla(I)\|$, where α=10 as an experience parameter. In our applications, we hope the better probability consistence at pixels of bigger image gradients between the prediction and ground truth. We use the surface location of each reference surface on each column as μ and use either fixed σ or dynamically from the μ/σ computation module to form the ground truth Gaussian distribution.

For the RegionConv module, a generalized Dice loss $L_{GDice}$ is introduced to counter the possible high unbalance in region sizes. For the predicted surface locations, in addition to using $L_1$-loss $L_1$ to measure the difference between the prediction and the surface ground truth, we introduce a novel SmoothLoss $L_{smooth}$ to regularize the smoothness and mutual interaction of sought surfaces. More precisely, $L_{smooth}$ is the total sum of the mean-squared-errors (MSEs) of the surface location changes between any two adjacent image columns to the ground truth, plus the total sum of the MSEs of thickness on every column of each region divided by the sought surfaces. The whole network loss $L=L_{GDice}+L_{Div}+L_{smooth}+wL_1$, where w=10 is a weight coefficient for countering weak gradient when the prediction is close to the ground truth.

3. Experiments

The proposed method was validated on two Spectral Domain Optical Coherence Tomography (SD-OCT) datasets for segmenting 9 retinal surfaces, and on one public Intravascular Ultrasound (IVUS) dataset for the segmentation of lumen and media of vessel walls.

3.1 SD-OCT Retinal Surface Segmentation

TABLE 5

| ILM | RNFL-GCL | IPL-INL | INL-OPL | OPL-HFL | BMEIS | IS/OSJ | IB-RPE | OB-RPE | Overall |
|---|---|---|---|---|---|---|---|---|---|
| 0.98 ± 0.09 | 2.98 ± 0.41 | 2.59 ± 0.47 | 2.38 ± 0.43 | 2.70 ± 0.65 | 1.43 ± 0.49 | 2.82 ± 0.70 | 1.53 ± 0.28 | 1.21 ± 0.19 | 2.07 ± 0.91 |

Figure 17A:
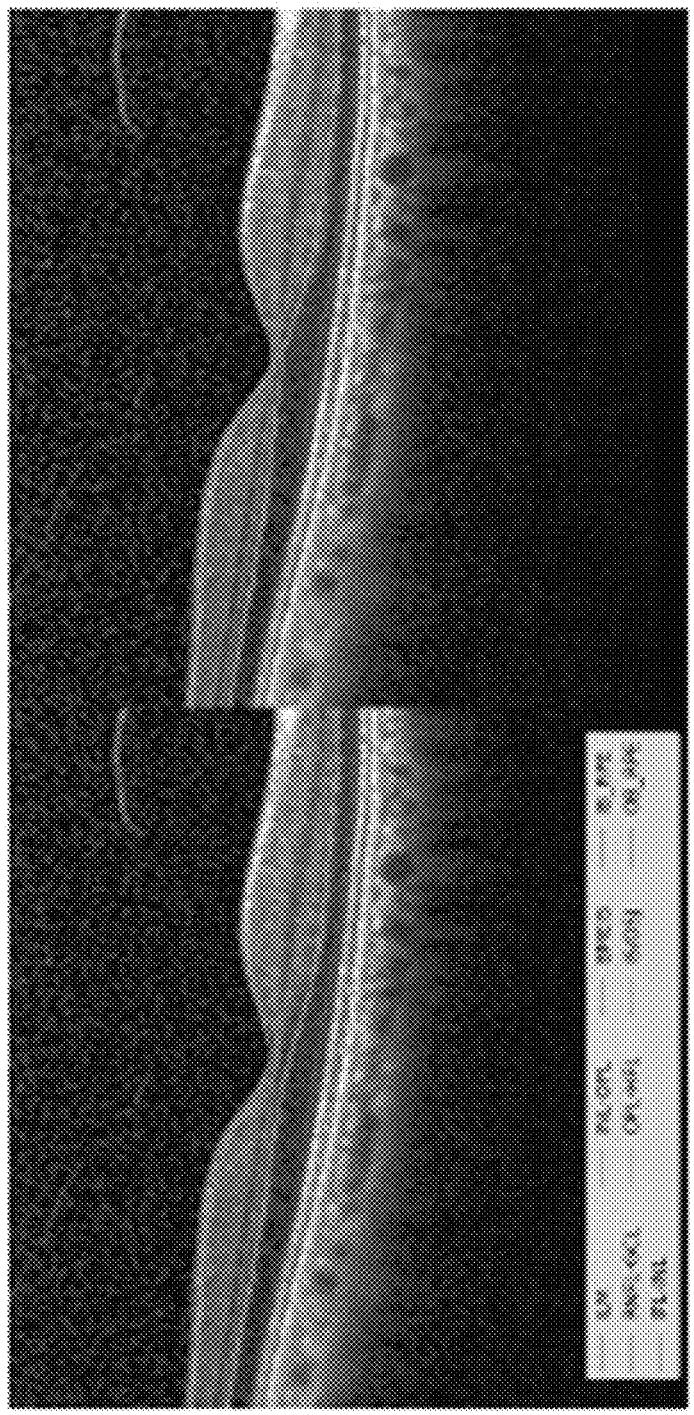
FIG. 17A and FIG. 17B illustrate sample segmentation on BES and IVUS dataset. In each subfigure, GT(L) and predictions (R).

Beijing Eye Study OCT Dataset. 47 participants were randomly selected from the population-based Beijing Eye Study 2011, in which 3468 participants of aged 50+ years were enrolled. All participants have scans on macula and optic nerve head by SD-OCT (Heidelberg Engineering, Inc., Germany) with a pixel resolution of 3.87 μm in the height (z-axis) direction. Each volume has scan composing of 31 single lines on the 30°*30° field centered on the macula. Horizontal area of scan was reduced to 20° centered on the macula to remove the optic disc region. 9 boundary surfaces (8 retina layers) (FIG. 17a) were first delineated by OCT-Explorer 3.8 [10], a graph-search based ophthalmic image analysis software [1, 11, 5], and then were manually corrected by an experienced ophthalmologist. In our experiment, we use fixed σ=20 to generate the Gaussian ground truth and used gaussian and pepper & salt noises for data augmentation. A 10-fold cross-validation were performed to evaluate our method: 8 folds for training, 1-fold for validation, and 1 fold for testing. The mean absolute surface distances (MASDs) for each sought surface over the testing results on all 47 scans are shown in Table 5. Sample segmentation results are illustrated in FIG. 17A.

Public JHU OCT Dataset. The public JHU retinal OCT dataset [7] includes 35 human retina scans acquired on a Heidelberg Spectralis SD-OCT system, of which 14 are healthy controls (HC) and 21 have a diagnosis of multiple sclerosis (MS). Each patient has 49 B-scans with pixel size 496 1024, and 9 ground truth surfaces on each B-Scan. The z-axial resolution in each A-scan is 3.9 μm. The original images were manually delineated with 21 control points on each surface, and then a cubic interpolation was performed on each B-scan to obtain the ground truth by a Matlab script [8]. Each B-scan was cropped to keep the center 128 rows to from a 128×1024 image.

The same data configuration and image input as in [8] for training (6 HCs and 9 MS subjects) and testing (the remaining 20 subjects) were adopted in our experiment. A fixed σ=8 was used to generate Gaussian ground truth. Gaussian and pepper&salt noises were used for data augmentation. The MASDs for the proposed and He et al.'s methods are shown in Table 6. While marginally improving the MASDs, our method demonstrates to be much more robust over the state-of-the-art He et al.'s method [8] with an improvement of 11.5% on the standard deviation. Please refer to the supplementary material for the ablation experiments on this data set.

TABLE 6

| | ILM | RNFL-GCL | IPL-INL | INL-OPL | OPL-HFL | ELM | IS/OSJ | OS-RPE | BM | Overall |
|---|---|---|---|---|---|---|---|---|---|---|
| He[8] | 2.41 ± 0.40 | 2.96 ± 0.71 | 2.87 ± 0.46 | 3.19 ± 0.53 | 2.72 ± 0.61 | 2.65 ± 0.73 | 2.01 ± 0.57 | 3.55 ± 1.02 | 3.10 ± 2.02 | 2.83 ± 0.99 |
| Ours | 2.32 ± 0.27 | 3.07 ± 0.68 | 2.86 ± 0.33 | 3.24 ± 0.60 | 2.73 ± 0.57 | 2.63 ± 0.51 | 1.97 ± 0.57 | 3.35 ± 0.83 | 2.88 ± 1.68 | 2.78 ± 0.85 |

3.2 IVUS Vessel Wall Segmentation

TABLE 7

| Methods | Lumen | | | | Media | | | |
|---|---|---|---|---|---|---|---|---|
| | Jacc (%) | Dice(%) | HD (mm) | PAD (mm) | Jacc (%) | Dice (%) | HD (mm) | PAD (mm) |
| VGG U-net [3] | 0.80 ± (—) | | | | 0.81 ± (—) | | | |
| Graph Search [17] | 0.86 ± 0.04 | | 0.37 ± 0.14 | 0.09 ± 0.03 | 0.90 ± 0.03 | | 0.43 ± 0.12 | 0.07 ± 0.03 |
| OurMethod | 0.85 ± 0.06 | 0.92 ± 0.04 | 0.36 ± 0.2 | 0.08 ± 0.06 | 0.89 ± 0.07 | 0.94 ± 0.04 | 0.40 ± 0.3 | 0.06 ± 0.06 |

Figure 17B:
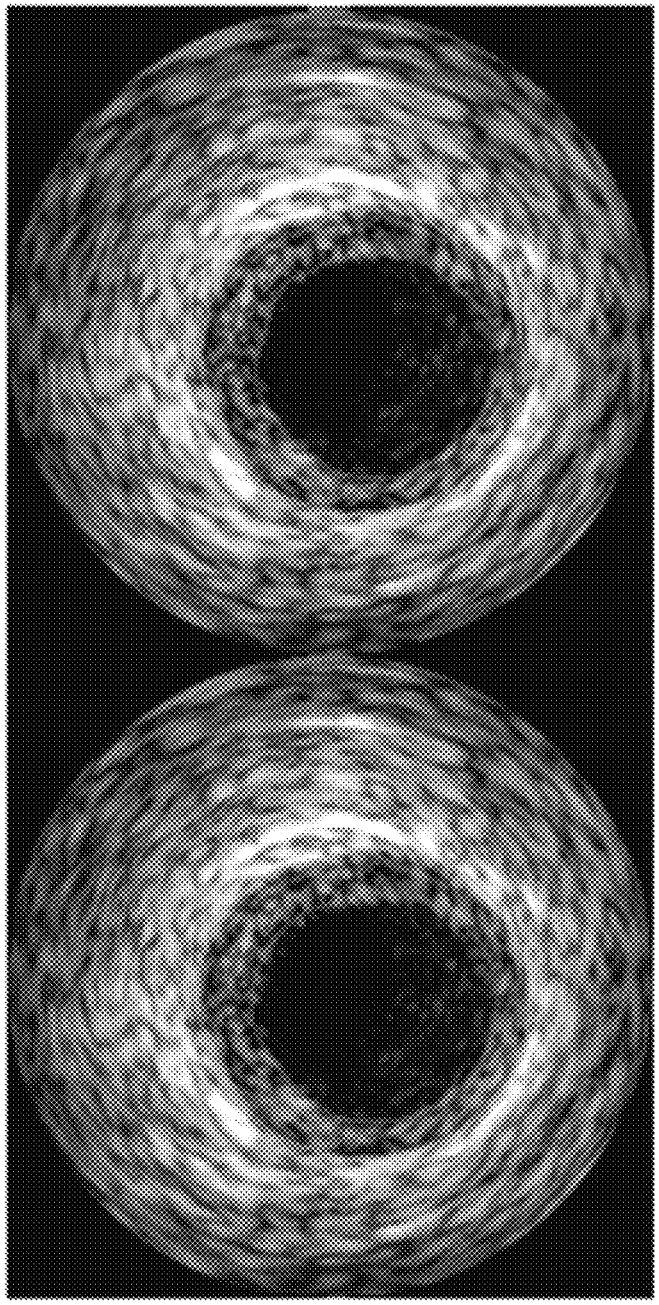

The data used for this experiment was obtained from the standardized evaluation of IVUS image segmentation database. In this experiment, the dataset B was used. This dataset consists of 435 images with a size of 384×384, as well as the respective expert manual tracings of lumen and media surfaces. The pixel size is 0.026×0.026. It comprises two groups a training set (109 slices) and a testing set (326 slices). The experiment with the proposed method was conducted in conformance with the directives provided for the IVUS challenge. In our experiment, we randomly split the 109 training slices into 100 slices for training and 9 slices for validation. Each slice was transformed to be represented in the polar coordinate system with a size of 192×360. Jaccard Measure (JM), Percentage of Area Difference (PAD) and Hausdroff Distance (HD) are utilized to evaluate segmentation accuracy, which are calculated using a Matlab script published in IVUS challenge. The results are summarized in Table 7 comparing to the state-of-the-art automated methods. Sample segmentation results are illustrated in FIG. 17B.

4. Conclusion

Here, a novel DL segmentation framework for multiple interacting surfaces is proposed with end-to-end training. The globally optimal solutions are achieved by seamlessly integrating two DL networks: one for surface cost parameterization with a Gaussian model and the other for total surface cost minimization while explicitly enforcing the surface mutual interaction constrains. The effectiveness of the proposed method was demonstrated on SD-OCT retinal layer segmentation and IVUS vessel wall segmentation. Though all our experiments were conducted on 2D, the method is ready for applications in 3D.

Section 3: Model-Based Deep-Learning MoDL Framework

Precision three-dimensional imaging is now the norm of clinical practice across medicine. The greatest benefit of precision imaging can only be realized through highly automated and correct quantification of the resulting volumetric images. Segmentation of tissues is a clinical necessity for image quantification in many diagnostic and treatment tasks of daily healthcare. Examples include definition of retinal layer structure in glaucoma, age-related macular degeneration, and diabetic macular edema from retinal optical coherence tomography (OCT) to inform treatment decisions, and delineation of tumor tissues and adjacent organs for radiation treatment planning, tumor staging, and prognostication from MR/PET/CT. It is very clear that the current need for time-consuming and tedious manual quantitative analysis relying on slice-by-slice tracing in all these and many other clinical scenarios is hampering the progress of precision medicine in everyday patient care. It is equally clear that fully automated methods offering complete success in all image datasets are not available today but their development will remain of primary importance for routine clinical practice and research. That is what makes the proposed research so highly significant.

The methods, apparatus, and systems described here include a model-based deep-learning (MoDL) framework, algorithms, and general tools for optimal segmentation of biomedical images. We have previously demonstrated the practical utility of an innovative graph-based surface segmentation framework for generally n-D biomedical image segmentation and—in a translational setting—established its applicability to a wide variety of clinically important medical image analysis tasks. Advantages of the framework include: 1) guaranteed optimal quality segmentation of complex objects with respect to the underlying graph segmentation model; and 2) the enforcement of desired/required critical priors (e.g., shape, surface smoothness, and mutual surface interaction) in segmentation, both globally and locally. The major drawback is associated with the need for handcrafted model parameters in the graph model. Recently, DL has been emerging as a powerful method for medical image segmentation due to its superior data representation learning capacity. While current DL methods outperform classical algorithms, their direct application to the medical setting is challenging because of the following limitations: (i) the need for extensive training data, which is an almost insurmountable obstacle in clinic; and (ii) difficulty in exploiting prior information within current frameworks.

The unification of the strengths of both DL and the graph surface segmentation model in a single framework while minimizing their respective limitations provides a significant leap forward in transforming medical image segmentation. Image segmentation based on the integration of the graph surface segmentation model with deep learning, offering globally optimal segmentation solutions efficiently with substantially reduced training data serves to significantly increase quantitative analysis performance in routinely acquired, diagnostic-quality medical images across diverse application areas.

The methods described herein include continuing focus on the global optimality of the solution. The optimization inference of the MoDL segmentation framework may be realized with layered neural networks so that close-to-real-time performance may be achieved.

Precision three-dimensional imaging is now the norm of clinical practice across medicine. The traditional approach in medical image analysis, to quantify biomarkers—for example the size of a tumor or the shape of a valve—remains highly relevant. This process, called segmentation, finds the boundaries or, in the 3-D case, the surfaces that separate organs, tissues or regions of interest. With the advances in precision medicine, the needs for automated image segmentation for diagnostic and therapeutic purposes are widespread in today's healthcare. With the ever-increasing resolution of clinical scanners, highly automated analysis must replace today's clinical reality of manual slice-by-slice tracing of tissues and organs in two-dimensional image stacks, which is taking up increasing amounts of physician time. Quantitative image analysis in the clinic is thus currently not done as frequently as desirable. In addition, automated quantitative algorithms that base their output on the analysis of medical images reduce the diagnostic/therapeutic variability that is common in physician review. The methods disclosed address this indispensable need of high levels of automation in segmenting clinical-quality images.

Significance of Model-Based Deep-Learning (MoDL) Segmentation. Armed with superior data representation learning capacity, deep learning (DL) methods are emerging as powerful alternatives to current segmentation algorithms for many medical image segmentation tasks. The state-of-the-art DL segmentation methods in medical imaging include fully convolutional networks (FCNs) and U-net, which model the segmentation problem as a pixel-wise or voxel-wise classification problem. Those convolutional neural network (CNN) methods have some critical limitations that restrict their use in the medical setting: (i) Training data demand: current schemes often need extensive training data, which is an almost insurmountable obstacle due to the risk to patients and high cost. (ii) Difficulty in exploiting prior information (shape, boundary smoothness and interaction): the methods are classification-based in nature, and the output probability maps are relatively unstructured. (iii) Vulnerability to adversarial noise: recent research has demonstrated that, compared to the segmentation CNNs alone, the integration of a graphical model such as conditional random fields (CRFs) into CNNs enhances the robustness of the method to adversarial noise.

Methods disclosed herein unify the powerful feature learning capability of DL with our successful graph-based surface segmentation model in a single deep neural network for end-to-end learning to achieve globally optimal segmentation. Our pilot study has demonstrated that the proposed MoDL surface segmentation method outperforms the baseline U-net algorithm substantially: 1) the segmentation accuracy was improved by 65.6% and 61.0% for retinal OCT segmentation in normal and diseased subjects, respectively; and 2) the proposed model was able to achieve better segmentation performance while being trained with 10% training data compared to the U-net model trained on the whole dataset.

Significance of Global Optimality. The proposed MoDL surface segmentation method guarantees globally optimal segmentation results. Global optimality is highly significant and has many advantages over iterative locally optimal approaches, for which recovery from convergence to a local optimum increases complexity and, thus, computing time, and decreases performance. Imperfections in a globally optimal solution relate directly to the model parameters rather than to a computational/numerical problem during optimization. The model parameters thus solely reflect image-based properties and apriori anatomical knowledge, and are transparent and understandable for feature learning. This would be especially critical for the model-based DL segmentation approaches. During the network training, an optimal solution can be achieved for each iteration with respect to the model-in-training. The backpropagation can thus "concentrate" on learning the right features, instead of being distracted by imperfect solutions. The known difficulty of training the CRF-as-RNN network is partially due to its inability of achieving an optimal solution. Without the guarantee of optimality, the segmentation solutions during the training can be far from the optimal ones in any scale, which could cause confusions about the sources of the loss error—imperfect features or suboptimal solutions—thus compromising the feature learning capability of the network. Hence, global methods can be more reliable and robust. In our pilot study, we do observe that the proposed MoDL surface segmentation model is much more efficient to train than the CRF-as-RNN model.

Significance of Using Limited Annotation Data for Model Training. Deep learning approaches perform best when trained using massive samples with "true" labeling associated with them. That is an almost insurmountable obstacle because of the privacy risk and the costly clinical experts required to provide reference standards. Although training datasets are increasingly available in various fields of medical imaging research, the volume available is still several orders of magnitude less than a database like ImageNet, the use of which leads to many successful DL applications in computer vision. This substantially compromises the performance and generalizability of medical DL models. The lack of labeled data motivates the study of methods that can be trained with limited supervision.

In current DL models, it is not trivial at all to incorporate the prior information of the target object, which forces the network to learn every aspect of the object from scratch, inevitably demanding a large amount of training data. In the proposed MoDL segmentation framework, the known model is integrated into the DL network, which provides an advanced "attention" mechanism to the network. The network does not need to learn the prior information encoded in the model, reducing the demand of labeled data, which has been demonstrated in our pilot study. On the other hand, weak annotations such as bounding boxes and rough segmentation of medical images are relatively easy to obtain. For instance, the traditional segmentation methods can be used to produce approximated segmentation with a low cost. Those weak annotations, in fact, may contain useful information—a bounding box can indicate the location of the target object, and the rough segmentation may provide the appearance and shape of the object. It is necessary to utilize weakly supervised learning approaches to incorporate such information into the DL network to turn its focus to learning the object more directly. In addition, unlabeled image data are adequate in the clinical centers.

Methods described herein advances the state-of-the-art by leveraging both DL and graph models to develop an MoDL optimal surface segmentation (MoDL-OSSeg) framework. For any segmentation task, MoDL-OSSeg is trained on the corresponding training dataset to produce a specific MoDL-OSSeg model for the task. With strong ability to directly learn from annotated (and unannotated) data, DL is highly adaptable to different image modalities and medical applications. For instance, U-Net has been adopted to a variety of tasks with only minor modifications. In addition, the graph-based optimal surface segmentation method is a powerful framework applicable to different image modalities, complex objects and structures. Thus, the framework may work well on different image modalities and applications.

The described methods provide DL approaches for accurate delineation of boundary surfaces of medical objects in 3D. It is built on our great success in the development of graph-based optimal surface segmentation methods; they were so successful due to the incorporation of a global structure for the shapes of the target objects into a graphical model. Our approaches in the present study combine the strengths of both CNNs and the graph-based approaches in one unified framework, blending learning and inference in a deep structured model for surface segmentation. Notable contributing innovations are, as follows. (1) The unification of the strengths of both CNNs and the graph segmentation model into a single framework will be a big leap forward in transforming medical image segmentation. The graph segmentation model will be armed with the power of CNNs to learn model features, and CNNs will gain the capability to capture global properties such as object shape and contextual information. (2) Globally optimal segmentation is achieved with respect to the very successful graph segmentation model for the first time within the DL framework. (3) The integration of the graph segmentation model into DL enables training the segmentation network with substantially reduced annotations, which will be further leveraged with semi-supervised learning and weakly supervised learning. (4) Single coherent and theoretically well-founded framework that is applicable to diverse application areas, facilitates highly automated clinically appropriate analysis of all clinically acquired images of analyzable-quality and thus facilitates broad adoption of this approach in precision medicine tasks in the clinic.

The proposed approach is built on our prior development of graph-based optimal surface segmentation (Graph-OSSeg) methods for medical images, which have been widely adopted by the medical imaging community. Recently, DL has been shown to excel at various medical image segmentation tasks, due to its superior capability of learning rich expressive feature representations automatically from data, as opposed to the hand-crafted features. However, DL segmentation methods are insufficient for learning global contextual information and multi-scale spatial correlations among image volumes. Here, we provide an MoDL optimal surface segmentation (MoDL-OSSeg) framework to unify DL and the Graph-OSSeg model, which greatly enhances the strengths of both while minimizing drawbacks of each, resulting in a fundamental methodology for globally optimal surface segmentation in medical imaging.

Graph-Based Optimal Surface Segmentation

The Graph-OSSeg method generally consists of the following steps:
  (1) Pre-segmentation. Given an image volume, initial surfaces are obtained to approximate to the (unknown) boundaries for the target object. A (triangulated) mesh $\mathcal{M}$ is then generated for each initial surface, which defines the global shape of the target object, including the neighboring relations among voxels on the sought surface. The mesh $\mathcal{M}$ can also be viewed as a shape structure graph $\mathcal{G}=(\mathcal{V}, \mathcal{R})$ with all vertices in $\mathcal{M}$ as the node set $\mathcal{V}$ and all the triangle edges as the arc set $\mathcal{R}$.
  (2) Column structure generation. For each vertex p of the mesh $\mathcal{M}$, a column Col(p) of voxels is created by resampling the input image along a ray intersecting the vertex (one ray per mesh vertex) based on the medial surface technique, the electric lines of force, or gradient vector flows to capture the surface location on each column. The adjacency among columns is specified by the shape structure graph. Each sought surface is ensured to cut each column exactly once, thus homomorphic to the pre-segmentation, preserving the global structure of the shape.
  (3) Optimization. The set S of κ sought surfaces, with $S=\{S_1, S_2, \ldots, S_\kappa\}$, are computed simultaneously by minimizing an energy function E(S), which consists of data fidelity terms, shape compliance terms, and surface interaction terms. The data fidelity term and the pairwise shape compliance (surface smoothness) term jointly model the detection of a single surface homomorphic to the specified global shape structure (e.g., the mesh from the pre-segmentation); the interacting relations between surfaces are incorporated into the model with the surface interaction term. This model, in fact, is rooted at Markov Random Fields. Mathematically, the energy function E(S) is of the following form:

$$\mathbb{E}(S) = \sum_{s=1}^{\kappa} \left\{ \underbrace{\sum_{p \in V} \psi_i^{(p)}(S_i(p))}_{\text{data fidelity}} + \underbrace{\sum_{(p,q) \in N} \phi_i^{(p,q)}(S_i(p), S_i(q))}_{\text{shape compliance}} \right\} + \underbrace{\sum_{i,j} \sum_{p \in V} \varphi_{i,j}^{(p)}(S_i(p), S_j(p))}_{\text{surface interaction}}$$

(Equation 3.1)

where $S_i(p)$ indicates the surface location of $S_i$ on Column Col(p), $\psi_i^{(p)}$ is the unary data fidelity potential, $\varphi_i^{(p,q)}$ measures the shape compliance potential of each surface, and $\phi_{i,j}^{(p)}$ is the surface interaction potential.

MoDL Surface Segmentation

Figure 22:
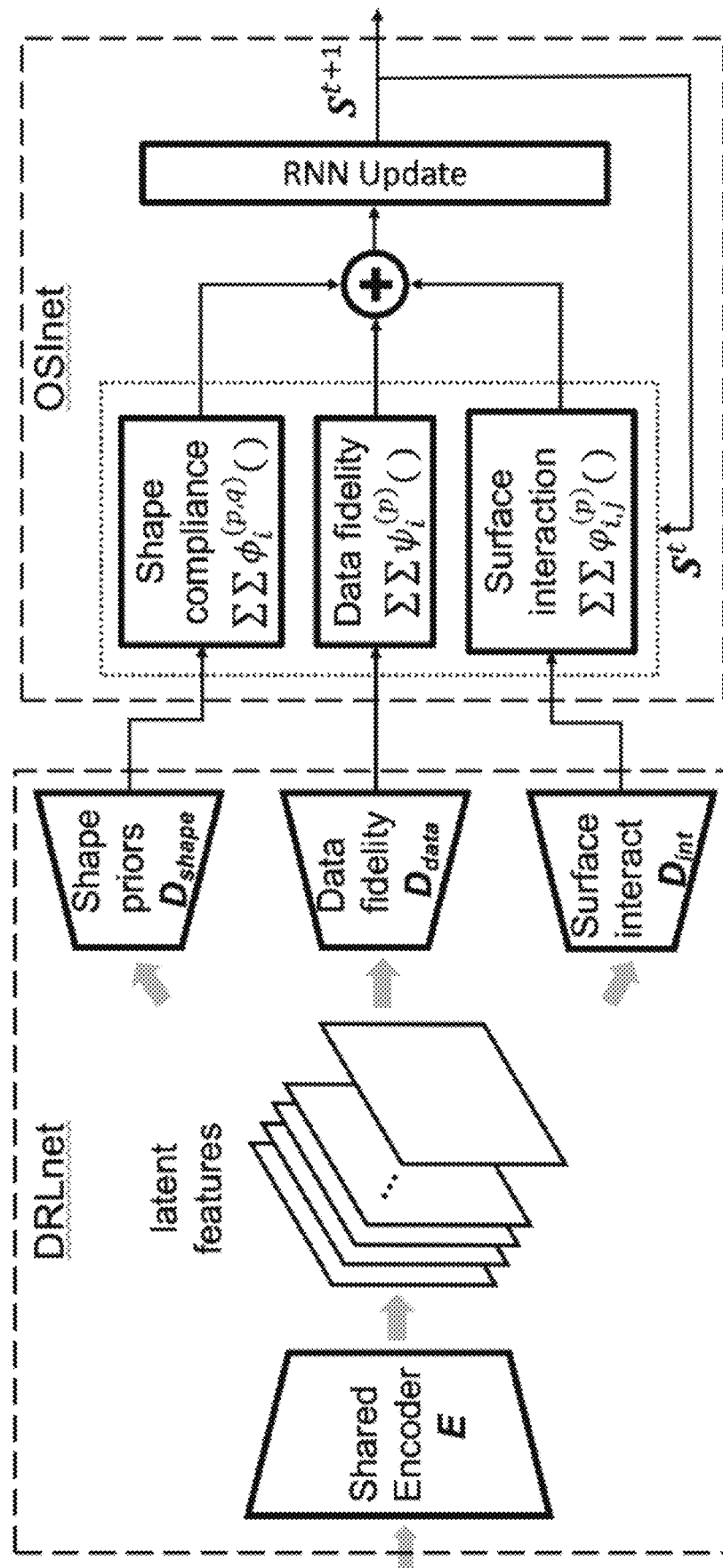
FIG. 22 is an illustration of the proposed MoDL-OSSeg segmentation network. The DRLnet CNNs for feature extraction is seamlessly integrated with the OSInet RNN for the optimal surface inference to enable an end-to-end training. All three CNNs, $E\|D_{data}$, $E\|D_{shape}$ and $E\|D_{int}$, adopt an encoder-decoder architecture and share a common encoder. The network $E\|D_{shape}$ is used to learn shape priors for each surface, which are incorporated into the graph model as pairwise potentials. The network $E\|D_{int}$ strives to learn surface interaction potentials. The unary data fidelity potentials are learned with the network $E\|D_{data}$.

To bring a new leap in performance, we provide for seamlessly integrating deep learning and the Graph-OSSeg model into a single deep network, merging the powers of both approaches. The MoDL-OSSeg framework consists of two integrative components—DRLnet and OSInet (FIG. 22). The DRLnet is a DL network aiming to learn data representations in the form of those in the Graph-OSSeg model, that is, the data fidelity potentials, shape compliance potentials, and the surface interaction potentials. The OSInet strikes to solve the optimal surface inference with a deep network. Thus, the whole network (DRLnet+OSInet) can then be trained in an end-to-end fashion and output globally optimal solutions for surface segmentation.

To make the MoDL-OSSeg framework work, there are several key challenges which are addressed. (1) Continuous surface positions. The surface segmentation is modeled in Eqn. (3.1) as an optimization problem in the discrete space. That is, the surface position $S_i(p)$ is located at one of those voxel centers on each column Col(p), which can be viewed as a sequence of ordered points on the column (i.e., a line segment). In this model, the partial volume effect caused by discretizing the continuous intensity function uniformly by sensors is not well considered, which limits the segmentation accuracy of the method. In fact, the surface can intersect each column at any place. Our previous work demonstrated improved segmentation performance by considering the partial volume effect and allowing the surface positions off the voxel centers. Thus, in our MoDL-OSSeg model, we provide for relaxing $S_i(p)$ as a continuous variable, which also makes it more suitable to leverage DL for surface segmentation, as it is ready to make use of gradient back-propagation for network training. This relaxation allows us to make use of powerful mathematical optimization tools for solving the optimal surface inference with a DL network. (2) Parameterization of data fidelity potentials. Quadratic functions have been widely used to model the shape compliance potentials and the surface inter-action potentials, and have been proven effective, which also enables to achieve globally optimal solutions by maximum flow algorithms. The data fidelity potentials, on the other hand, can be arbitrary functions, which may ease the cost function design, while hand-crafted features are used in our Graph-OSSeg model. However, an ideal data fidelity potential should express a certain type of convexity: As we aim to minimize the energy function E(S), the cost of the data fidelity potential should be low at the surface location; while the distance increases from the surface location along the column, the cost should increase accordingly. Here, we may utilize DL networks to learn a convex cost function for the data fidelity potentials of each column. Together with the convex potentials for shape compliance and surface interaction, we are able to solve the optimal surface inference (i.e., optimizing the energy function E(S)) efficiently with an integrated DL network. (3) Limited annotated data for training. An extensive annotation effort is commonly needed to train a DL segmentation model with good performance. Although our pilot studies have demonstrated that the proposed MoDL-OSSeg model can be trained with substantially limited data, the scarcity of annotations in medical imaging necessitates further reduction of annotated data for model training by making use of the power of weekly supervised and semi-supervised learning.

To properly reflect sex, age, or other characteristics of the image data used for training, these biomarkers may be used as independent input variables to all DL processes and their contribution to segmentation performance.

MoDL-OSSeg is the State-of-the Art for Retinal OCT Segmentation

The necessity of direct surface segmentation with DL has been demonstrated in our previous work (referred to as DL-surf), in which the surface segmentation problem is modeled as a regression problem with DL by exploiting the voxel column structure as in our graph-based model. Our experiment demonstrated significant accuracy improvement for DL-surf compared to Graph-OSSeg and the U-net method on retinal OCT data.

We have recently introduced an MoDL-OSSeg framework for a single terrain-like surface segmentation in 2D, which is formulated as a special optimization problem of Eqn. (3.1) without the surface interaction term. In this case, the shape structure graph $\mathcal{G}=(\mathcal{V}, \mathcal{N})$ is basically a 2D grid with each grid point $p \in \mathcal{V}$ defining a voxel column Col(p), and the edges $(p, q) \in \mathcal{N}$ defining the neighboring setting of the voxels on the target surface $\mathcal{S}$. The data fidelity potential $\psi^{(p)}(S(p))$ is parameterized as a Gaussian $G_p = (\mu_p, \sigma_p)$ to model the likelihood of the column voxels on the target surface S, and to define $$\psi^{(p)}(S(p)) = \frac{(S(p) - \mu_p)^2}{2\sigma_p^2},$$

which is convex with respect to the surface positions S(p) on column Col(p). The shape compliance potential here is used to penalize the discontinuity of the surface on any two neighboring columns Col(p) and Col(q), with $\phi^{(p,q)}(S(p), S(q)) = (S(p) - S(q) - \delta_{p,q})^2$, where $\delta_{p,q}$ is the expected surface location change between the two neighboring columns. Both $(\mu_p, \sigma_p)$ and $\delta_{p,q}$ can be learned with deep neural network blocks in DRLnet (FIG. 22). With the Gaussian parameterization of the data fidelity potentials, the energy function $\mathbb{E}(S)$ can be optimized analytically to achieve its globally optimal solution by computing the inversion of the corresponding Hessian matrix, which enables free embedding within our deep neural network and enables its effective end-to-end training.

Furthermore, we developed the MoDL-OSSeg framework for simultaneous segmentation of multiple mutually interacting surfaces with global optimality. In this scenario, we compute the sought surfaces simultaneously while enforcing that no two surfaces cross each other. This is formulated as optimizing Eqn. (3.1) with the non-crossing constrains, that is, $S_i(p) - S_j(p) \geq 0$ for any two adjacent surfaces $S_i$ and $S_j$. The data fidelity potentials are parameterized with Gaussians and leaned with deep neural network blocks in DRLnet (FIG. 22). The constrained optimization problem is solved by the primal-dual Interior Point Method, which can be implemented with a layer of neural networks in OSInt (FIG. 22). As demonstrated in our previous Graph-OSSeg work, MoDL-OSSeg for simultaneous segmentation of multiple interacting surfaces leads to much more accurate and robust segmentation than segmenting those surfaces individually, highlighting the importance of incorporating surface interaction priors.

Figure 18:
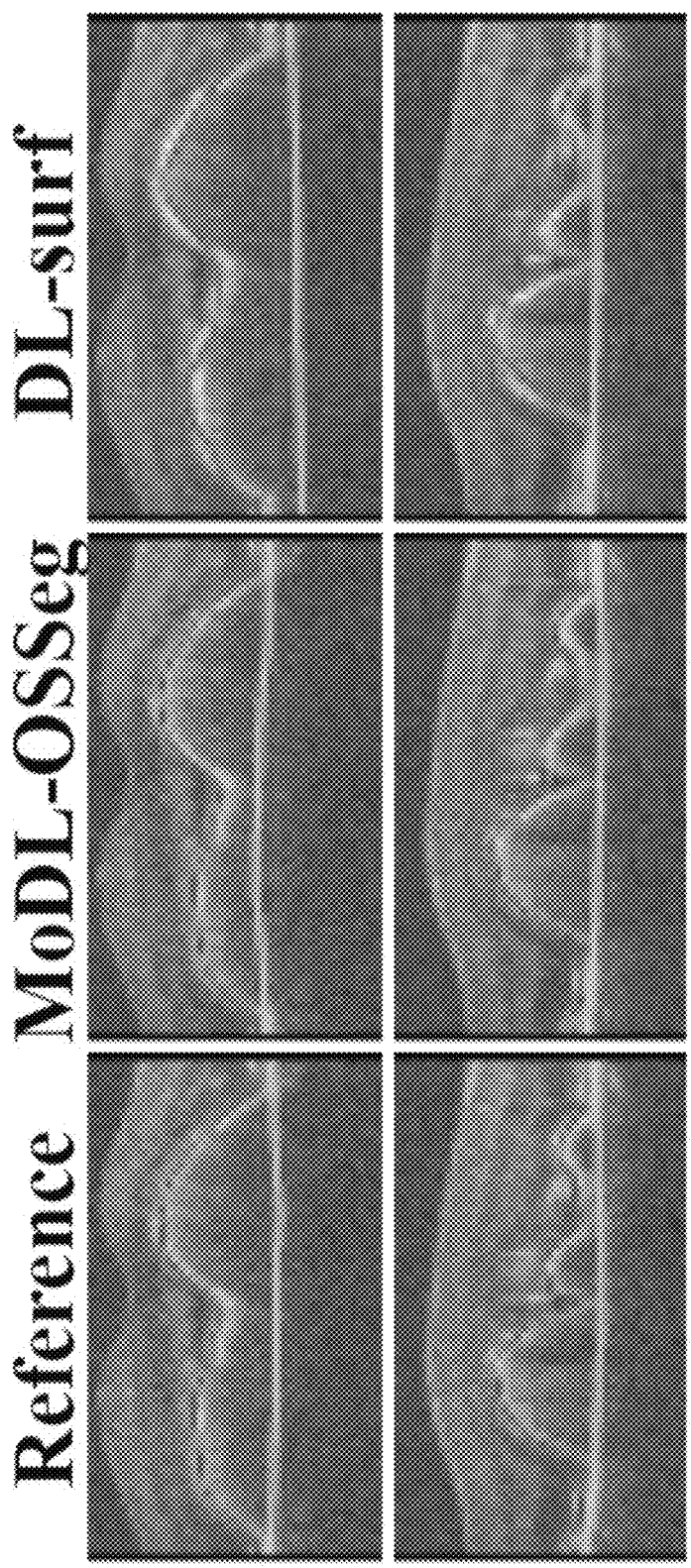
FIG. 18 illustrates that the MoDL-OSSeg out-performs the DL surface segmentation. IB_REPE (red/bottom) and OB_RPE (green/above). Due to the lack of contextual information, the DL-surf method was not able to locate the accurate surface positions for OBE ($1^{st}$ row); while without the capability of learning the surface shape, it was not able to capture the subtle changes of the surface IB_RPE ($2^{nd}$ row).
Figure 19:
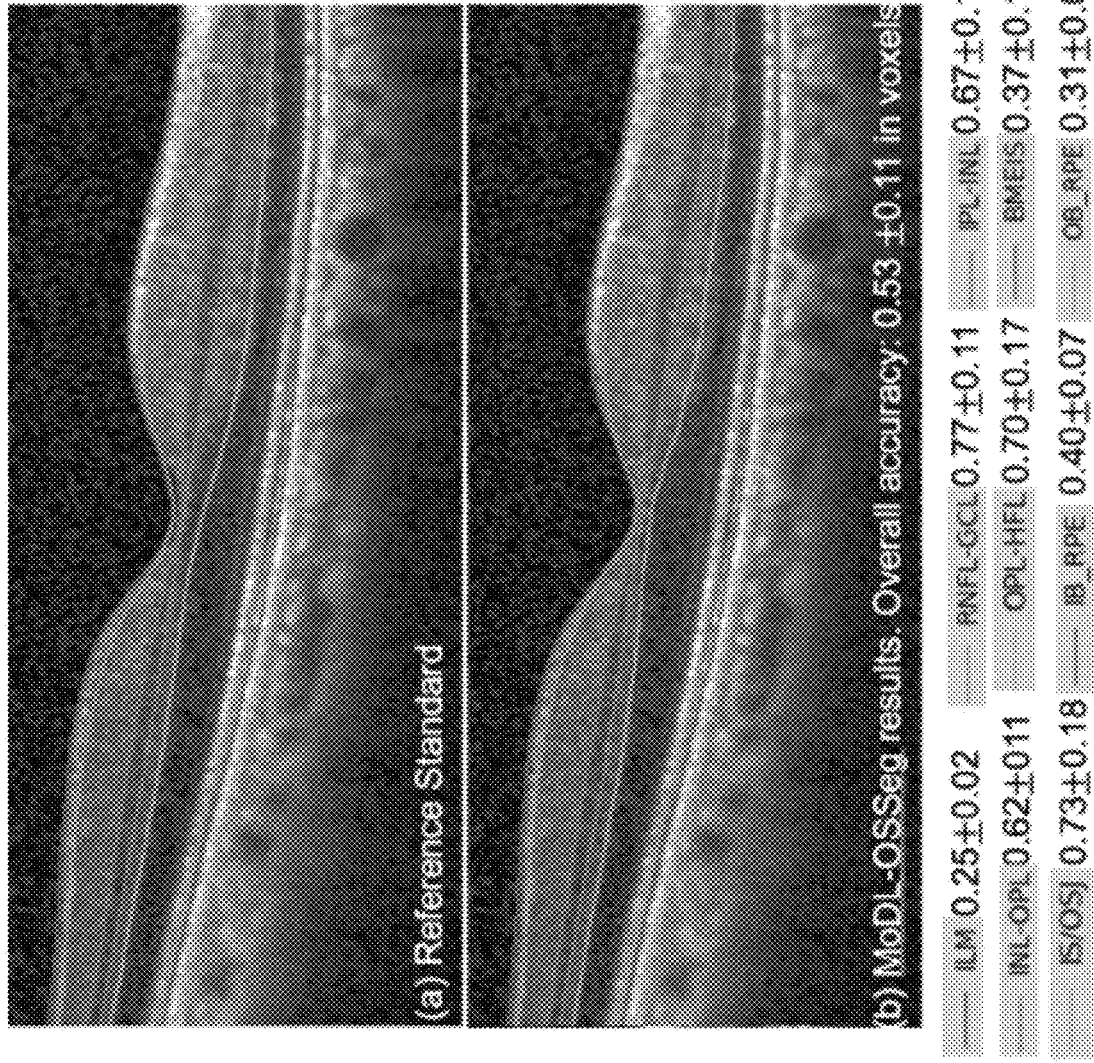
FIG. 19 illustrates MoDL-OSSeg for simultaneous segmentation of 9 surfaces in OCT scans. The average UMSP error of all 9 surfaces over 47 OCT scans is 0.53±0.11 in voxels. The lower panel shows the UMSP error for each individual surface.

The MoDL-OSSeg method was validated on a public retinal OCT dataset for segmenting two challenging IB_RPE and OB_RPE sur-faces simultaneously, which was trained on 79 normal and 187 AMD retinal OCT volumes and tested on 18 normal and 41 AMD retinal OCT scans. Our MoDL-OSSeg method significantly outperformed the DL-surf approach. The unsigned mean surface positioning errors (UMSPs) for normal and AMD subjects were improved by 65.6% and 61.0%, respectively, over the DL-surf method (Table 8 and FIG. 18). We also validated the MoDL-OSSeg method on another retinal SD-OCT dataset with 47 scans for simultaneously segmenting 9 surfaces. By performing 10-fold cross validation, we demonstrated that MoDL-OSSeg achieved sub-voxel accuracy for all 9 surfaces with an average UMSP error of 0.53±0.11 in voxels (FIG. 19), substantially outperforming Graph-OSSeg (0.79±1.33). The average execution time for each 3D scan was 3.82 seconds, which was faster than that of Graph-OSSeg by at least an order of magnitude.

TABLE 8

Comparison of MoDL-OSSeg with the DL Surface segmentation with respect to the unsigned mean surface positioning errors (UMSP) (mean ± standard deviation) to the reference standard in voxels. Results are shown with both models trained on 100% and 10% of the training set, respectively.

| Surface | Training data | Normal | | AMD | |
| --- | --- | --- | --- | --- | --- |
| | | MoDL-OSSeg | DL-surf | MoDL-OSSeg | DL-surf |
| IB_RPE | 100% | 0.49 ± 0.33 | 1.15 ± 0.21 | 0.54 ± 0.28 | 2.0 ± 0.65 |
| | 10% | 0.62 ± 0.46 | 1.49 ± 0.28 | 0.65 ± 0.30 | 2.96 ± 1.72 |
| OB_RPE | 100% | 0.64 ± 0.13 | 1.11 ± 0.12 | 0.94 ± 0.48 | 1.99 ± 0.87 |
| | 10% | 0.73 ± 0.15 | 1.73 ± 0.45 | 1.19 ± 0.70 | 3.43 ± 2.08 |

MoDL-OSSeg Model can be Trained with Limited Annotations

The power of the MoDL-OSSeg model has been tested with limited annotated data for training. We utilized 10% of the whole training dataset of the retinal OCT volumes to train both MoDL-OSSeg and DL-surf models for the retinal surface segmentation. As shown in Table 8, our MoDL-OSSeg trained with 10% of training data significantly outperformed DL-surf trained on the whole dataset. We conducted the same experiments on the standardized IVUS image database using 100 images as a whole training set and 326 scans for testing. The results show that even with just 10 annotated scans for training, our MoDL-OSSeg method still can segment both lumen and media (0.87±0.07 and 0.89±0.08 in Jaccard Measure, respectively) with much higher accuracy than the DL-based VGG-U-net approach (0.80 and 0.81, respectively). It also achieved comparable performance to the best semi-automated method.

Quad-Meshing Enables Non-Terrain Surface Segmentation with MoDL-OSSeg

Figure 20:
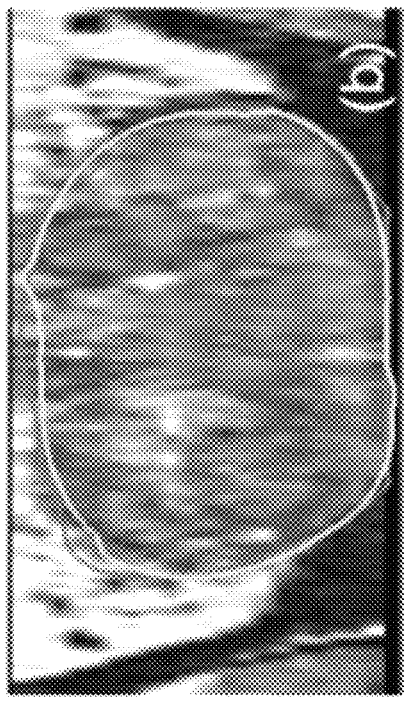
FIG. 20 shows in panel (a) an illustrate of the shape-aware patch0generation method for a closed surface. A harmonic mapping is computed to map the initial triangular mesh (blue) to a pre-defined quadrilateral mesh (red) of a unit sphere (left). The inverse harmonic mapping is then used to compute the quadrilateral mesh for the initial surface (right). The sampled column on a mesh vertex is indicated as green. Panel (b shows prostrate segmentation in one slice of a 3D volume. Magenta-standard reference, Yellow-MoDL-OSSeg.
Figure 20:
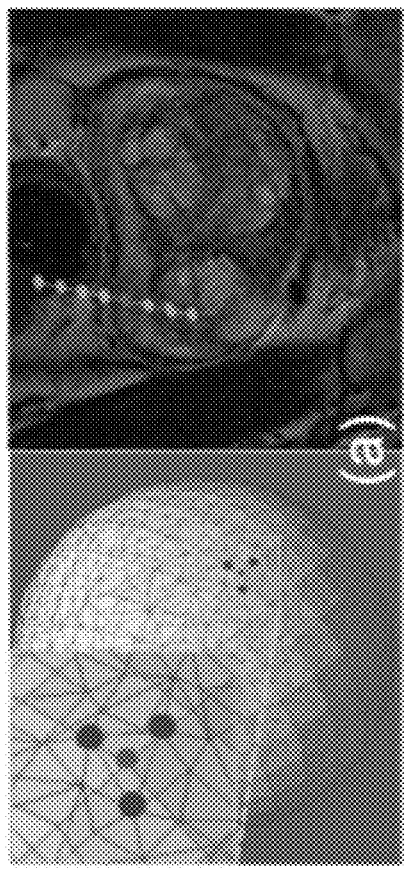

Convolutional neural networks are known to perform best on images with a regular grid structure. To segment a non-terrain-like surface with Graph-OSSeg, a resampled image that is de-fined on a triangulated mesh of an initial surface needs to be generated, but does not necessarily hold a regular grid structure for CNNs. Recently, we introduced a shape-aware patch-generation scheme for segmenting a closed object to overcome that obstacle by dividing the initial surface into six surface patches each represented with a quadrilateral mesh by a harmonic mapping. A resampled image is then generated in a cuboid gird structure for the search of a terrain-like surface for each patch (FIG. 20). We have recently extended the pilot MoDL-OSSeg method for terrain-like surface segmentation in 3D to segment each surface patch to generate the segmentation for the whole object. Our experiments on 70 3D prostate MR images demonstrated that the proposed shape-aware patch generation scheme with the pilot MoDL-OSSeg method was effective. Our method significantly outperformed the state-of-the-art DL methods and the traditional graph-based approaches with Dice coefficient (DSC) of 0.89±0.03, average surface distance error of 1.36 0.34 mm, and Hausdorff distance of 7.28±3.20 mm.

Gradient Vector Flow (GVF) Representation of Shape Priors

Figure 21:
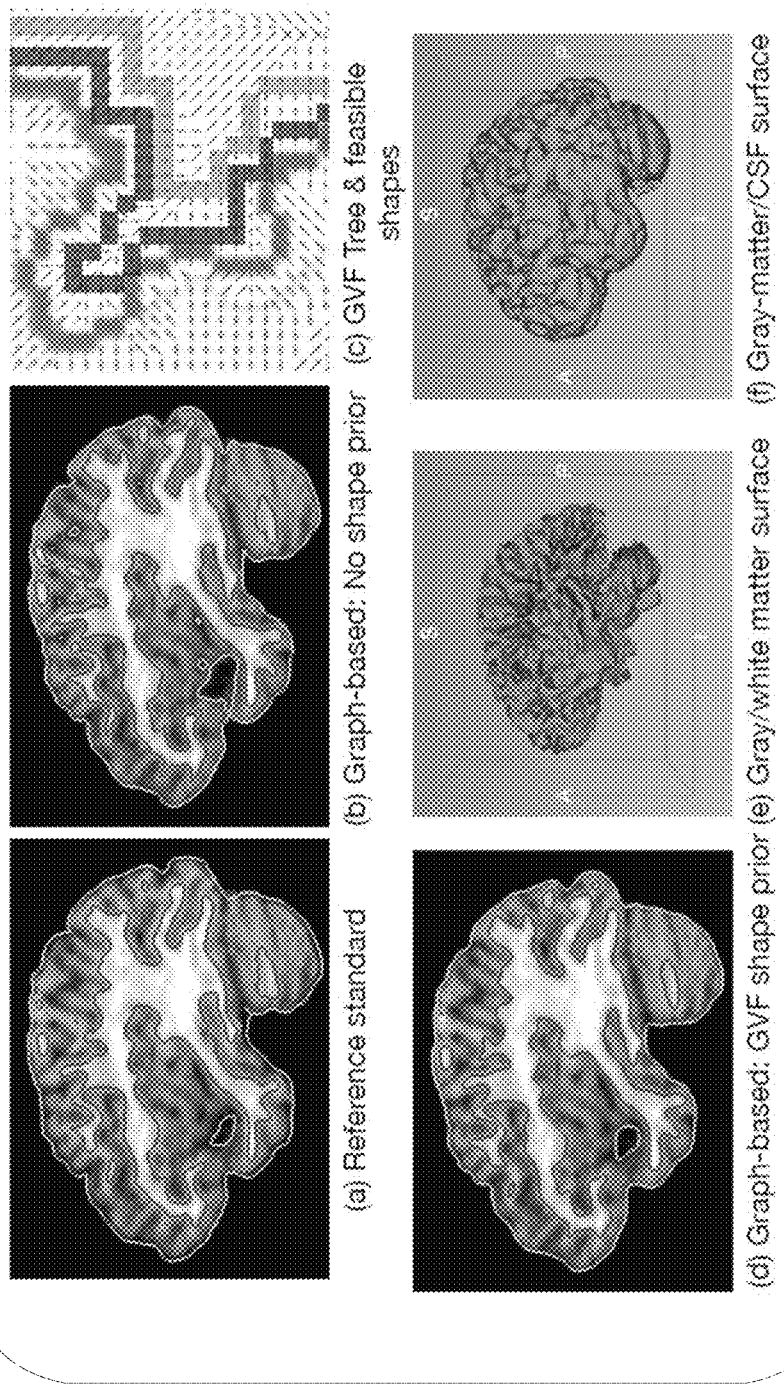
FIG. 21 shows example segmentation using the GVF-based shape prior representation with the graph-based surface segmentation method on the IBSR dataset. Panel (a) Reference standard. (b) Graph-based segmentation without shape priors results in spurious boundaries. (c) The GVF prior constraints the segmentation to a family of shapes, two of which are illustrated in black and magenta. (d) The addition of the shape prior improves the segmentation by removing spurious boundaries. (e) and (f) show the 3-D gray/white matter and the gray matter/CSF boundary surfaces, respectively.

We recently developed a GVF-based representation of shape priors, which can be seamlessly integrated into our graph-based surface segmentation framework, to eliminate the cumbersome resampling processing to obtain the column structure for surface segmentation, especially for those highly folded or highly branched objects (e.g., grey/white matters, vessel trees). Given an example shape template (e.g., pre-segmentation, an initial model), we compute a gradient vector flow (GVF) of the template to form a tree structure embedded in the input image (called the GVF-tree) to define a family of feasible shapes of the target object (FIG. 21, panel (c)). Specifically, the boundary surface of the target object is constrained to intersect the path towards the root of the GVF-tree only once; if one voxel belongs to the object, then all downstream voxels on the path towards the root of the tree are all in the object. We illustrate this family of shapes with the magenta and black curves in FIG. 21, panel (c), which are similar topologically to the shape template shown by the red curve. The paths in the GVF-tree can be viewed as columns in our Graph-OSSeg framework. Yet, here the paths can be merged down to the root, which encodes certain deformation structures of the object. In addition, the GVF-tree is defined in the original image space, instead of in the resampled image space as in Graph-OSSeg, which makes it natural to incorporate the interactions between multiple objects for simultaneous segmentation. Our experiments, shown in FIG. 21, demonstrate the great benefit of the added shape priors.

Segmentation of Terrain-Like Surfaces in 3D

We now build upon our preliminary work by generalizing the MoDL-OSSeg framework for the segmentation of terrain-like surfaces in 3-D, non-terrain surfaces, and highly complex surfaces. In particular, the MoDL-OSSeg framework may provide for simultaneously segmenting multiple interacting terrain-like surfaces in 3D. Our pilot study has demonstrated the efficacy of MoDL-OSSeg on multiple surfaces in 2D, as well as on a single surface in 2D and 3D, which, however, does not integrate the full model $\mathbb{E}(S)$ of Eqn. (3.1).

In the multiple surface scenario, the network $\mathbb{E}\|D_{data}$ is used to learn the data fidelity potentials, and the network $\mathbb{E}\|D_{shape}$ learns the shape compliance potentials, but in 3D, for each sought surface (FIG. 22). In the proposed MoDL framework, we use a quadratic function $$\varphi_{i,j}^{(p)}(S_i(p), S_j(p)) = (S_i(p) - S_j(p) - \hbar_{i,j}(p))^2$$

to model the interaction between any two sought surfaces $S_i$ and $S_j$, where $\hbar_{i,j}(p)$ is the expected surface distance at Column Col(p) and can be learned by the network $\mathbb{E}\|D_{int}$ (FIG. 22) from training data. In many scenarios, two interacting surfaces $S_i$ and $S_j$ may be known in a certain distance range, that is, $\xi \leq S_i(p) - S_j(p) \leq \Xi$.

It turns out that the OSInet needs to solve a constrained quadratic programming problem, i.e., to minimize $\mathbb{E}(S)$ while subject to $\xi \leq S_i(p) - S_j(p) \leq \Xi$ for any two interacting surfaces. However, it is normally non-trivial to embed hard constraints, like $\xi \leq S_i(p) - S_j(p) \leq \Xi$, into deep networks that are trained using backpropagations. Amos and Kolter [149] recently proposed to optimally solve constrained quadratic programming using the primal-dual interior point method with a layer of deep networks. Amos and Kolter's method may be used for solving the optimization problem of our multiple surface segmentation. A preliminary version has been implemented in our pilot study for the model only having the data fidelity potentials.

The hard surface interaction constraints, in fact, can be represented by a system of linear inequalities. Thus, by using the method of Lagrange multiplier, the OSInet needs to solve the following Lagrangian—

Figure 23:
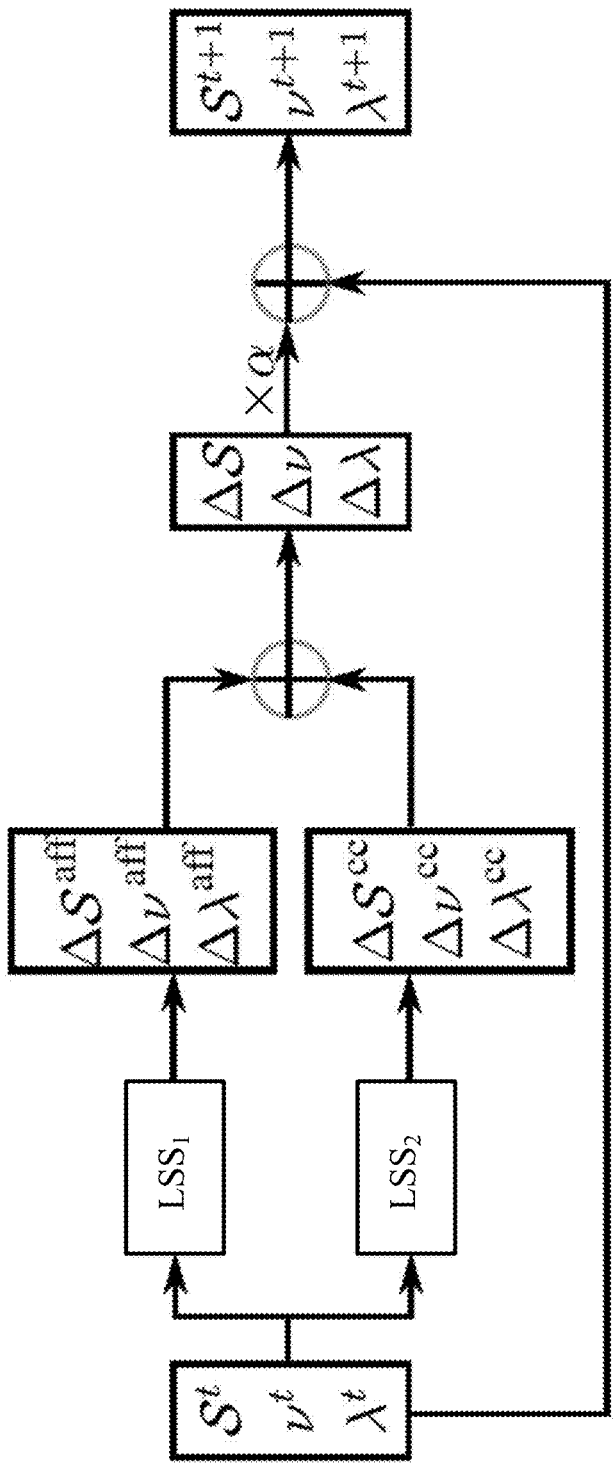
FIG. 23 is an illustration of the proposed OSInet RNN. The linear system solver (LSS) is used to solve two linear systems to obtain the updating directions.

$L(S, \lambda, v) = \frac{1}{2} S^T H S + c^T S + \lambda^T v$, where H is the Hessian matrix for the graph energy function $\mathbb{E}(S)$, $\lambda$ is the multiplier, and the slackness variable v models the linear inequality constraints (i.e., the hard surface interaction constraints). Inspired by Amos and Kolter's algorithm, the iteration step of the proposed OSInet RNN update is illustrated in FIG. 23. The basic operation is to solve two derived linear systems to obtain the affine scaling directions ($\Delta S^{aff}$, $\Delta v^{aff}$, $\Delta \lambda^{aff}$) and the centering-plus-corrector directions ($\Delta S^{cc}$, $\Delta v^{cc}$, $\Delta \lambda^{cc}$). The final updating directions are the sum of those two. This enables us to unroll the optimization of the energy function $\mathbb{E}(S)$ for multiple surface segmentation as an RNN, making it possible to train both OSInet RNN and DRLnet for the data fidelity potentials, shape compliance potentials, and the surface interaction potentials in an end-to-end fashion.

Segmentation of Non-Terrain Surfaces

As shown in our pilot study, when handling the non-terrain surface segmentation with the proposed MoDL-OSSeg framework, one major obstacle is how to do resampling to ensure the resultant image in a cuboid grid neighborhood setting in 3D. We recently introduced a shape-aware patch-generation scheme that enables generation of resampled image patches with a regular grid structure by the harmonic mapping technique. However, the method works only for simple closed surfaces. Our experiments reveal that the resampling scheme cannot well handle surfaces with high curvatures. In addition, the use of patches may cause inconsistency between the boundaries of patches, which could be even more severe for surface segmentation.

To make the proposed MoDL-OSSeg work for more general applications, more advanced protocols for quadrilateral meshing may be used. Chen et al. proposed to compute quadrilateral meshes based on the construction of Riemannian metrics with special properties. Lei et al. [163] proposed a meromorphic differentials based method for surfaces with a general topology, which is theoretically rigorous, practically simple and efficient. Such methods may be adapted to perform quadrilateral meshing for the initial surface (e.g., pre-segmentation) of the target object, which forms the shape structure graph $\mathcal{G} = (\mathcal{V}, \mathcal{N})$ that defines the basic topology of the object. It shows $\mathcal{G}$ that has only a few singular nodes whose number of neighbors is not four. Using the resampling methods, we can generate the resampled image volume with respect to $\mathcal{G}$, so that the target surface intersects every column of the image volume exactly once. As we do not decompose the resampled volume into patches, the whole volume may not have a regular cuboid structure, but the neighborhood setting of each voxel (except those corresponding to the singular nodes) still has the required grid structure. To make the convolutional filters effectively traverse the whole resampled volume, we plan to develop efficient filter traversal algorithms based on graph theory, so the convolution operations can start and end at the singular nodes while being performed over the whole volume. Thus, the DRLnet in the proposed MoDL-OSSeg framework is able to learn the data fidelity potentials, shape compliance potentials, and surface interaction potentials, and the globally optimal segmentation can be obtained by OSInet.

Segmentation of Overly Complex Surfaces

The proposed shape structure graph has been proven to be effective for capturing the global shape structure of the target object in the Graph-OSSeg framework. However, as it works in the resampled image space (i.e., not in the original image space), there are two major drawbacks while applying it to segment objects with overly complex shapes, such as heavily folded gray/while matters or bifurcated vessel trees: (1) the resampled image columns may interfere with each other, causing undesired topological changes in the output solution, and (2) it is nontrivial to enforce the interaction between objects with different shape structures, as it requires segmentation in different resampled image spaces. To overcome those challenges, radical innovations are needed.

In our prior work, we have developed a novel GVF-tree representation of shape priors, which is embedded in the original image space. Thus, no image resampling is needed. The GVF-tree shape prior is able to encode certain deformation structures of the object, defining a family of feasible shape templates (FIG. 21, panel (c)). The GVF-tree priors were computed based on the pre-segmentation of the object, which clearly may be sensitive to the initial surface model. Here, we propose to learn the GVF-tree prior $T_{gvf}$ with a deep network $E\|D_{shape}$ as in FIG. 22. Specifically, the encoder E, followed by the decoder $D_{shape}$ generates GVF-tree prior $T_{gvf}$ based on the input image. We may formulate the learning of $T_{gvf}$, which indicates to which neighbor each voxel points, as a classification problem, which is solved by the network $E\ D_{shape}$. The global shape structure is then coherently incorporated by passing the output tree $T_{gvf}$ with the shape compliance potentials $\psi_i$ to the OSInet. In this case, the shape compliance term for the target object is of the form $$\Sigma_{(u,v)\in T_{gvf}} w_\infty [x_u = \text{``object''} \wedge x_v = \text{``background''}],$$

where (u, v) is an edge of $T_{gvf}$ from voxel u to v towards the root of the tree, and $x_u$ is the label of voxel u. Herein, $w_\infty$ is a large scaler, and [•] is an indicator function that returns 1 when the enclosed condition is true, and 0 otherwise. In this way, we enforce that the boundary surface of the target object intersects any path towards the root of $T_{gvf}$ no more than once, thus constraining the segmented object to the desired shape.

We may optimize the graph energy function $\mathbb{E}(\bullet)$ using quadratic programming, while noting that the shape compliance can be written as a quadratic form after a binarization transformation of $x_u$. This enables us to unroll the entire optimization process as an RNN, followed by the training of the RNN parameters from the DRLnet in an end-to-end fashion (FIG. 22).

General Convex Shape Compliance Models

In the proposed MoDL-OSSeg model, quadratic functions are used to model the shape compliance potentials so far, and this has been demonstrated successful in our pilot study. Here we contemplate that the widely used L1-norm and total variation (TV) to model surface smoothness. The L1-norm generally does not suffer from the gradient vanishing problem when the surface position errors are small during training, thus more effectively converging to the globally optimal solution. The TV-norm is known to preserve surface discontinuity more effectively, which is critical for segmenting surfaces with high curvature. Our pilot study demonstrated that learning the surface position differences between adjacent columns can alleviate the surface over-smoothing problem. We contemplate that one may integrate the learned surface position differences into the TV-norm to model the shape compliance potentials for the segmentation of surfaces with high curvatures. As both L1-norm and TV-norm are convex, we can still implement an RNN to optimize the energy function $\mathbb{E}(S)$ to achieve globally optimal solutions. Those general convex functions can also be used to model the surface interaction potentials and will be investigated in this project.

Training Strategy

Figure 24:
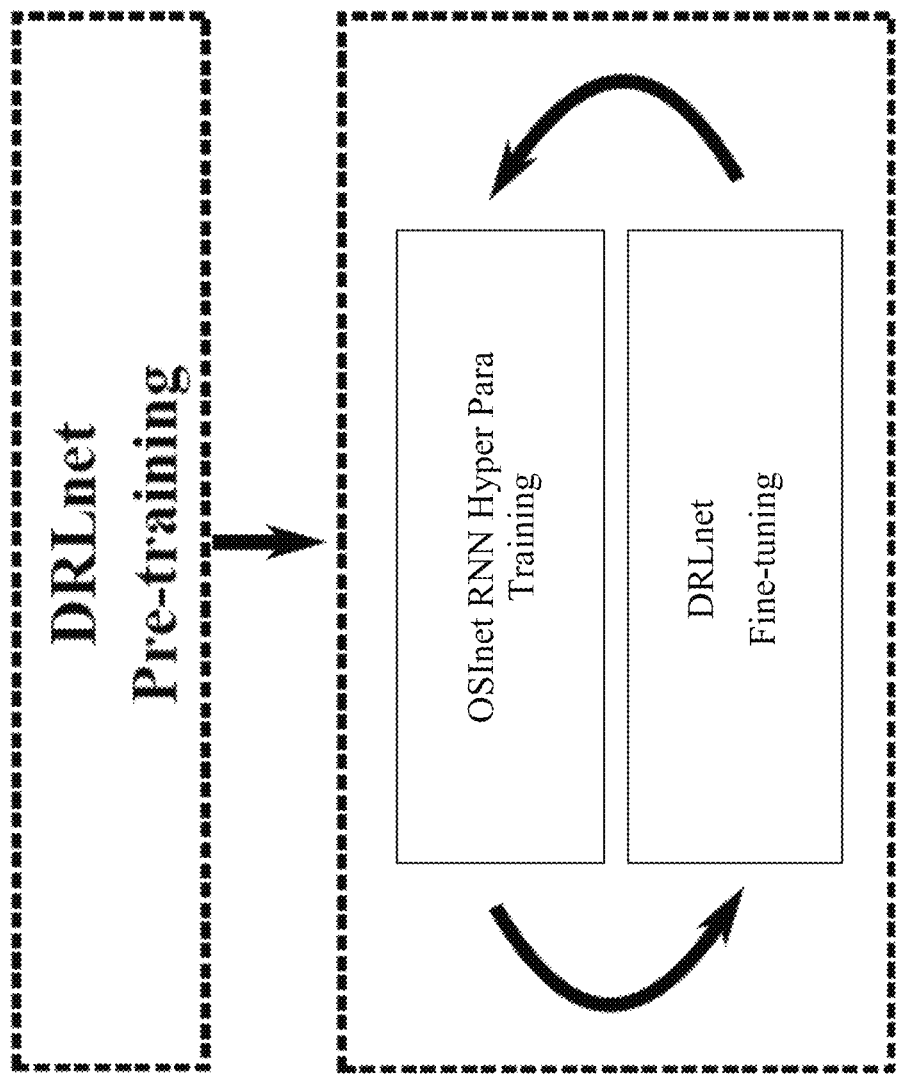
FIG. 24 illustrates training strategy which include two phases: pre-training of DRLnet and fine-tuning of the whole MoDL-OSSeg network.

The training of the whole MoDL-OSSeg network is divided into two phases: the DRLnet pre-training and the fine tuning of the whole network, which is illustrated in FIG. 24. The aim of pre-training is to make OSInet work in the proper domain. Note that the DRLnet consists of three encoder-decoders: $E\|D_{data}$, $E\|D_{shape}$ and $E\|D_{int}$, all of which share an encoder E. As in our pilot study, the $E\|D_{data}$ network will be trained with the Kullback-Leibler divergence (KLD) loss, which probably facilitates few-shot learning. The ground truth for this pre-training is relaxed Gaussian distributions of the original surface delta distribution. The $E\|D_{shape}$ network will be trained with the mean squared error (MSE) loss of the surface position differences, and the $E\|D_{int}$ network will be trained on the surface in-between distances. Then, by weighting these three losses carefully, backpropagation will be used to pre-train the encoder-decoders. During the fine tuning phase, the hyper-parameters in the OSInet RNN, e.g., the weighting coefficient of the shape compliance term, and all parameters within the encoder-decoders are to be tuned. Based on our pilot study, we propose to train parameters within OSInet using validation data and those parameters within the encoder-decoders (DRLnet) using training data alternatively. The logic behind this is that the learned parameters within OSInet from validation data are more representative in general. During the fine tuning, the MSE loss or L1 loss of the surface position predictions are to be utilized.

Weakly Supervised and Semi-Supervised Methods for the MoDL Segmentation

Due to the scarcity of annotations, medical CNNs are typically trained on images from only tens or hundreds of subjects, which significantly limits DL performance to reach its full capacity. In computer vision, weakly supervised learning has been developed recently, where low-cost weak annotations, such as bounding boxes, scribbles, and image tags, are used for training. For natural image applications, the state-of-the-art weakly supervised learning method achieved 95% of the performance of fully supervised learning. Another parallel line of research is semi-supervised learning, in which a small amount of fully labeled data together with a large amount of unlabeled data are used for training. In general, semi-supervised learning strives to exploit data consistency of the unlabeled data to help model training. We contemplate integrating both weakly supervised and semi-supervised learning into the proposed MoDL-OSSeg framework to further reduce the demand of labeled training data.

Semi-Supervised MoDL-OSSeg Model

Unlabeled image data may be used to train our MoDL-OSSeg model using semi-supervised learning. One common approach is so-called self training, in which the network-in-training is used to generate segmentations for the network training. Recently, DL-based image reconstruction networks trained with both labelled and unlabeled data have been used to assist the training of segmentation networks. However, reconstruction network training is complicated and it requires a large amount of unlabeled data, especially in 3D. Generative adversarial networks (GANs) and attention networks have also been proposed for semi-supervised segmentation. Yet, GANs are known difficult to be trained in general and most of the work has been done in 2D.

Figure 25:
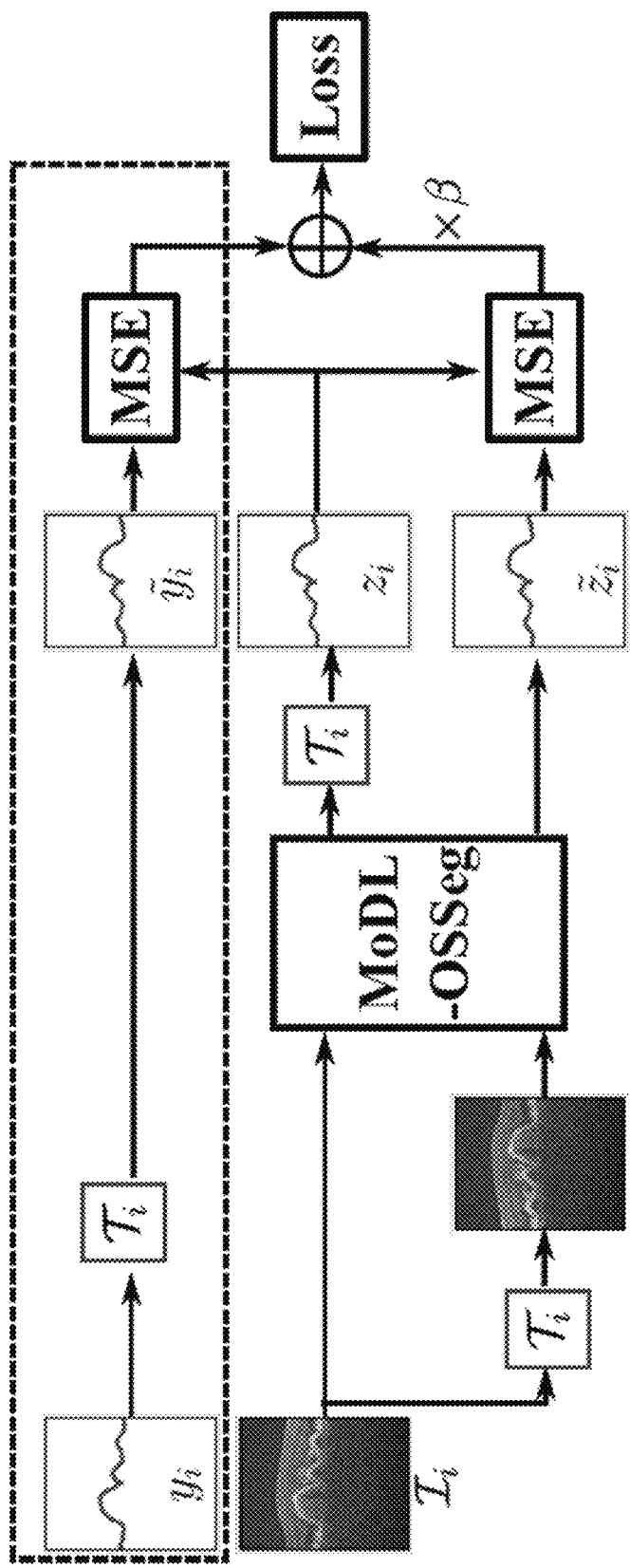
FIG. 25 is an illustration of the semi-supervised MoDL-OSSeg model. $T_i$ denotes a random transformation. The dotted block is involved only for supervised training. $y_i$ is the reference standard. Left-right mirroring is shown as an example $T_i$.

The self-ensembling model has been successful in semi-supervised classification and medical image segmentation. The self-ensembling technique may be integrated into our MoDL-OSSeg segmentation framework to further reduce the demand of labeled training data. To utilize information within the unlabeled data, the self-ensembling approach encourages consistent segmentations from the MoDL-OSSeg network for the same input image under different transformations, e.g., adding randomized Gaussian noise and random mirroring. The network architecture is illustrated in FIG. 25. The training process consists of two phases: 1) supervised training with labeled data, and 2) unsupervised training with unlabeled data. The upper portion of the network (FIG. 25) is for the supervised training to compute a supervised loss (i.e., the mean squared error (MSE) of $\tilde{y}_i$ and $z_i$), while the lower portion is for the unsupervised training to compute an unsupervised loss. The unsupervised loss is an MSE between the segmentation of the transformed image and the transformed result of the ground truth of the original image (i.e., the MSE of $\tilde{z}_i$ and $z_i$ in FIG. 25). The whole framework is trained with a weighted combination of the supervised loss and the unsupervised loss.

Weakly Supervised MoDL-OSSeg Model

To make use of weakly supervised learning, we contemplate designing the loss function to exploit the weak annotation information. Instead of treating all voxels equally as in the standard DL process, we weigh voxels according to the confidence we have in their surface(s). On one hand, voxels on the manually traced image data deserve higher confidence than the others and are assigned a higher weight to penalize the loss function. On the other hand, the label accuracy of the voxels close to the boundary surfaces of a rough segmentation (e.g., by our Graph-OSSeg method) is relatively low compared to those away from the boundaries. Thus, each voxel should be weighed based on its distance to the boundary. In addition, during training, the segmentation produced by the MoDL-OSSeg may contain mis-classified voxels that can mislead the network training. In this case, the output probability map from the network is used to measure the uncertainty of each voxel. If the probability of a voxel is close to 0.5, which indicates that the network has low confidence in assigning its label, then a low weight will be assigned to it to make it have lower impact on the loss function. These losses can be combined with the MSE loss of our MoDL-OSSeg network for a joint training.

Integration of Semi-Supervised and Weakly Supervised MoDL-OSSeg

We plan to leverage the power of both weakly supervised and semi-supervised methods to boost the segmentation accuracy of the proposed MoDL-OSSeg model and to further reduce the demand of labeled training data. We call it an integrated MoDL-OSSeg model. The pipeline starts with applying semi-supervised learning for our MoDL-OSSeg model. After finishing the training with annotated data and unlabeled data, we can use the strategy of active learning: 1) apply the trained MoDL-OSSeg model to segment unlabeled images, and 2) use suggestive annotation methods or human experts to select the most valuable examples for further annotation. The weak annotations for those examples can be obtained by either applying an automated segmentation method (e.g., Graph-OSSeg) or consulting with medical experts. Finally, these newly labeled data can be utilized by the weakly supervised method to further boost the segmentation performance of MoDL-OSSeg.

Section 4: Review and Options, Variations, and Alternatives

Figure 26:
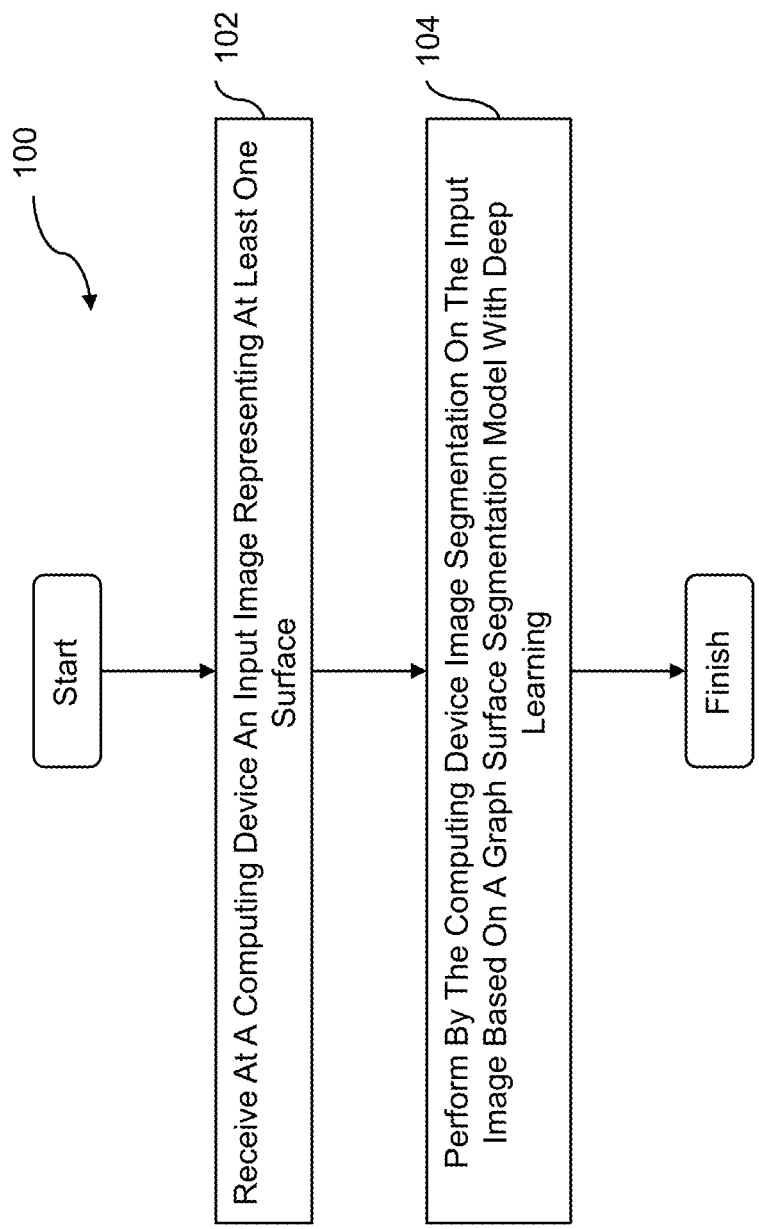
FIG. 26 illustrates one example of a method.

FIG. 26 illustrates one example of a method 100. In step 102, an input image representing at least one surface is received at a computing device. The input image may be generated by a medical imager and the input may be a medical image. In step 104, the computing device may perform an image segmentation on the input image based on a graph surface segmentation model with deep learning. Deep learning algorithms may be used to parameterize the graph surface segmentation model.

Although specific examples have been set forth herein, numerous options, variations, and alternatives are contemplated. For example, although neural networks, and more specifically convolutional neural networks are described in detailed examples, it is contemplated that other types of deep learning may be performed instead, including, without limitation, recurrent neural networks, other types of neural networks, and other types of machine learning algorithms or techniques. The term "deep learning" should be understood to encompass these and other types of machine learning algorithms techniques whether known now or developed in the future. It is also to be understood, that the particular type of deep learning used may be dependent upon the characteristics of the images (including size of images), the processing capability available, the amount of time allotted for processing, and/or other constraints which may be associated with a particular implementation and/or use.

Although examples have been given for different types of biomedical imaging, it is to be understood that the methods described herein may be applied to numerous types of biomedical images regardless of the technology used to acquire them. This may include ultrasound imaging, magnetic resonance imaging, computed tomography imaging, and other types of medical imaging. Thus, once imagery is acquired with any of these or other types of imaging technologies, the images may be analyzed. It is also to be understood that the methods described are not limited to applications in biomedical imaging but may be used in any number of other applications where segmentation is desired.

The methods described herein may be incorporated into software in the form of instructions stored on a non-transitory computer readable medium which may be used to perform analysis of the acquired imaging. The software may be used to support diagnosis activity, treatment decisions or perform other functions once segmentation is performed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor such as one or more central processing units (CPUs) and/or one or more graphics processing units (GPUs)) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a hospital environment, a laboratory environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a hospital, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. It is to be further understood, that aspects of different embodiments may be combined.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The invention is not to be limited to the particular embodiments described herein. In particular, the invention contemplates numerous variations in segmentation. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

[1] J. Long, E. Shelhamer, and T. Darrell, "Fully convolutional networks for semantic segmentation," in CVPR 2015, 2015, pp. 3431-3440.

[2] O. Ronneberger, P. Fischer, and T. Brox, "U-net: Convolutional networks for biomedical image segmentation," in MICCAI 2015, 2015, pp. 234-241.

[3] X. Wu and D. Z. Chen, "Optimal net surface problems with applications," in International Colloquium on Automata, Languages, and Programming. Springer, 2002, pp. 1029-1042.

[4] K. Li, X. Wu, D. Z. Chen, and M. Sonka, "Optimal surface segmentation in volumetric images—a graph-theoretic approach," IEEE Trans Pattern Anal Mach Intell, vol. 28, no. 1, pp. 119-134, 2006.

[5] M. K. Garvin, M. D. Abramoff, X. Wu, S. R. Russell, T. L. Burns, and M. Sonka, "Automated 3-d intraretinal layer segmentation of macular spectral-domain optical coherence tomography images," IEEE Trans. Med. Imag, vol. 28, no. 9, pp. 1436-1447, 2009.

[6] Y. Yin, X. Zhang, R. Williams, X. Wu, D. D. Anderson, and M. Sonka, "Logismoslayered optimal graph image segmentation of multiple objects and surfaces: cartilage segmentation in the knee joint," IEEE transactions on medical imaging, vol. 29, no. 12, pp. 2023-2037, 2010.

[7] I. Oguz and M. Sonka, "Logismos-b: layered optimal graph image segmentation of multiple objects and surfaces for the brain," IEEE transactions on medical imaging, vol. 33, no. 6, pp. 1220-1235, 2014.

[8] M. K. Garvin, M. D. Abr'amoff, R. Kardon, S. R. Russell, X. Wu, and M. Sonka, "Intraretinal layer segmentation of macular optical coherence tomography images using optimal 3-d graph search," IEEE transactions on medical imaging, vol. 27, no. 10, pp. 1495-1505, 2008.

[9] Q. Song, J. Bai, M. K. Garvin, M. Sonka, J. M. Buatti, and X. Wu, "Optimal multiple surface segmentation with shape and context priors," IEEE transactions on medical imaging, vol. 32, no. 2, pp. 376-386, 2013.

[10] A. Shah, M. D. Abr'amoff, and X. Wu, "Optimal surface segmentation with convex priors in irregularly sampled space," Med. Image Anal., 2019.

[11] L. Zhou, Z. Zhong, A. Shah, and X. Wu, "3-d surface segmentation meets conditional random fields," arXiv preprint arXiv:1906.04714, 2019.

[12] L.-C. Chen, Y. Yang, J. Wang, W. Xu, and A. L. Yuille, "Attention to scale: Scale-aware semantic image segmentation," in Proceedings of the IEEE conference on computer vision and pattern recognition, 2016, pp. 3640-3649.

[13] A. Shah, L. Zhou, M. D. Abr'amoff, and X. Wu, "Multiple surface segmentation using convolution neural nets: application to retinal layer segmentation in oct images," Biomed. Opt. Express, vol. 9, no. 9, pp. 4509-4526, 2018.

[14] Y. LeCun, Y. Bengio et al., "Convolutional networks for images, speech, and time series," The handbook of brain theory and neural networks, vol. 3361, no. 10, p. 1995, 1995.

[15] H. Kervadec, J. Bouchtiba, C. Desrosiers, E. Granger, J. Dolz, and I. B. Ayed, "Boundary loss for highly unbalanced segmentation," in International Conference on Medical Imaging with Deep Learning, 2019, pp. 285-296.

[16] G. Hinton, O. Vinyals, and J. Dean, "Distilling the knowledge in a neural network," in Deep Learning and Representation Learning Workshop at NIPS 2014, 2015.

[17] N. Papernot, P. McDaniel, X. Wu, S. Jha, and A. Swami, "Distillation as a defense to adversarial perturbations against deep neural networks," in 2016 IEEE Symposium on Security and Privacy (SP), 2016, pp. 582-597.

[18] H. Guo, "A simple algorithm for fitting a gaussian function [dsp tips and tricks]," IEEE Signal Process Mag, vol. 28, no. 5, pp. 134-137, 2011.

[19] S. Farsiu, S. J. Chiu, R. V. O'Connell, F. A. Folgar, E. Yuan, J. A. Izatt, C. A. Toth, A.-R. E. D. S. A. S. D. O. C. T. S. Group et al., "Quantitative classification of eyes with and without intermediate age-related macular degeneration using optical coherence tomography," Ophthalmology, vol. 121, no. 1, pp. 162-172, 2014.

[20] M.-H. Cardinal, J. Meunier, G. Soulez, R. L. Maurice, 'E. Therasse, and G. Cloutier, "Intravascular ultrasound image segmentation: a three dimensional fast-marching method based on gray level distributions," IEEE Trans. Med. Imag, vol. 25, no. 5, pp. 590-601, 2006.

[21] M.-H. R. Cardinal, G. Soulez, J.-C. Tardif, J. Meunier, and G. Cloutier, "Fast-marching segmentation of three-dimensional intravascular ultrasound images: A pre- and post-intervention study," Med. Phys., vol. 37, no. 7 Part1, pp. 3633-3647, 2010.

[22] C. Balakrishna, S. Dadashzadeh, and S. Soltaninejad, "Automatic detection of lumen and media in the ivus images using u-net with vgg16 encoder," arXiv preprint arXiv:1806.07554, 2018.

[23] S. Balocco, C. Gatta, F. Ciompi, A. Wahle, P. Radeva, S. Carlier, G. Unal, E. Sanidas, J. Mauri, X. Carillo et al., "Standardized evaluation methodology and reference database for evaluating ivus image segmentation," Comput Med Imaging Graph, vol. 38, no. 2, pp. 70-90, 2014.

[24] A. Arnab, O. Miksik, and P. H. Torr, "On the robustness of semantic segmentation models to adversarial attacks," in Proceedings of the IEEE Conference on Computer Vision and Pattern Recognition, 2018, pp. 888-897.

[25] O. Vinyals, C. Blundell, T. Lillicrap, D. Wierstra et al., "Matching networks for one shot learning," in Advances in neural information processing systems, 2016, pp. 3630-3638.

[26] J. Snell, K. Swersky, and R. Zemel, "Prototypical networks for few-shot learning," in Advances in Neural Information Processing Systems, 2017, pp. 4077-4087.

[27] P. Wang, L. Liu, C. Shen, Z. Huang, A. van den Hengel, and H. Tao Shen, "Multi-attention network for one shot learning," in Proceedings of the IEEE Conference on Computer Vision and Pattern Recognition, 2017, pp. 2721-2729.

[28] X. Wu and D. Chen. Optimal Net Surface Problems with Applications. In *Proc. of the 29th International Colloquium on Automata, Languages and Programming (ICALP)*, pages 1029-1042, July 2002.

[29] K. Li, X. Wu, D. Z. Chen, and M. Sonka. Optimal Surface Segmentation in Volumetric Images—A Graph-Theoretic Approach. *IEEE Transactions on Pattern Analysis and Machine Intelligence,* 28(1):119-134, 2006.

[30] Q. Song, J. Bai, M. K. Garvin, M. Sonka, J. M. Buatti, and X. Wu. Optimal multiple surface segmentation with shape and context priors. *IEEE transactions on medical imaging,* 32(2):376-386, 2012.

[31] Q. Song, M. Chen, J. Bai, M. Sonka, and X. Wu. Surface-Region Context in Optimal Multi-object Graph-Based Segmentation: Robust Delineation of Pulmonary Tumors. In G. Szekely and H. Hahn, editors, *Information Processing in Medical Imaging*, volume 6801 of *Lecture Notes in Computer Science*, pages 61-72. Springer Berlin/Heidelberg, 2011. PMC3158678.

[32] J. Bai, A. Shah, and X. Wu. Optimal multi-object segmentation with novel gradient vector flow based shape priors. *Computerized Medical Imaging and Graphics,* 69:96-111, 2018.

[33] A. Shah, M. D. Abámoff, and X. Wu. Optimal surface segmentation with convex priors in irregularly sampled space. *Medical image analysis,* 54:63-75, 2019.

[34] M. D. Abràmoff, X. Wu, K. Lee, and L. Tang. Subvoxel accurate graph search using non-Euclidean graph space. *PloS one,* 9(10):e107763, 2014.

[35] M. K. Garvin, M. D. Abràmoff, R. Kardon, S. R. Russell, X. Wu, and M. Sonka. Intraretinal layer segmenta-tion of macular optical coherence tomography images using optimal 3-D graph search. *IEEE transactions on medical imaging,* 27(10):1495-1505, 2008.

[36] I. Oguz, H. Zhang, A. Rumple, and M. Sonka. RATS: rapid automatic tissue segmentation in rodent brain MRI. *Journal of neuroscience methods,* 221:175-182, 2014.

[37] M. D. Abràmoff, M. K. Garvin, and M. Sonka. Retinal imaging and image analysis. *IEEE reviews in biomedical engineering,* 3:169-208, 2010.

[38] X. Chen, M. Niemeijer, L. Zhang, K. Lee, M. D. Abramoff, and M. Sonka. Three-dimensional segmentation of fluid-associated abnormalities in retinal OCT: probability constrained graph-search-graph-cut. *IEEE transactions on medical imaging,* 31(8):1521-1531, 2012.

[39] Z. Hu, M. D. Abramoff, Y. H. Kwon, K. Lee, and M. K. Garvin. Automated segmentation of neural canal opening and optic cup in 3D spectral optical coherence tomography volumes of the optic nerve head. *Investigative ophthalmology & visual science,* 51(11):5708-5717, 2010.

[40] K. Lee, M. Niemeijer, M. K. Garvin, Y. H. Kwon, M. Sonka, and M. D. Abramoff. Segmentation of the optic disc in 3-D OCT scans of the optic nerve head. *IEEE transactions on medical imaging,* 29(1):159-168, 2009.

[41] X. Liu, D. Z. Chen, M. H. Tawhai, X. Wu, E. A. Hoffman, and M. Sonka. Optimal graph search based segmentation of airway tree double surfaces across bifurcations. *IEEE transactions on medical imaging,* 32(3): 493-510, 2012.

[42] C. Chu, J. Bai, X. Wu, and G. Zheng. MASCG: multi-atlas segmentation constrained graph method for accurate segmentation of hip CT images. *Medical image analysis,* 26(1):173-184, 2015.

[43] S. Sun, M. Sonka, and R. R. Beichel. Graph-based IVUS segmentation with efficient computer-aided refinement. *IEEE transactions on medical imaging,* 32(8): 1536-1549, 2013. Petersen, M. Nielsen, P. Lo, Z. Saghir, A. Dirksen, and M. De Bruijne. Optimal graph based segmentation using flow lines with application to airway wall segmentation. In *Biennial International Conference on Information Processing in Medical Imaging*, pages 49-60. Springer, 2011.

[44] J. E. Iglesias, C.-Y. Liu, P. M. Thompson, and Z. Tu. Robust brain extraction across datasets and comparison with publicly available methods. *IEEE transactions on medical imaging,* 30(9):1617-1634, 2011.

[45] K. Lee, R. K. Johnson, Y. Yin, A. Wahle, M. E. Olszewski, T. D. Scholz, and M. Sonka. Three-dimensional thrombus segmentation in abdominal aortic aneurysms using graph search based on a triangular mesh. *Computers in biology and medicine,* 40(3):271-278, 2010.

[46] X. Zhang, J. Tian, K. Deng, Y. Wu, and X. Li. Automatic liver segmentation using a statistical shape-model with optimal surface detection. *IEEE Transactions on Biomedical Engineering,* 57(10):2622-2626, 2010.

[47] Z. Hu, X. Wu, A. Hariri, and S. R. Sadda. Multiple layer segmentation and analysis in three-dimensional spectral-domain optical coherence tomography volume scans. *Journal of biomedical optics,* 18(7):076006, 2013.

[48] Z. Hu, X. Wu, Y. Ouyang, Y. Ouyang, and S. R. Sadda. Semiautomated segmentation of the choroid in spectral-domain optical coherence tomography volume scans. *Investigative ophthalmology & visual science,* 54(3): 1722-1729, 2013.

[49] C. Cui, X. Wu, J. D. Newell, and M. Jacob. Fat water decomposition using globally optimal surface estima-tion (GOOSE) algorithm. *Magnetic resonance in medicine,* 73(3):1289-1299, 2015.

[50] Q. Song, X. Wu, Y. Liu, M. Smith, J. Buatti, and M. Sonka. Optimal graph search segmentation using arc-weighted graph for simultaneous surface detection of bladder and prostate. In *International Conference on Medical Image Computing and Computer-Assisted Intervention*, pages 827-835. Springer, 2009.

[51] L. Zhang, G. H. Buitendijk, K. Lee, M. Sonka, H. Springelkamp, A. Hofman, J. R. Vingerling, R. F. Mullins, C. C. Klaver, and M. D. Abramoff. Validity of automated choroidal segmentation in SS-OCT and SD-OCT. *Investigative ophthalmology & visual science,* 56(5):3202-3211, 2015.

[52] F. Shi, X. Chen, H. Zhao, W. Zhu, D. Xiang, E. Gao, M. Sonka, and H. Chen. Automated 3-D retinal layer segmentation of macular optical coherence tomography images with serous pigment epithelial de-tachments. *IEEE transactions on medical imaging,* 34(2):441-452, 2014.

[53] B. J. Antony, M. D. Abràmoff, M. M. Harper, W. Jeong, E. H. Sohn, Y. H. Kwon, R. Kardon, and M. K. Garvin. A combined machine-learning and graph-based framework for the segmentation of retinal surfaces in SD-OCT volumes. *Biomedical optics express,* 4(12):2712-2728, 2013.

[54] X. Chen, L. Zhang, E. H. Sohn, K. Lee, M. Niemeijer, J. Chen, M. Sonka, and M. D. Abramoff Quantification of external limiting membrane disruption caused by diabetic macular edema from SD-OCT. *Investigative ophthalmology & visual science,* 53(13):8042-8048, 2012.

[55] P. A. Dufour, L. Ceklic, H. Abdillahi, S. Schroder, S. De Dzanet, U. Wolf-Schnurrbusch, and J. Kowal. Graph-based multi-surface segmentation of OCT data using trained hard and soft constraints. *IEEE transactions on medical imaging,* 32(3):531-543, 2012.

[56] J.-K. Wang, R. H. Kardon, M. J. Kupersmith, and M. K. Garvin. Automated quantification of volumetric optic disc swelling in papilledema using spectral-domain optical coherence tomography. *Investigative ophthal-mology & visual science,* 53(7):4069-4075, 2012.

[57] X. Xu, J. M. Reinhardt, Q. Hu, B. Bakall, P. S. Tlucek, G. Bertelsen, and M. D. Abràmoff. Retinal vessel width measurement at branchings using an improved electric field theory-based graph approach. *PloS one,* 7(11): e49668, 2012.

[58] S. Sun, M. Sonka, and R. R. Beichel. Lung segmentation refinement based on optimal surface find-ing utilizing a hybrid desktop/virtual reality user interface. *Computerized Medical Imaging and Graphics,* 37(1):15-27, 2013.

[59] X. Li, X. Chen, J. Yao, X. Zhang, F. Yang, and J. Tian. Automatic renal cortex segmentation using im-plicit shape registration and novel multiple surfaces graph search. *IEEE transactions on medical imaging,* 31(10): 1849-1860, 2012.

[60] R. R. Beichel and Y. Wang. Computer-aided lymph node segmentation in volumetric CT data. *Medical physics,* 39(9):5419-5428, 2012.

[61] Y. Zheng, B. Georgescu, F. Vega-Higuera, and D. Comaniciu. Left ventricle endocardium segmentation for cardiac CT volumes using an optimal smooth surface. In *Medical Imaging 2009: Image Processing*, volume 7259, page 72593V. International Society for Optics and Photonics, 2009.

[62] P. Hua, Q. Song, M. Sonka, E. A. Hoffman, and J. M. Reinhardt. Segmentation of pathological and diseased lung tissue in CT images using a graph-search algorithm. In *2011 IEEE International Symposium on Biomedical Imaging: From Nano to Macro*, pages 2072-2075. IEEE, 2011.

[63] H. Bogunović, M. Sonka, Y. H. Kwon, P Kemp, M. D. Abràmoff, and X. Wu. Multi-surface and multi-field co-segmentation of 3-D retinal optical coherence tomography. *IEEE transactions on medical imaging,* 33(12):2242-2253, 2014.

[64] J. Bai, M. S. Miri, Y. Liu, P. Saha, M. Garvin, and X. Wu. Graph-based optimal multi-surface segmentation with a star-shaped prior: Application to the segmentation of the optic disc and cup. In *2014 IEEE 11th International Symposium on Biomedical Imaging (ISBI)*, pages 525-528. IEEE, 2014.

[65] C. Chu, J. Bai, L. Liu, X. Wu, and G. Zheng. Fully automatic segmentation of hip CT images via ran-dom forest regression-based Atlas selection and optimal graph search-based surface detection. In *Asian Conference on Computer Vision*, pages 640-654. Springer, 2014.

[66] V. A. Robles, B. J. Antony, D. R. Koehn, M. G. Anderson, and M. K. Garvin. 3D graph-based automated segmentation of corneal layers in anterior-segment optical coherence tomography images of mice. In *Medical Imaging 2014: Biomedical Applications in Molecular, Structural, and Functional Imaging*, volume 9038, page 90380F. International Society for Optics and Photonics, 2014.

[67] K. Lee, Y. Yin, A. Wahle, M. E. Olszewski, and M. Sonka. 3-D segmentation and quantitative analysis of inner and outer walls of thrombotic abdominal aortic aneurysms. In *Medical Imaging 2008: Physiology, Function, and Structure from Medical Images*, volume 6916, page 691626. International Society for Optics and Photonics, 2008.

[68] Y. Yin, S. V. Fotin, S. Periaswamy, J. Kunz, H. Haldankar, N. Muradyan, B. Turkbey, and P. Choyke. Fully automated 3D prostate central gland segmentation in MR images: a LOGISMOS based approach. In *Medical Imaging 2012: Image Processing*, volume 8314, page 83143B. International Society for Optics and Photonics, 2012.

[69] Z. Wu, X. Jiang, N. Zheng, Y. Liu, and D. Cheng. Exact solution to median surface problem using 3D graph search

[70] T. K. Redd, S. Read-Brown, D. Choi, T. R. Yackel, D. C. Tu, and M. F. Chiang. Electronic health record impact on productivity and efficiency in an academic pediatric ophthalmology practice. *Journal of American Association for Pediatric Ophthalmology and Strabismus*, 18(6):584-589, 2014.

[71] J. G. Lam, B. S. Lee, and P. P. Chen. The effect of electronic health records adoption on patient visit volume at an academic ophthalmology department. *BMC health services research*, 16(1):7, 2015.

[72] Y. M. Haidar, O. Moshtaghi, H. Mahboubi, Y. Ghavami, K. Ziai, H. Hojjat, W. B. Armstrong, and H. R. Djalilian. Association between electronic medical record implementation and otolaryngologist productivity in the ambulatory setting. *JAMA Otolaryngology—Head & Neck Surgery*, 143(1):20-24, 2017.

[73] J. Bae and W. E. Encinosa. National estimates of the impact of electronic health records on the workload of primary care physicians. *BMC health services research*, 16(1):172, 2016.

[74] T. R. Mackie, E. F. Jackson, and M. Giger. Opportunities and challenges to utilization of quantitative imaging: Report of the AAPM practical big data workshop. *Medical Physics*, 45(10):e820-e828, 2018.

[75] K. Lee, H. Zhang, A. Wahle, M. Abramoff, and M. Sonka. Multi-layer 3D Simultaneous Retinal OCT Layer Segmentation: Just-Enough Interaction for Routine Clinical Use. volume 27, pages 862-871, 012018.

[76] C. A. Beam, E. F. Conant, and E. A. Sickles. Association of volume and volume-independent factors with accuracy in screening mammogram interpretation. *Journal of the National Cancer Institute*, 95(4):282-290, 2003.

[77] G. Litjens, T. Kooi, B. E. Bejnordi, A. A. A. Setio, F. Ciompi, M. Ghafoorian, J. A. Van Der Laak, B. Van Gin-neken, and C. I. Sánchez. A survey on deep learning in medical image analysis. *Medical image analysis*, 42:60-88, 2017.

[78] D. Shen, G. Wu, and H.-I. Suk. Deep learning in medical image analysis. *Annual review of biomedical engineering*, 19:221-248, 2017.

[79] J. Long, E. Shelhamer, and T. Darrell. Fully convolutional networks for semantic segmentation. In *Proceedings of the IEEE conference on computer vision and pattern recognition*, pages 3431-3440, 2015.

[80] O. Ronneberger, P. Fischer, and T. Brox. U-net: Convolutional networks for biomedical image segmentation. In *International Conference on Medical image computing and computer-assisted intervention*, pages 234-241. Springer, 2015.

[81] V. Gulshan, L. Peng, M. Coram, M. C. Stumpe, D. Wu, A. Narayanaswamy, S. Venugopalan, K. Widner, T. Madams, J. Cuadros, et al. Development and validation of a deep learning algorithm for detection of diabetic retinopathy in retinal fundus photographs. *Jama*, 316(22):2402-2410, 2016.

[82] A. Arnab, O. Miksik, and P. H. Torr. On the robustness of semantic segmentation models to adversarial attacks. In *Proceedings of the IEEE Conference on Computer Vision and Pattern Recognition*, pages 888-897, 2018.

[83] F. Lu, F. Wu, P. Hu, Z. Peng, and D. Kong. Automatic 3D liver location and segmentation via convolutional neural network and graph cut. *International journal of computer assisted radiology and surgery*, 12(2):171-182, 2017.

[84] F. Liu, Z. Zhou, H. Jang, A. Samsonov, G. Zhao, and R. Kijowski. Deep convolutional neural network and 3D deformable approach for tissue segmentation in musculoskeletal magnetic resonance imaging. *Magnetic resonance in medicine*, 79(4):2379-2391, 2018.

[85] F. Milletari, A. Rothberg, J. Jia, and M. Sofka. Integrating statistical prior knowledge into convolutional neural networks. In *International Conference on Medical Image Computing and Computer-Assisted Intervention*, pages 161-168. Springer, 2017.

[86] H. Ravishankar, R. Venkataramani, S. Thiruvenkadam, P. Sudhakar, and V. Vaidya. Learning and incorpo-rating shape models for semantic segmentation. In *International Conference on Medical Image Computing and Computer-Assisted Intervention*, pages 203-211. Springer, 2017.

[87] S. Zheng, S. Jayasumana, B. Romera-Paredes, V. Vineet, Z. Su, D. Du, C. Huang, and P. H. Torr. Conditional random fields as recurrent neural networks. In *Proceedings of the IEEE international conference on computer vision*, pages 1529-1537, 2015.

[88] A. Arnab, S. Jayasumana, S. Zheng, and P. H. Torr. Higher order conditional random fields in deep neural networks. In *European Conference on Computer Vision*, pages 524-540. Springer, 2016.

[89] A. Arnab, S. Zheng, S. Jayasumana, B. Romera-Paredes, M. Larsson, A. Kirillov, B. Savchynskyy, C. Rother, F. Kahl, and P. H. Torr. Conditional random fields meet deep neural networks for semantic segmentation: Combining probabilistic graphical models with deep learning for structured prediction. *IEEE Signal Processing Magazine*, 35(1):37-52, 2018.

[90] R. Vemulapalli, O. Tuzel, M.-Y. Liu, and R. Chellapa. Gaussian conditional random field network for se-mantic segmentation. In *Proceedings of the IEEE conference on computer vision and pattern recognition*, pages 3224-3233, 2016.

[91] M. D. Kohli, R. M. Summers, and J. R. Geis. Medical image data and datasets in the era of machine learn-ing—whitepaper from the 2016 C-MIMI meeting dataset session. *Journal of digital imaging*, 30(4):392-399, 2017.

Grand Challenges—A platform for end-to-end development of machine learning solutions in biomedical imaging. grand-challenge.org. Accessed: 2020 Jun. 15.

[93] I. Goodfellow, Y. Bengio, and A. Courville, editors. *Deep Learning*. The MIT Press, Cambridge, MA, November 2016.

[94] A. Vaswani, N. Shazeer, N. Parmar, J. Uszkoreit, L. Jones, A. N. Gomez, Ł. Kaiser, and I. Polosukhin. Attention is all you need. In *Advances in neural information processing systems*, pages 5998-6008, 2017.

[95] Z.-H. Zhou. A brief introduction to weakly supervised learning. *National Science Review*, 5(1):44-53, 2017.

[96] S. Laine and T. Aila. Temporal ensembling for semi-supervised learning. *arXiv preprint arXiv:1610.02242*, 2016.

[97] S. Sedai, D. Mahapatra, S. Hewavitharanage, S. Maetschke, and R. Garnavi. Semi-supervised segmentation of optic cup in retinal fundus images using variational autoencoder. In *International Conference on Medical Image Computing and Computer-Assisted Intervention*, pages 75-82. Springer, 2017.

[98] D. Nie, Y. Gao, L. Wang, and D. Shen. ASDNet: Attention based semi-supervised deep networks for medical image segmentation. In *International Conference on Medical Image Computing and Computer-Assisted Intervention*, pages 370-378. Springer, 2018.

[99] Ö. Qigek, A. Abdulkadir, S. S. Lienkamp, T. Brox, and O. Ronneberger. 3D U-Net: Learning Dense Volu-metric Segmentation from Sparse Annotation. In S. Ourselin, L. Joskowicz, M. R. Sabuncu, G. Unal, and W. Wells, editors, *Medical Image Computing and Computer-Assisted Intervention—MICCAI* 2016, pages 424-432, Cham, 2016. Springer International Publishing.

[100] L. Zhou, Z. Zhong, A. Shah, and X. Wu. 3-D Surface Segmentation Meets Conditional Random Fields. *arXiv preprint arXiv:*1906.04714, 2019.

[101] N. Jeppesen, A. N. Christensen, V. A. Dahl, and A. B. Dahl. Sparse Layered Graphs for Multi-Object Segmentation. In *Proceedings of the IEEE/CVF Conference on Computer Vision and Pattern Recognition (CVPR)*, June 2020.

[102] Z. Wu, H. Bogunović, R. Asgari, U. Schmidt-Erfurth, and R. H. Guymer. Predicting Progression of Age-Related Macular Degeneration Using OCT and Fundus Photography. *Ophthalmology Retina,* 5(2):118-125, 2021.

[103] A. P. Yow, R. Srivastava, J. Cheng, A. Li, J. Liu, L. Schmetterer, H. L. Tey, and D. W. K. Wong. *Techniques and Applications in Skin OCT Analysis,* pages 149-163. Springer International Publishing, Cham, 2020.

[104] E. A. Samaniego, J. A. Roa, H. Zhang, T. R. Koscik, S. Ortega-Gutierrez, G. Bathla, M. Sonka, C. Derdeyn, V. A. Magnotta, and D. Hasan. Increased contrast enhancement of the parent vessel of unruptured intracra-nial aneurysms in 7T MR imaging. *Journal of NeuroInterventional Surgery,* 12(10):1018-1022, 2020.

[105] A. Benussi, L. Jorge, N. Canário, R. Martins, B. Santiago, I. Santana, H. Quental, F. Ambrósio, R. Bernardes, and M. Castelo-Branco. The Retinal Inner Plexiform Synaptic Layer Mirrors Grey Matter Thickness of Primary Visual Cortex with Increased Amyloid Load in Early Alzheimer's Disease. *Neural Plasticity,* 2020: 8826087, 2020.

[106] H. Zhang, E. Essa, and X. Xie. Automatic vessel lumen segmentation in optical coherence tomography (OCT) images. *Applied Soft Computing,* 88:106042, 2020.

[107] M. S. Sarabi, M. M. Khansari, J. Zhang, S. Kushner-Lenhoff, J. K. Gahm, Y. Qiao, A. H. Kashani, and Y. Shi. 3D Retinal Vessel Density Mapping With OCT-Angiography. *IEEE Journal of Biomedical and Health Informatics,* 24(12):3466-3479, 2020.

[108] A. Nunes, P. Serranho, H. Quental, A. F. Ambrósio, M. Castelo-Branco, and R. Bernardes. Sexual di-morphism of the adult human retina assessed by optical coherence tomography. *Health and Technology,* 10(4):913-924, 2020.

[109] J. Chua, F. Schwarzhans, D. Q. Nguyen, Y. C. Tham, J. T. Sia, C. Lim, S. Mathijia, C. Cheung, A. Tin, G. Fischer, C.-Y. Cheng, C. Vass, and L. Schmetterer. Compensation of retinal nerve fibre layer thickness as assessed using optical coherence tomography based on anatomical confounders. *British Journal of Ophthalmology,* 104(2): 282-290, 2020.

[110] J. Chua, B. Tan, M. Ke, F. Schwarzhans, C. Vass, D. Wong, M. E. Nongpiur, M. C. Wei Chua, X. Yao, C.-Y. Cheng, T. Aung, and L. Schmetterer. Diagnostic Ability of Individual Macular Layers by Spectral-Domain OCT in Different Stages of Glaucoma. *Ophthalmology Glaucoma,* 3(5):314-326, 2020.

[111] C. M. Mandrup, C. B. Roland, J. Egelund, M. Nyberg, L. H. Enevoldsen, A. Kjaer, A. Clemmensen, A. N. Christensen, C. Suetta, R. Frikke-Schmidt, B. B. Utoft, J. M. Kristensen, J. F. P. Wojtaszewski, Y. Hellsten, and B. Stallknecht. Effects of High-Intensity Exercise Training on Adipose Tissue Mass, Glucose Uptake and Protein Content in Pre- and Post-menopausal Women. *Frontiers in sports and active living,* 2:60-60, June 2020.

[112] X. Sui, Y. Zheng, B. Wei, H. Bi, J. Wu, X. Pan, Y. Yin, and S. Zhang. Choroid segmentation from Optical Coherence Tomography with graph-edge weights learned from deep convolutional neural networks. *Neurocomputing,* 237:332-341, 2017.

[113] D. Xiang, H. Tian, X. Yang, F. Shi, W. Zhu, H. Chen, and X. Chen. Automatic Segmentation of Retinal Layer in OCT Images With Choroidal Neovascularization. *IEEE Transactions on Image Processing,* 27(12):5880-5891, 2018.

[114] L. Zhang, H. Kong, S. Liu, T. Wang, S. Chen, and M. Sonka. Graph-based segmentation of abnormal nuclei in cervical cytology. *Computerized Medical Imaging and Graphics,* 56:38-48, 2017.

[115] B. J. Kim, D. J. Irwin, D. Song, E. Daniel, J. D. Leveque, A. R. Raquib, W. Pan, G.-S. Ying, T. S. Aleman, J. L. Dunaief, and M. Grossman. Optical coherence tomography identifies outer retina thinning in frontotemporal degeneration. *Neurology,* 89(15):1604-1611, 2017.

[116] L. Bekalo, S. Niu, X. He, P. Li, I. P. Okuwobi, C. Yu, W. Fan, S. Yuan, and Q. Chen. Automated 3-D Retinal Layer Segmentation From SD-OCT Images With Neurosensory Retinal Detachment. *IEEE Access,* 7:14894-14907, 2019.

[117] D. Xiang, U. Bagci, C. Jin, F. Shi, W. Zhu, J. Yao, M. Sonka, and X. Chen. CorteXpert: A model-based method for automatic renal cortex segmentation. *Medical Image Analysis,* 42:257-273, 2017.

[118] K. Yu, F. Shi, E. Gao, W. Zhu, H. Chen, and X. Chen. Shared-hole graph search with adaptive constraints for 3D optic nerve head optical coherence tomography image segmentation. *Biomed. Opt. Express,* 9(3):962-983, March 2018.

[119] Z. Chen, M. Pazdernik, H. Zhang, A. Wahle, Z. Guo, H. Bedanova, J. Kautzner, V. Melenovsky, T. Kovarnik, and M. Sonka. Quantitative 3D Analysis of Coronary Wall Morphology in Heart Transplant Patients: OCT—Assessed Cardiac Allograft Vasculopathy Progression. *Medical Image Analysis,* 50:95-105, 2018.

[120] J. Oliveira, S. Pereira, L. Gonçalves, M. Ferreira, and C. A. Silva. Multi-surface segmentation of OCT images with AMD using sparse high order potentials. *Biomed. Opt. Express,* 8(1):281-297, January 2017.

[121] A. M. Arias Lorza, A. van Engelen, J. Petersen, A. van der Lugt, and M. de Bruijne. Maximization of regional probabilities using Optimal Surface Graphs: Application to carotid artery segmentation in MRI. *Medical Physics,* 45(3):1159-1169, 2018.

[122] X. Chen, Y. Hu, Z. Zhang, B. Wang, L. Zhang, F. Shi, X. Chen, and X. Jiang. A graph-based approach to automated EUS image layer segmentation and abnormal region detection. *Neurocomputing,* 336:79-91, 2019.

[123] Z. Wang, H.-C. Lee, O. O. Ahsen, K. Liang, M. Figueiredo, Q. Huang, J. G. Fujimoto, and H. Mashimo. Computer-Aided Analysis of Gland-Like Subsurface Hyposcattering Structures in Barrett's Esophagus Us-ing Optical Coherence Tomography. *Applied Sciences,* 8(12), 2018.

[124] G. Veni, S. Y. Elhabian, and R. T. Whitaker. ShapeCut: Bayesian surface estimation using shape-driven graph. *Medical Image Analysis,* 40:11-29, 2017.

[125] E. Essa, J.-L. Jones, and X. Xie. Coupled s-excess HMM for vessel border tracking and segmentation. *Inter-* national *Journal for Numerical Methods in Biomedical Engineering*, 35(7):e3206, 2019.
[126] C. Bauer, M. Eberlein, and R. R. Beichel. Pulmonary lobe separation in expiration chest CT scans based on subject-specific priors derived from inspiration scans. *Journal of Medical Imaging*, 5(1):1-13, 2018.
[127] G. Zheng, C. Chu, D. L. Belavý, B. Ibragimov, R. Korez, T. Vrtovec, H. Hutt, R. Everson, J. Meakin, I. L. Andrade, B. Glocker, H. Chen, Q. Dou, P.-A. Heng, C. Wang, D. Forsberg, A. Neubert, J. Fripp, M. Urschler, D. Stern, M. Wimmer, A. A. Novikov, H. Cheng, G. Armbrecht, D. Felsenberg, and S. Li. Evaluation and comparison of 3D intervertebral disc localization and segmentation methods for 3D T2 MR data: A grand challenge. *Medical Image Analysis*, 35:327-344, 2017.
[128] Q. Chen, S. Niu, W. Fang, Y. Shuai, W. Fan, S. Yuan, and Q. Liu. Automated choroid segmentation of three-dimensional SD-OCT images by incorporating EDI-OCT images. *Computer Methods and Programs in Biomedicine*, 158:161-171, 2018.
[129] L. Borg, J. Sporring, E. B. Dam, V. A. Dahl, T. B. Dyrby, R. Feidenhans'l, A. B. Dahl, and J. Pingel. Muscle fibre morphology and microarchitecture in cerebral palsy patients obtained by 3D synchrotron X-ray computed tomography. *Computers in Biology and Medicine*, 107:265-269, 2019.
[130] C. Alves, S. Batista, O. C. d'Almeida, L. Sousa, L. Cunha, R. Bernardes, and M. Castelo-Branco. The retinal ganglion cell layer predicts normal-appearing white matter tract integrity in multiple sclerosis: A combined diffusion tensor imaging and optical coherence tomography approach. *Human Brain Mapping*, 39(4):1712-1720, 2018.
[131] L. Qi, K. Zheng, X. Li, Q. Feng, Z. Chen, and W. Chen. Automatic three-dimensional segmentation of endoscopic airway OCT images. *Biomed. Opt. Express*, 10(2):642-656, February 2019.
[132] J. Petersen, A. M. Arias-Lorza, R. Selvan, D. Bos, A. van der Lugt, J. H. Pedersen, M. Nielsen, and M. de Bruijne. Increasing Accuracy of Optimal Surfaces Using Min-Marginal Energies. *IEEE Transactions on Medical Imaging*, 38(7):1559-1568, 2019.
[133] J. H. Acton, K. Ogino, Y. Akagi, J. M. Wild, and N. Yoshimura. Microperimetry and multimodal imaging in polypoidal choroidal vasculopathy. *Scientific Reports*, 8(1):15769, 2018.
[134] A. N. Christensen, C. T. Larsen, C. M. Mandrup, M. B. Petersen, R. Larsen, K. Conradsen, and V. A. Dahl. Automatic Segmentation of Abdominal Fat in MRI-Scans, Using Graph-Cuts and Image Derived Energies. In P. Sharma and F. M. Bianchi, editors, *Image Analysis*, pages 109-120, Cham, 2017. Springer International Publishing.
[135] C. Blasse, S. Saalfeld, R. Etournay, A. Sagner, S. Eaton, and E. W. Myers. PreMosa: extracting 2D surfaces from 3D microscopy mosaics. *Bioinformatics*, 33(16):2563-2569, 04 2017.
[136] C. Cui, A. Shah, X. Wu, and M. Jacob. A rapid 3D fat-water decomposition method using globally optimal surface estimation (R-GOOSE). *Magnetic Resonance in Medicine*, 79(4):2401-2407, 2018.
[137] C. Cui, X. Wu, J. D. Newell, and M. Jacob. Fat water decomposition using globally optimal surface estimation (GOOSE) algorithm. *Magnetic Resonance in Medicine*, 73(3):1289-1299, 2015.
[138] R. Mottaghi, X. Chen, X. Liu, N.-G. Cho, S.-W. Lee, S. Fidler, R. Urtasun, and A. Yuille. The role of context for object detection and semantic segmentation in the wild. In *Proceedings of the IEEE Conference on Computer Vision and Pattern Recognition*, pages 891-898, 2014.
[139] L.-C. Chen, G. Papandreou, I. Kokkinos, K. Murphy, and A. L. Yuille. Deeplab: Semantic image segmenta-tion with deep convolutional nets, atrous convolution, and fully connected crfs. *IEEE transactions on pattern analysis and machine intelligence*, 40(4):834-848, 2017.
[140] J. Cai, L. Lu, Y. Xie, F. Xing, and L. Yang. Pancreas segmentation in MRI using graph-based decision fusion on convolutional neural networks. In *International Conference on Medical Image Computing and Computer-Assisted Intervention*, pages 674-682. Springer, 2017.
[141] R. Geirhos, P. Rubisch, C. Michaelis, M. Bethge, F. A. Wichmann, and W. Brendel. ImageNet-trained CNNs are biased towards texture; increasing shape bias improves accuracy and robustness. In *Seventh International Conference on Learning Representations, ICLR 2019*, 2019.
[142] Y. Yin, X. Zhang, R. Williams, X. Wu, D. D. Anderson, and M. Sonka. LOGISMOS—layered optimal graph image segmentation of multiple objects and surfaces: cartilage segmentation in the knee joint. *IEEE transactions on medical imaging*, 29(12):2023-2037, 2010.
[143] I. Oguz and M. Sonka. LOGISMOS-B: layered optimal graph image segmentation of multiple objects and surfaces for the brain. *IEEE transactions on medical imaging*, 33(6):1220-1235, 2014.
[144] S. Z. Li. Markov random field models in computer vision. In *European conference on computer vision*, pages 361-370. Springer, 1994.
[145] A. Shah, J. Bai, Z. Hu, S. Sadda, and X. Wu. Multiple surface segmentation using truncated convex priors. In *International Conference on Medical Image Computing and Computer-Assisted Intervention*, pages 97-104. Springer, 2015.
[146] A. Shah, L. Zhou, M. D. Abrámoff, and X. Wu. Multiple surface segmentation using convolution neural nets: application to retinal layer segmentation in OCT images. *Biomedical optics express*, 9(9):4509-4526, 2018.
[147] L. Zhou and X. Wu. Globally Optimal Surface Segmentation using Deep Learning with Learnable Smoothness Priors, 2020.
[148] S. Boyd and L. Vandenberghe, editors. *Convex Optimization*. Cambridge University Press, Cambridge, UK, March 2004.
[149] B. Amos and J. Z. Kolter. Optnet: Differentiable optimization as a layer in neural networks. In *Proceedings of the 34th International Conference on Machine Learning-Volume 70*, pages 136-145. JMLR. org, 2017.
[150] S. Farsiu, S. J. Chiu, R. V. O'Connell, F. A. Folgar, E. Yuan, J. A. Izatt, C. A. Toth, A.-R. E. D. S. A. S. D. O. T. S. Group, et al. Quantitative classification of eyes with and without intermediate age-related macular degeneration using optical coherence tomography. *Ophthalmology*, 121(1):162-172, 2014.
[151] S. Balocco, C. Gatta, F. Ciompi, A. Wahle, P. Radeva, S. Carlier, G. Unal, E. Sanidas, J. Mauri, X. Carillo, et al. Standardized evaluation methodology and reference database for evaluating IVUS image segmenta-tion. *Computerized medical imaging and graphics*, 38(2):70-90, 2014.
[152] C. Balakrishna, S. Dadashzadeh, and S. Soltaninejad. Automatic detection of lumen and media in the IVUS images using U-Net with VGG16 Encoder. *arXiv preprint arXiv:*1806.07554, 2018.
[153] M.-H. Cardinal, J. Meunier, G. Soulez, R. L. Maurice, É. Therasse, and G. Cloutier. Intravascular ultrasound image segmentation: a three-dimensional fast-marching method based on gray level distributions. *IEEE Trans. Med. Imag,* 25(5):590-601, 2006.

[154] M.-H. R. Cardinal, G. Soulez, J.-C. Tardif, J. Meunier, and G. Cloutier. Fast-marching segmentation of three-dimensional intravascular ultrasound images: A pre- and post-intervention study. *Med. Phys.,* 37(7Part1):3633-3647, 2010.

Internet Brain Segmentation Repository. nitrc.org. Accessed: 2021 May 30.

[156] P. T. Choi, K. C. Lam, and L. M. Lui. FLASH: Fast landmark aligned spherical harmonic parameterization for genus-0 closed brain surfaces. *SIAM Journal on Imaging Sciences,* 8(1):67-94, 2015.

[157] N. Bloch, A. Madabhushi, H. Huisman, J. Freymann, J. Kirby, M. Grauer, et al. NCI-ISBI 2013 challenge: automated segmentation of prostate structures. *The Cancer Imaging Archive,* 370, 2015.

[158] H. Jia, Y. Song, D. Zhang, H. Huang, D. Feng, M. Fulham, et al. 3D Global Convolutional Adversarial Network for Prostate MR Volume Segmentation. *arXiv preprint arXiv:*1807.06742, 2018.

[159] Z. Tian, L. Liu, Z. Zhang, and B. Fei. PSNet: prostate segmentation on MRI based on a convolutional neural network. *Journal of Medical Imaging,* 5(2):021208, 2018.

[160] Z. Tian, L. Liu, Z. Zhang, J. Xue, and B. Fei. A supervoxel-based segmentation method for prostate MR images. *Medical physics,* 44(2):558-569, 2017.

[161] P. Marquez Neila, M. Salzmann, and P. Fua. Imposing Hard Constraints on Deep Networks: Promises and Limitations. In *CVPR Workshop on Negative Results in Computer Vision,* 2017.

[162] W. Chen, X. Zheng, J. Ke, N. Lei, Z. Luo, and X. Gu. Quadrilateral mesh generation I: Metric based method. *Computer Methods in Applied Mechanics and Engineering,* 356:652-668, 2019.

[163] N. Lei, X. Zheng, Z. Luo, F. Luo, and X. Gu. Quadrilateral Mesh Generation II: Meromorphic Quartic Differentials and Abel-Jacobi Condition. *arXiv preprint arXiv:*1907.00216, 2019.

[164] J. Dai, K. He, and J. Sun. BoxSup: Exploiting Bounding Boxes to Supervise Convolutional Networks for Semantic Segmentation. In *2015 IEEE International Conference on Computer Vision (ICCV),* pages 1635-1643, 2015.

[165] R. Hu, P. Dollar, K. He, T. Darrell, and R. Girshick. Learning to Segment Every Thing. In *2018 IEEE/CVF Conference on Computer Vision and Pattern Recognition,* pages 4233-4241, 2018.

[166] G. Papandreou, L. Chen, K. P. Murphy, and A. L. Yuille. Weakly- and Semi-Supervised Learning of a Deep Convolutional Network for Semantic Image Segmentation. In *2015 IEEE International Conference on Computer Vision (ICCV),* pages 1742-1750, 2015.

[167] M. Rajchl, M. C. H. Lee, O. Oktay, K. Kamnitsas, J. Passerat-Palmbach, W. Bai, M. Damodaram, M. A. Rutherford, J. V. Hajnal, B. Kainz, and D. Rueckert. DeepCut: Object Segmentation From Bounding Box Annotations Using Convolutional Neural Networks. *IEEE Transactions on Medical Imaging,* 36(2):674-683, 2017.

[168] C. Song, Y. Huang, W. Ouyang, and L. Wang. Box-Driven Class-Wise Region Masking and Filling Rate Guided Loss for Weakly Supervised Semantic Segmentation. In *2019 IEEE/CVF Conference on Computer Vision and Pattern Recognition (CVPR),* pages 3131-3140, 2019.

[169] X. Zhao, S. Liang, and Y. Wei. Pseudo Mask Augmented Object Detection. In *2018 IEEE/CVF Conference on Computer Vision and Pattern Recognition,* pages 4061-4070, 2018.

[170] V. Kulharia, S. Chandra, A. Agrawal, P. Torr, and A. Tyagi. Box2Seg: Attention Weighted Loss and Dis-criminative Feature Learning for Weakly Supervised Segmentation. In A. Vedaldi, H. Bischof, T. Brox, and J.-M. Frahm, editors, *Computer Vision—ECCV 2020,* pages 290-308, Cham, 2020. Springer International Publishing.

[171] D. Lin, J. Dai, J. Jia, K. He, and J. Sun. ScribbleSup: Scribble-Supervised Convolutional Networks for Semantic Segmentation. In *2016 IEEE Conference on Computer Vision and Pattern Recognition (CVPR),* pages 3159-3167, 2016.

[172] M. Tang, A. Djelouah, F. Perazzi, Y. Boykov, and C. Schroers. Normalized Cut Loss for Weakly-Supervised CNN Segmentation. In *2018 IEEE CVF Conference on Computer Vision and Pattern Recognition (CVPR),* pages 1818-1827, Los Alamitos, CA., USA, jun 2018. IEEE Computer Society.

[173] M. Tang, F. Perazzi, A. Djelouah, I. B. Ayed, C. Schroers, and Y. Boykov. On Regularized Losses for Weakly-supervised CNN Segmentation. In V. Ferrari, M. Hebert, C. Sminchisescu, and Y. Weiss, editors, *Computer Vision—ECCV 2018,* pages 524-540, Cham, 2018. Springer International Publishing.

[174] B. Wang, G. Qi, S. Tang, T. Zhang, Y. Wei, L. Li, and Y. Zhang. Boundary Perception Guidance: A Scribble-Supervised Semantic Segmentation Approach. In *Proceedings of the Twenty-Eighth International Joint Conference on Artificial Intelligence, IJCAI-19,* pages 3663-3669. International Joint Conferences on Artificial Intelligence Organization, July 2019.

[175] H. Kervadec, J. Dolz, M. Tang, E. Granger, Y. Boykov, and I. Ben Ayed. Constrained-CNN losses for weakly supervised segmentation. *Medical Image Analysis,* 54:88-99, 2019.

[176] Q. Hou, D. Massiceti, P. K. Dokania, Y. Wei, M.-M. Cheng, and P. H. S. Torr. Bottom-Up Top-Down Cues for Weakly-Supervised Semantic Segmentation. In M. Pelillo and E. Hancock, editors, *Energy Minimization Methods in Computer Vision and Pattern Recognition,* pages 263-277, Cham, 2018. Springer International Publishing.

[177] Z. Huang, X. Wang, J. Wang, W. Liu, and J. Wang. Weakly-Supervised Semantic Segmentation Network with Deep Seeded Region Growing. In *2018 IEEE/CVF Conference on Computer Vision and Pattern Recognition,* pages 7014-7023, 2018.

[178] S. Kwak, S. Hong, and B. Han. Weakly Supervised Semantic Segmentation Using Superpixel Pooling Network. In S. P. Singh and S. Markovitch, editors, *Proceedings of the Thirty-First AAAI Conference on Artificial Intelligence, Feb. 4-9, 2017, San Francisco, Calf., USA,* pages 4111-4117. AAAI Press, 2017.

[179] J. Lee, E. Kim, S. Lee, J. Lee, and S. Yoon. Frame-to-Frame Aggregation of Active Regions in Web Videos for Weakly Supervised Semantic Segmentation. In *2019 IEEE/CVF International Conference on Computer Vision (ICCV),* pages 6807-6817, 2019.

[180] C. Redondo-Cabrera, M. Baptista-Rios, and R. J. Lopez-Sastre. Learning to Exploit the Prior Network Knowledge for Weakly Supervised Semantic Segmentation. *IEEE Transactions on Image Processing,* 28(7):3649-3661, 2019.

[181] X. Wang, S. You, X. Li, and H. Ma. Weakly-Supervised Semantic Segmentation by Iteratively Mining Com-

[182] Z. Yu, Y. Zhuge, H. Lu, and L. Zhang. Joint Learning of Saliency Detection and Weakly Supervised Se-mantic Segmentation. In *2019 IEEE/CVF International Conference on Computer Vision (ICCV)*, pages 7222-7232, 2019.

[183] A. Khoreva, R. Benenson, J. Hosang, M. Hein, and B. Schiele. Simple does it: Weakly supervised instance and semantic segmentation. In *Proceedings of the IEEE conference on computer vision and pattern recog-nition*, pages 876-885, 2017.

[184] O. Chapelle, B. Scholkopf, and A. Zien. Semi-supervised learning (Chapelle, O. et al., eds.; 2006) [book reviews]. *IEEE Transactions on Neural Networks*, 20(3): 542-542, 2009.

[185] L. Yu, S. Wang, X. Li, C. Fu, and P. Heng. Uncertainty-Aware Self-ensembling Model for Semi-supervised 3D Left Atrium Segmentation. In D. Shen, T. Liu, T. M. Peters, L. H. Staib, C. Essert, S. Zhou, P. Yap, and A. R. Khan, editors, *Medical Image Computing and Computer Assisted Intervention—MICCAI 2019—22nd International Conference, Shenzhen, China, Oct. 13-17, 2019, Proceedings, Part II*, volume 11765 of *Lecture Notes in Computer Science*, pages 605-613. Springer, 2019.

[186] X. Li, L. Yu, H. Chen, C.-W. Fu, L. Xing, and P.-A. Heng. Transformation-Consistent Self-Ensembling Model for Semisupervised Medical Image Segmentation. *IEEE Transactions on Neural Networks and Learning Systems*, 32(2):523-534, 2021.

[187] S. Li, C. Zhang, and X. He. Shape-Aware Semi-supervised 3D Semantic Segmentation for Medical Images. In A. L. Martel, P. Abolmaesumi, D. Stoyanov, D. Mateus, M. A. Zuluaga, S. K. Zhou, D. Racoceanu, and L. Joskowicz, editors, *Medical Image Computing and Computer Assisted Intervention—MICCAI 2020*, pages 552-561, Cham, 2020. Springer International Publishing.

[188] W. Bai, O. Oktay, M. Sinclair, H. Suzuki, M. Rajchl, G. Tarroni, B. Glocker, A. King, P. M. Matthews, and D. Rueckert. Semi-supervised learning for network-based cardiac MR image segmentation. In *International Conference on Medical Image Computing and Computer-Assisted Intervention*, pages 253-260. Springer, 2017.

[189] L. Gu, Y. Zheng, R. Bise, I. Sato, N. Imanishi, and S. Aiso. Semi-supervised learning for biomedical image segmentation via forest oriented super pixels (voxels). In *International Conference on Medical Image Computing and Computer-Assisted Intervention*, pages 702-710. Springer, 2017.

[190] A. Chartsias, T. Joyce, G. Papanastasiou, S. Semple, M. Williams, D. Newby, R. Dharmakumar, and S. A. Tsaftaris. Factorised spatial representation learning: application in semi-supervised myocardial segmenta-tion. In *International Conference on Medical Image Computing and Computer-Assisted Intervention*, pages 490-498. Springer, 2018.

[191] I. Gulrajani, F. Ahmed, M. Arjovsky, V. Dumoulin, and A. C. Courville. Improved training of wasserstein gans. In *Advances in neural information processing systems*, pages 5767-5777, 2017.

[192] D. Mahapatra, B. Bozorgtabar, J.-P. Thiran, and M. Reyes. Efficient active learning for image classification and segmentation using a sample selection and conditional generative adversarial network. In *International Conference on Medical Image Computing and Computer-Assisted Intervention*, pages 580-588. Springer, 2018.

[193] L. Yang, Y. Zhang, J. Chen, S. Zhang, and D. Z. Chen. Suggestive annotation: A deep active learning framework for biomedical image segmentation. In *International conference on medical image computing and computer-assisted intervention*, pages 399-407. Springer, 2017.

[194] S. Park, W. Hwang, and K.-H. Jung. Semi-Supervised Reinforced Active Learning for Pulmonary Nodule Detection in Chest X-rays. In *1st Conference on Medical Imaging with Deep Learning (MIDL 2018)*, 2018.

Duke macular 3D OCT scans. duke.edu. Accessed: 2021 May 15.

NCI-ISBI 2013 challenge: automated segmentation of prostate structures. cancerimagingarchive.net. Accessed: 2021 May 20.

[197] C. Nadeau and Y. Bengio. Inference for the Generalization Error. *Machine Learning*, 52(3):239-281, 2003.

[198] J. Tian, B. Varga, G. M. Somfai, W.-H. Lee, W. E. Smiddy, and D. Cabrera DeBuc. Real-Time Automatic Segmentation of Optical Coherence Tomography Volume Data of the Macular Region. *PLOS ONE*, 10(8):1-20, August 2015.

[199] Y. He, A. Carass, Y. Liu, B. M. Jedynak, S. D. Solomon, S. Saidha, P. A. Calabresi, and J. L. Prince. Structured layer surface segmentation for retina OCT using fully convolutional regression networks. *Medical Image Analysis*, 68:101856, 2021.

[200] D. L. Rubin, M. U. Akdogan, C. Altindag, and E. Alkim. ePAD: an image annotation and analysis platform for quantitative imaging. *Tomography*, 5(1):170, 2019.

[201] D. L. Rubin, D. Willrett, M. J. O'Connor, C. Hage, C. Kurtz, and D. A. Moreira. Automated tracking of quantitative assessments of tumor burden in clinical trials. *Translational oncology*, 7(1):23-35, 2014.

[202] A. Snyder, D. Willrett, D. A. Moreira, K. A. Serique, P. Mongkolwat, V. Semeshko, and D. L. Rubin. ePAD: a cross-platform semantic image annotation tool for quantitative imaging. In *RSNA 97th Scientific Assembly & Annual Meeting*, 2011.

[203] B. B. Rad, H. J. Bhatti, and M. Ahmadi. An introduction to docker and analysis of its performance. *International Journal of Computer Science and Network Security (IJCSNS)*, 17(3):228, 2017.

ePad Usage Report. standford.edu. Accessed: 2021 May 15.

What is claimed is:

1. An automated method for segmentation, the method comprising:
   receiving at a computing device an input image representing at least one surface;
   performing by the computing device image segmentation on the input image using a model-based deep-learning (MoDL) framework comprising a graph surface segmentation model integrated into a deep learning network;
   wherein the deep learning network is configured to learn data representations of the graph surface segmentation model, the data representations comprising data fidelity potentials, shape compliance potentials, and surface interaction potentials; and
   wherein the MoDL framework provides for optimal surface segmentation.

2. The automated method for segmentation of claim 1 wherein the MoDL framework provides for constructing an energy function.

3. The automated method for segmentation of claim 1 wherein the MoDL framework provides for optimizing an energy function with the deep learning network.

4. The automated method for segmentation of claim 1 wherein the MoDL framework guarantees that the segmentation is globally optimal.

5. The automated method of claim 1 wherein the at least one surface comprises a plurality of intersecting surfaces.

6. The automated method of claim 5 wherein the MoDL framework provides for parameterizing surface cost functions in the graph surface segmentation model and using deep learning of the deep learning network to learn parameters of the surface cost functions.

7. The automated method of claim 5 wherein the MoDL further provides for detecting multiple optimal surfaces within the input image by minimizing a total surface cost while explicitly enforcing mutual surface interaction constraints.

8. The automated method of claim 7 wherein a layer of the deep learning network is used in detecting the multiple optimal surfaces.

9. The automated method of claim 8 wherein the deep learning network comprises a convolutional neural network.

10. The automated method of claim 1 wherein the input image is a two dimensional image.

11. The automated method of claim 1 wherein the input image is a three dimensional volumetric image.

12. The automated method of claim 1 wherein the image is a tomographic image.

13. The automated method of claim 1 wherein the image is an ultrasound image.

14. The automated method of claim 1 further comprising acquiring the image using a medical imaging system and wherein the image is a medical image.

15. An automated method for segmentation, the method comprising:
   receiving at a computing device an input image representing at least one surface;
   performing by the computing device image segmentation on the input image based on a model-based deep-learning (MoDL) framework comprising a graph surface segmentation model integrated into a deep learning network such that the deep learning network is configured to learn data representations of the graph surface segmentation model, the data representations comprising data fidelity potentials, shape compliance potentials, and surface interaction potentials; and
   wherein the image segmentation is globally optimal.

16. The automated method for segmentation of claim 15 further comprising acquiring the image using a medical imaging system and wherein the image is a medical image.

17. The automated method for segmentation of claim 15 wherein the image is a medical image.

18. The automated method for segmentation of claim 15 wherein the graph surface segmentation model is parameterized using the deep learning model.

19. An automated method for segmentation of a medical image, the method comprising:
   receiving at a computing device an input medical image representing at least one surface;
   performing by the computing device image segmentation on the input medical image using a model-based deep-learning (MoDL) framework comprising a graph surface segmentation model integrated into a deep learning network;
   wherein the deep learning network is configured to learn data representations of the graph surface segmentation model, the data representations comprising data fidelity potentials, shape compliance potentials, and surface interaction potentials; and
   wherein the MoDL framework provides for globally optimal surface segmentation for the input image.

* * * * *